US007681131B1

(12) United States Patent
Quarterman et al.

(10) Patent No.: US 7,681,131 B1
(45) Date of Patent: Mar. 16, 2010

(54) METHOD AND APPARATUS FOR AGGREGATING, CONDENSING, SUPERSETTING, AND DISPLAYING NETWORK TOPOLOGY AND PERFORMANCE DATA

(75) Inventors: John S. Quarterman, Lancaster, NY (US); Gretchen K. Phillips, Lancaster, NY (US); Harry J. Delano, Buffalo, NY (US)

(73) Assignee: InternetPerils, Inc., Austin, TX (US)

( * ) Notice: Subject to any disclaimer, the term of this patent is extended or adjusted under 35 U.S.C. 154(b) by 257 days.

(21) Appl. No.: 11/271,061

(22) Filed: Nov. 10, 2005

Related U.S. Application Data

(60) Provisional application No. 60/626,635, filed on Nov. 10, 2004.

(51) Int. Cl.
*G06F 15/177* (2006.01)
(52) U.S. Cl. ............... 715/736; 715/734; 715/772; 709/224
(58) Field of Classification Search ............... 715/734, 715/736, 772; 709/224
See application file for complete search history.

(56) References Cited

U.S. PATENT DOCUMENTS

| | | | | |
|---|---|---|---|---|
| 5,559,955 A | * | 9/1996 | Dev et al. ............... | 714/4 |
| 6,807,575 B1 | * | 10/2004 | Emaru et al. ............ | 709/224 |
| 6,900,822 B2 | * | 5/2005 | Germain et al. .......... | 715/736 |
| 7,065,584 B1 | * | 6/2006 | Shavitt et al. ........... | 709/241 |
| 7,219,300 B2 | * | 5/2007 | Arquie et al. ........... | 715/736 |
| 7,315,985 B1 | * | 1/2008 | Gauvin et al. ........... | 715/734 |
| 2003/0225876 A1 | * | 12/2003 | Oliver et al. ............ | 709/224 |
| 2006/0095563 A1 | * | 5/2006 | Benjamin et al. ........ | 709/224 |

\* cited by examiner

*Primary Examiner*—Weilun Lo
*Assistant Examiner*—Phenuel S Salomon
(74) *Attorney, Agent, or Firm*—Simpson & Simpson, PLLC

(57) ABSTRACT

The invention broadly comprises a computer-based method for presenting information regarding network performance and topology. The steps of the method include: displaying a first plurality of nodes in the network; displaying edges associated with the first plurality of nodes; and, displaying latency associated with the edges. The preceding steps, and those that follow, are performed by at least one general-purpose computer specially programmed to perform these steps. In some aspects, the method selects the first plurality of nodes. In some aspects, the network comprises a plurality of ISPs with respective pluralities of nodes and the respective pluralities of nodes comprises the first plurality of nodes. In some aspects, displaying a first plurality of nodes, edges, and latency is independent of cooperation from the plurality of ISPs. In some aspects, the method gathers information regarding the first plurality of nodes from vantage points outside the first plurality of nodes.

28 Claims, 54 Drawing Sheets

PerilScope Help                                    https://www.internetperils.com/help/perilscope.php

 

Help

What PerilScope Does

PerilScope yields an actionable vista of interrelationships among pieces of the Internet, encompassing routers and servers across multiple networks.

PerilScope can show our customers perils such as nonredundant routes and anomalies such as broken links or congestion, plus affected nodes.

Benefits of PerilScope

To control their Internet business risk, insurers, banks, financial institutions, telecomm, and other enterprises need to know how their clients are connected and affected.

A client at the tail of a single route is at greater risk for degradation of service, interruption of service, or loss of income than one with several alternate routes.

What a Graph Shows

Nodes and edges near the selected node.

Node: a box or shape with lines to other nodes
representing a computer on the Internet: a router, server, or client computer.

Selected node: that produced the graph
Pink with multiple peripheries the node that was selected.

Destination: a point (ID)
in the subject (IDSet) used to create the graph.
Green ellipse reached by all probes.
Red octagon unreached by more probes than reached it.

Router: most nodes that are not destinations

Node Color: netblock
in shades of green, cyan, and blue.
Nodes with the same color are in the same netblock. This also usually means they belong to

Selecting a Graph

Pan Zoom                              Abstract
Time Point
Camera Argus Subject Way Type
Size Mag For Delay Dir    Beg At Auto Anim
By Int           End Stop              Submit

Pan: select a node

Click the mouse over a node.
← Previous node incoming as in the Near Table.
→ Next node outgoing as in the Near Table.
Text Box: displays one of
 • The current selected node.
 • The node the mouse is over.
 • Type in an IP address and press Enter to get a graph for that node.
 • Manually blank the address to get the node with the most edges.
Point: see below.

Zoom: show n hops from the selected node

FIG. 51

PerilScope Help                                                    https://www.internetperils.com/help/perilscope.php the same ISP; other netblocks
    may also belong to that ISP.

Node Grey: nonresponding node
    Multiple nonresponding hops in
    a row are bundled into a single
    grey graph node.
    Data collection devices (DCDs)
    are also shown as grey.

Node Size: branching
    The more edges, the bigger the
    node.

Node Shape: direction of branching

| | |
|---|---|
| Right-pointed pentagon | More edges out than in. |
| Left-pointed pentagon | More edges in than out. |
| Rectangle | No more than one edge in or out. |

Node Label: typically an IP address
    Hold the mouse over a node to
    show its label in the Pan box
    above the graph.

Edge: a line between two nodes
  representing an Internet connection
  between two computers.

Edge Label: latency and loss

| | |
|---|---|
| Latency | in milliseconds (ms). |
| Packet loss | in percent (%). |

2.53 ms, 3%

Edge Color: latency

| | |
|---|---|
| Grey | no latency data |
| Purple | > 250 ms |
| Red | < 250 ms |
| Caramel | < 100 ms |
| Orange | < 10 ms |
| Yellow | < 5 ms |
| Green | < 1 ms |

← Zoom in one more degree.
→ Zoom out one more degree.
n Select a number of hops.
More hops may cause slower graph generation. Graphs are cached so viewing again is fast.

Abstract: nodes with at least n edges
  0 No abstraction: Zoom turns on Zoom.
  1 Least abstraction: every node and edge.
  ← Abstract one degree less.
  → Abstract one degree more.
  n Select a degree of abstraction.
  Abstraction 1 or higher turns off Zoom.
  Low abstraction may cause slow graph generation.

Time: year, month, day, hour, or minute

Point: an Intended Destination (ID) for this Subject.

Camera: a Data Collection Device (DCD) that sends probes to IDs.

Argus: multiple DCDs
  shown simultaneously with small graphs this many across.

Subject: a set of related IDs (IDSet)
  such as root DNS servers or news servers.

Way: density of nodes on the graph

| | |
|---|---|
| Low | Look outward n hops from the selected node. |
| High | For each hop outwards, check for other hops. |

Type: of presentation format

| | |
|---|---|
| Star Graph | Centered around nodes with the most edges, such as core routers, peering, hosting. |
| Path Graph | Shown from the DCDs towards the IDs in this IDSet. |
| Near Table | Nodes immediately before and after the selected node: address, name, stats. |

Size: of graph: aspect ratio

FIG. 52

PerilScope Help                                    https://www.internetperils.com/help/perilscope.php

Blue      < -5 ms
                      This can happen    Mag: Magnification of graph: width
                      when the router at
                      the far end of the     For: motion for this parameter
                      hop is faster than        Delay: between motions (secs for
                      the router at the         Auto; 100ths for Anim)
                      near end, and         Dir: motion direction, <- Back, ->
                      under other           Ahead
                      conditions.            By: time step for time series
                                            Int: interval from start to end of time
Edge Style: packet loss                    series
    colored        no packet       Beg: beginning of time series
    continuous    loss.                  End: end of time series
                                         At: what to do at end of motion series
    colored        some                  Auto: Step through a For series
    dashed        packet loss;     Anim: Animate: Comp for composite
                      see the               or SIng for separate single frames
                      edge label.         Stop: stop For motion series
    grey dashed   100%
                      packet loss.    Submit: press for new graph

Advanced                                    Advanced

Node:         checkdest          checkdest          PostScript
        Some           Check the           Check the            Link to a
        statistics        selected time    selected time        PostScript
        about the       range and       range and          format of the
        current          DCD(Group)    DCD(Group)       displayed
        node, such     for destinations  for last             graph; useful
        as:                --justoff (.jf)      responding      for printing.
        in 1, thru           became          hop                PDF
        85, out 5,           unreachable    --justshorter       Link to a PDF
        first 0, last        (and not        (.js)                  format of the
        0, earliest         back)              fewer            displayed
        hop was 4        --juston (.jn)       hops             graph; useful
    Graph:             became            (not              for printing or
        Some            reachable         more)           mailing as a
        statistics        (and not        --justlonger        document.
        about the       back)              (.jl)
        current          --turnedoff (.tf)      more            destpast
        graph,            became            hops              Show
        such as:          unreachable    (not              destinations
        112 nodes       --turnedon (.tn)    fewer)           routed
        115 edges        became            --gotshorter        through
    Cameras:         reachable         (.gs)                selected
        Number of       --destdiff (.dd)     fewer            node.
        cameras           became            hops              --slash 24
        responding      reachable or     --gotlonger          through
        of those          unreachable      (.gl)               selected
        requested:                           more              node/24.
        5 of 6                                    hops              --slash 16
    Subject:                             --lastdIff (.ld)       through
        Number of                          different          selected
        points                              number            node/16.
        probed of                                                 --slash 8

FIG. 53

PerilScope Help                                                     https://www.internetperils.com/help/perilscope.php number                      of hops        through
        requested:                                     selected
        25 of 27                                        node/8.

Time
                                                                    The time
                                                                slider to the
                                                                right of the
                                                                graph shows
                                                                in boldface
                                                                the date and
                                                                time in GMT
                                                                at which this
                                                                dataset was
                                                                collected. If
                                                                other nearby
                                                                times are
                                                                available, they
                                                                are also
                                                                shown, and
                                                                you can select
                                                                one of them.

© 2003-2005 InternetPerils, Inc.   All rights reserved.   Privacy Policy

FIG. 54

METHOD AND APPARATUS FOR AGGREGATING, CONDENSING, SUPERSETTING, AND DISPLAYING NETWORK TOPOLOGY AND PERFORMANCE DATA

CROSS-REFERENCE TO RELATED APPLICATIONS

This application claims the benefit under 35 U.S.C. §119 (e) of U.S. Provisional Application No. 60/626,635, filed Nov. 10, 2004.

REFERENCE TO COMPUTER PROGRAM LISTING APPENDIX

This patent includes a computer program listing appendix on compact disc. Two duplicate compact discs are provided herewith. Each compact disc contains a computer program listing as follows:

| Date Created | | Size | File Name |
| --- | --- | --- | --- |
| Dec. 23, 2004 | 10:12 AM | 8917 | anim2html.pl |
| Mar. 23, 2004 | 8:38 AM | 16725 | animate.pl |
| Oct. 5, 2005 | 6:08 PM | 8661 | apwgrepos.pl |
| Dec. 7, 2003 | 7:30 AM | 181 | arrdump.pl |
| May 3, 2004 | 5:35 PM | 4174 | cgi.pm |
| Oct. 13, 2005 | 4:24 PM | 12924 | checkdest.pl |
| Oct. 22, 2005 | 3:17 PM | 6818 | checkscans.pl |
| Sep. 19, 2003 | 11:04 AM | 195 | cleanup.sh |
| Dec. 27, 2004 | 5:03 PM | 5397 | cropdata.pl |
| Nov. 10, 2005 | 11:57 AM | 112 | d.bat |
| Nov. 7, 2005 | 8:13 AM | 5977 | data2dcset.pl |
| Dec. 7, 2003 | 7:30 AM | 1683 | dateform.pl |
| Sep. 2, 2004 | 10:00 AM | 4011 | db.mk |
| Dec. 7, 2003 | 7:30 AM | 208 | dbdump.pl |
| Dec. 7, 2003 | 7:30 AM | 17 | dbtest.pl |
| Oct. 5, 2005 | 11:37 AM | 16462 | dcgetspool.pl |
| Oct. 30, 2005 | 7:44 PM | 1733 | dcgetspoolinit |
| Oct. 30, 2005 | 7:44 PM | 1717 | dcgetspoolinit.sh |
| May 19, 2004 | 10:12 PM | 4910 | dcunspool.pl |
| Jun. 16, 2004 | 3:40 PM | 922 | deletescans.pl |
| Aug. 28, 2004 | 3:44 PM | 3769 | deletestar.pl |
| Oct. 19, 2005 | 10:36 PM | 4984 | dest.pm |
| Nov. 6, 2005 | 9:54 AM | 15095 | destpast.pl |
| May 27, 2004 | 7:31 PM | 311 | diffquery.pl |
| Nov. 10, 2005 | 11:58 AM | 34 | dirlist.txt |
| Sep. 22, 2005 | 3:40 PM | 7009 | dnsfill.in |
| Sep. 22, 2005 | 4:27 PM | 7445 | dnsfill.pl |
| Nov. 25, 2004 | 12:39 PM | 165 | dnsfill.sh |
| Aug. 26, 2005 | 11:55 AM | 1116 | dnstest.pl |
| Jan. 25, 2005 | 5:43 PM | 1192 | dohash.pl |
| Oct. 18, 2005 | 7:13 PM | 14854 | doparse.pl |
| Oct. 17, 2005 | 4:30 PM | 38005 | dot.pm |
| Jul. 5, 2004 | 2:47 PM | 1204 | dot2csv.pl |
| Jul. 5, 2004 | 8:15 PM | 10816 | dot2html.pl |
| Dec. 7, 2003 | 7:30 AM | 1147 | dotprinted.pl |
| Aug. 25, 2005 | 6:59 PM | 6702 | dotps2m.pl |
| Mar. 6, 2004 | 2:39 PM | 6327 | dotrace.pl |
| Apr. 13, 2004 | 10:59 AM | 873 | dotted.pl |
| May 13, 2004 | 8:38 PM | 23583 | dprofpp.pl |
| Jan. 28, 2005 | 5:55 PM | 61131 | ers |
| Nov. 3, 2005 | 3:23 PM | 5794 | exidset.pl |
| Apr. 2, 2004 | 8:19 PM | 1369 | gen_anim_query.pl |
| Apr. 2, 2004 | 8:19 PM | 306 | gen_anim_query.sh |
| Aug. 25, 2005 | 6:38 PM | 10108 | graphjs.pm |
| Aug. 9, 2004 | 7:31 AM | 12426 | hilat.pl |
| Sep. 11, 2004 | 10:47 PM | 8922 | hoptable.pm |
| Sep. 28, 2005 | 8:31 PM | 41962 | html.pm |
| Mar. 3, 2004 | 9:47 PM | 6230 | html2index.pl |
| Sep. 6, 2004 | 8:40 AM | 215 | htmldir.sh |
| Dec. 1, 2003 | 4:32 PM | 310 | iddataday.sh |
| Dec. 1, 2003 | 7:28 PM | 271 | iddatadcds.sh |
| Aug. 17, 2004 | 7:00 PM | 335 | in-addr2idset.pl |

-continued

| Date Created | | Size | File Name |
| --- | --- | --- | --- |
| Jun. 2, 2004 | 11:01 AM | 338 | ip.pl |
| Jun. 1, 2004 | 4:18 PM | 845 | ipaddr.pm |
| Nov. 29, 2004 | 3:48 PM | 2314 | local.mk |
| Nov. 3, 2005 | 7:58 PM | 2361 | local.mk.0.115 |
| Apr. 30, 2004 | 1:09 PM | 3185 | logtrack.pl |
| Oct. 23, 2005 | 3:59 PM | 13861 | mainparam.pm |
| Nov. 3, 2005 | 7:57 PM | 23860 | makefile |
| May 31, 2005 | 1:38 PM | 62864 | makefile,v |
| Sep. 28, 2005 | 11:21 PM | 10490 | mergesets.pl |
| Aug. 25, 2005 | 6:46 PM | 6938 | nodeinfo.pl |
| Dec. 7, 2003 | 7:30 AM | 1310 | nullify.pl |
| Oct. 10, 2005 | 10:47 AM | 2906 | omitip.pm |
| Oct. 10, 2005 | 10:40 AM | 1126 | omitiptest.pl |
| Aug. 9, 2004 | 7:31 AM | 3659 | ourlock.pm |
| Oct. 18, 2005 | 2:53 PM | 60300 | perobj.pm |
| Nov. 3, 2005 | 3:23 PM | 382 | phishdata.pm |
| Mar. 8, 2005 | 12:46 PM | 527 | phishset.pl |
| Jul. 24, 2004 | 2:34 PM | 2666 | pid.pm |
| Feb. 27, 2004 | 10:24 AM | 175 | prmainparam.pl |
| Jun. 25, 2005 | 1:41 PM | 219 | pscope.xinetd |
| Jan. 12, 2005 | 3:31 PM | 36625 | pscopeanim.pl |
| Aug. 26, 2005 | 11:14 AM | 735 | pscopecreate.pl |
| Aug. 25, 2005 | 6:47 PM | 31346 | pscopedaemon.pl |
| Nov. 15, 2003 | 10:14 AM | 906 | pscopemodes.sh |
| Oct. 29, 2005 | 7:58 PM | 6796 | pscopeproc.pl |
| Oct. 30, 2005 | 10:11 PM | 21169 | pscopeprocd.pl |
| Oct. 30, 2005 | 7:42 PM | 1865 | pscopeprocdinit |
| Oct. 30, 2005 | 7:41 PM | 1849 | pscopeprocdinit.sh |
| Oct. 23, 2005 | 10:25 PM | 1721 | pscopeprocinit |
| Oct. 23, 2005 | 10:33 AM | 1706 | pscopeprocinit.sh |
| Oct. 12, 2005 | 1:50 PM | 6894 | pscopeshowsql.pl |
| Jan. 25, 2005 | 4:04 PM | 9056 | pscopesock.pl |
| Nov. 7, 2005 | 8:13 AM | 33354 | pscopesql.pl |
| Jul. 24, 2004 | 10:07 PM | 2556 | pscopetrimsql.pl |
| Oct. 17, 2005 | 11:25 AM | 13434 | pscopeversion.pl |
| Sep. 22, 2004 | 8:50 AM | 4339 | psdestquery.pl |
| Jul. 23, 2004 | 5:40 PM | 253 | psdestquery.sh |
| Sep. 23, 2005 | 6:21 PM | 17130 | psexample.pl |
| Jul. 29, 2004 | 1:35 PM | 2723 | psextract.pl |
| Oct. 20, 2005 | 8:25 PM | 5075 | psproc |
| Jul. 25, 2004 | 5:24 AM | 4712 | psunparse.pl |
| Oct. 30, 2005 | 6:51 PM | 8242 | psunspool |
| Oct. 21, 2005 | 9:37 PM | 8242 | psunspool.pl |
| Oct. 18, 2005 | 6:40 PM | 1691 | psunspoolinit |
| Oct. 18, 2005 | 6:40 PM | 1676 | psunspoolinit.sh |
| Sep. 1, 2005 | 7:44 PM | 4813 | pushsets.pl |
| Nov. 6, 2005 | 11:05 AM | 100572 | query.pm |
| Nov. 29, 2004 | 2:34 PM | 1711 | readme |
| Sep. 13, 2004 | 11:01 AM | 1096 | relocalmk.pl |
| Nov. 4, 2005 | 11:12 AM | 1325 | remoteaddr.cgi |
| Oct. 31, 2005 | 4:52 PM | 463 | remoteaddr.sh |
| Oct. 17, 2003 | 10:36 AM | 96 | rename.sh |
| Dec. 7, 2003 | 7:30 AM | 1362 | reordertraceroute.pl |
| Oct. 19, 2004 | 10:47 AM | 2989 | reprobetable.pl |
| Jan. 25, 2005 | 3:36 PM | 4608 | server.pm |
| May 3, 2004 | 5:35 PM | 133 | serverdummy.pm |
| Oct. 23, 2005 | 4:32 PM | 501 | services.lines |
| Oct. 20, 2005 | 9:12 PM | 501 | services.template |
| Jun. 26, 2005 | 12:34 AM | 2248 | session.pm |
| Sep. 1, 2005 | 8:26 PM | 6465 | setruid |
| Sep. 1, 2005 | 8:25 PM | 784 | setruid.c |
| Oct. 23, 2005 | 8:00 PM | 27048 | sets.pm |
| Oct. 22, 2005 | 11:42 AM | 6605 | showdcds.pl |
| Sep. 24, 2005 | 3:48 PM | 32849 | showsets.pl |
| Sep. 1, 2005 | 7:10 PM | 242 | showsets.xinetd |
| Oct. 30, 2005 | 6:51 PM | 6465 | showsetsclient |
| Sep. 1, 2005 | 9:14 PM | 4878 | showsetsclient.pl |
| Jun. 29, 2005 | 6:00 AM | 1237 | showsetsd.pl |
| Mar. 15, 2005 | 8:13 AM | 357 | showsetsver.pl |
| Mar. 4, 2004 | 11:04 AM | 767 | test.pl |
| Aug. 31, 2005 | 3:10 PM | 261 | testdb.pl |
| Sep. 13, 2005 | 8:20 PM | 513 | testlist.pl |
| Dec. 7, 2003 | 7:30 AM | 175 | testlog.pl |
| Jul. 31, 2004 | 11:00 AM | 1707 | testlsinterval.pl |
| Oct. 21, 2005 | 1:22 PM | 1554 | testpaths.pl |
| Dec. 7, 2003 | 7:30 AM | 293 | testslider.pl |
| Dec. 2, 2003 | 4:53 PM | 629 | testtabs.sh |

-continued

| Date Created | | Size | File Name |
|---|---|---|---|
| Jan. 3, 2005 | 2:53 PM | 3472 | batch.pm |
| Aug. 19, 2005 | 2:15 PM | 56 | dcd |
| Aug. 25, 2005 | 2:22 PM | 1163 | dcd.pm |
| Aug. 24, 2005 | 3:20 PM | 595 | dcd_contact.pm |
| Aug. 24, 2005 | 1:06 PM | 589 | dcd_groups.pm |
| Aug. 24, 2005 | 3:20 PM | 617 | dcd_groups_dcd.pm |
| Aug. 24, 2005 | 3:20 PM | 593 | dcd_interface.pm |
| Oct. 9, 2005 | 12:20 AM | 5970 | dns.pm |
| Jan. 21, 2005 | 6:58 PM | 521 | dns_a.pm |
| Jan. 3, 2005 | 2:57 PM | 551 | dns_cname.pm |
| Jan. 21, 2005 | 6:58 PM | 586 | dns_ptr.pm |
| Jan. 3, 2005 | 2:57 PM | 4842 | error_codes.pm |
| Oct. 15, 2005 | 1:20 PM | 3519 | handle.pm |
| Jan. 3, 2005 | 3:06 PM | 719 | idset.pm |
| Jan. 29, 2005 | 11:14 AM | 1752 | idset_data.pm |
| Jan. 21, 2005 | 6:44 PM | 6973 | idset_master.pm |
| Jan. 29, 2005 | 10:57 AM | 5718 | idset_version.pm |
| Nov. 29, 2004 | 3:48 PM | 2314 | local.mk |
| Aug. 31, 2005 | 3:09 PM | 31914 | meta.pm |
| Jan. 3, 2005 | 2:53 PM | 479 | nodestats.pm |
| Jan. 3, 2005 | 2:53 PM | 255 | pairs.pm |
| Jan. 3, 2005 | 2:53 PM | 263 | pair_latency.pm |
| Jan. 3, 2005 | 3:26 PM | 1502 | path_seg.pm |
| Jan. 3, 2005 | 3:26 PM | 3117 | probe.pm |
| Aug. 26, 2005 | 12:05 PM | 20878 | raw.pm |
| Aug. 24, 2005 | 12:48 PM | 3069 | scan.pm |
| Jun. 5, 2004 | 2:51 PM | 435 | t.pl |
| Nov. 15, 2004 | 9:55 AM | 221 | todo |
| Jan. 3, 2005 | 3:26 PM | 1804 | trace.pm |
| Jul. 20, 2004 | 1:21 PM | 3902 | graphbackground.jpg |
| May 31, 2003 | 4:00 PM | 363 | llcorner.png |
| May 6, 2004 | 11:02 PM | 685 | llcorner1.gif |
| May 13, 2004 | 9:01 PM | 281 | llcorner2.png |
| May 31, 2003 | 4:00 PM | 374 | lrcorner.png |
| May 6, 2004 | 11:02 PM | 421 | lrcorner1.gif |
| May 13, 2004 | 9:01 PM | 272 | lrcorner2.png |
| May 3, 2004 | 1:54 PM | 51 | readme |
| Jul. 20, 2004 | 1:21 PM | 3902 | tablebackground.jpg |
| May 6, 2004 | 11:02 PM | 685 | tlcorner1.gif |
| May 6, 2004 | 11:02 PM | 685 | trcorner1.gif |
| May 31, 2003 | 4:00 PM | 383 | ulcorner.png |
| May 13, 2004 | 9:01 PM | 283 | ulcorner2.png |
| May 31, 2003 | 4:00 PM | 374 | urcorner.png |
| May 13, 2004 | 9:01 PM | 296 | urcorner2.png |
| Sep. 28, 2005 | 3:28 PM | 15882 | about.inc |
| Dec. 13, 2003 | 12:35 PM | 55 | about.sh |
| Jan. 24, 2005 | 4:37 PM | 14777 | about.tidy |
| Dec. 4, 2003 | 8:47 AM | 2147 | about0.inc |
| Dec. 4, 2003 | 8:47 AM | 2252 | aboutanimation.inc |
| Feb. 1, 2004 | 11:19 PM | 214 | autolarrow.gif |
| Feb. 1, 2004 | 11:19 PM | 176 | autorarrow.gif |
| Feb. 1, 2004 | 11:17 PM | 607 | autorarrow.ps |
| Sep. 15, 2003 | 4:52 PM | 978 | benefits.inc |
| Sep. 15, 2003 | 5:35 PM | 153 | benefitsanimation.inc |
| May 22, 2004 | 7:59 PM | 468 | bottitle.inc |
| Dec. 13, 2003 | 12:50 PM | 316 | help.html |
| May 5, 2004 | 9:10 PM | 407 | ownaddr.inc |
| May 3, 2004 | 1:54 PM | 1016 | readme |
| Dec. 23, 2004 | 10:20 AM | 1090 | toptitle.inc |
| May 31, 2003 | 3:26 PM | 323 | corner.png |
| May 31, 2003 | 3:26 PM | 323 | llcorner.png |
| May 31, 2003 | 3:26 PM | 312 | lrcorner.png |
| May 31, 2003 | 3:26 PM | 323 | ulcorner.png |
| May 31, 2003 | 3:26 PM | 323 | urcorner.png |
| Jul. 15, 2004 | 11:17 PM | 106 | dummy.inc |
| Jul. 16, 2004 | 9:14 AM | 1010 | index.php |
| Nov. 29, 2004 | 3:48 PM | 2314 | local.mk |
| Nov. 3, 2005 | 7:57 PM | 23860 | makefile |
| Aug. 28, 2005 | 2:51 PM | 267 | perilscopemenu.inc |
| Nov. 1, 2005 | 3:59 PM | 2851 | perilsnap.php |
| Jul. 15, 2004 | 11:29 PM | 621 | readme |
| May 31, 2003 | 3:36 PM | 425 | corner.png.0 |
| May 31, 2003 | 3:36 PM | 259 | corner.png.1 |
| May 31, 2003 | 3:36 PM | 259 | corner.png.2 |
| May 31, 2003 | 3:36 PM | 259 | corner.png.3 |
| May 13, 2004 | 8:51 PM | 910 | corner.ps |
| May 31, 2003 | 3:47 PM | 19 | endcorner.ps |
| May 31, 2003 | 3:48 PM | 3 | ll.ps |
| May 13, 2004 | 9:00 PM | 281 | llcorner.png |
| May 13, 2004 | 9:00 PM | 1038 | llcorner.ppm |
| May 13, 2004 | 9:00 PM | 932 | llcorner.ps |
| May 31, 2003 | 3:48 PM | 3 | lr.ps |
| May 13, 2004 | 9:00 PM | 272 | lrcorner.png |
| May 13, 2004 | 9:00 PM | 1038 | lrcorner.ppm |
| May 13, 2004 | 9:00 PM | 932 | lrcorner.ps |
| May 31, 2003 | 3:52 PM | 716 | makefile |
| May 3, 2004 | 1:55 PM | 47 | readme |
| May 31, 2003 | 3:48 PM | 3 | ul.ps |
| May 13, 2004 | 9:00 PM | 283 | ulcorner.png |
| May 13, 2004 | 9:00 PM | 1038 | ulcorner.ppm |
| May 13, 2004 | 9:00 PM | 932 | ulcorner.ps |
| May 31, 2003 | 3:48 PM | 3 | ur.ps |
| May 13, 2004 | 9:00 PM | 296 | urcorner.png |
| May 13, 2004 | 9:00 PM | 1038 | urcorner.ppm |
| May 13, 2004 | 9:00 PM | 932 | urcorner.ps |
| May 13, 2004 | 9:01 PM | 160 | z |
| May 31, 2003 | 3:51 PM | 0 | llcorner.png |
| May 31, 2003 | 3:52 PM | 0 | lrcorner.png |
| May 31, 2003 | 3:51 PM | 0 | ulcorner.png |
| May 31, 2003 | 3:51 PM | 0 | urcorner.png |
| Oct. 16, 2005 | 10:17 AM | 6628 | dcd.pm |
| May 12, 2004 | 3:29 PM | 4227 | dcdata.pm |
| Oct. 21, 2005 | 2:55 PM | 9331 | dcset.pm |
| Oct. 21, 2005 | 9:07 PM | 7035 | dcspool.pm |
| Dec. 24, 2004 | 7:55 PM | 4258 | iddata.pm |
| Oct. 13, 2005 | 2:25 PM | 6762 | idset.pm |
| Nov. 29, 2004 | 3:48 PM | 2314 | local.mk |

FIELD OF THE INVENTION

The invention relates generally to network topology and performance. In particular, the invention relates to visualizing network performance and graphically displaying of nodes, edges, and latency in a network.

BACKGROUND OF THE INVENTION

As commerce continues to embrace the Internet and to become dependent upon it, events happen that enterprises cannot control directly. For example, reputable researchers conservatively estimate a single worst-case worm could cause $50 billion dollars in economic damages in the United States alone. [Nicholas Weaver and Vern Paxson, "A Worst-Case Worm," The Third Annual Workshop on Economics and Information Security (WEIS04), Digital Technology Center, University of Minnesota (May 13-14, 2004).] Worldwide, CEOs of major corporations fear a $100 billion dollar global risk event. ["Silently preparing for the $100 billion cyber-catastrophe risk," News Alert, mi2g (16 Feb. 2004).]

Many smaller Internet events happen more frequently, for example: a slow link several hops out; redundant web servers that turn out to be on nonredundant paths; congestion affecting multiple enterprises simultaneously; cable cuts; or a worm that causes collateral damage through an ISP neighbor's unpatched servers. Unfortunately, such force majeure risks are invisible to the enterprises impacted by these risks.

Regarding Internet performance, methods for collecting data, detecting perils, characterizing perils, detecting anomalies, and characterizing anomalies are known. Unfortunately, at present this information cannot be adequately displayed graphically. In particular, graphical information regarding nodes, edges, and latency of interest in a network cannot be displayed in an on-going, interactive mode.

Thus, there is a long-felt need to provide a means to graphically display the above referenced risks, including context about extent and duration. Specifically, this display is needed by insurance brokers with respect to selling related insurance, by network engineers and financial officers to discuss network problems, by government agencies and other sources of reputation systems to alert industry and the public to specific problems, and by companies to explain problems to their customers.

SUMMARY OF THE INVENTION

The invention broadly comprises a computer-based method for presenting information regarding network performance and topology. The steps of the method include: displaying a first plurality of nodes in the network; displaying edges associated with the first plurality of nodes; and displaying latency associated with the edges. The preceding steps, and those that follow, are performed by at least one general-purpose computer specially programmed to perform these steps. In some aspects, the method selects the first plurality of nodes.

In some aspects, the network comprises a plurality of ISPs with respective pluralities of nodes and the respective pluralities of nodes comprises the first plurality of nodes. In some aspects, displaying a first plurality of nodes, edges, and latency is independent of cooperation from the plurality of ISPs.

In some aspects, the method gathers information regarding the first plurality of nodes from vantage points outside the first plurality of nodes. In some aspects, the gathers gathering information from only one the vantage point. In some aspects, the first plurality of nodes comprises hardware and the vantage points are separate from the respective hardware.

In some aspects, the method periodically updates the information and updates the displaying of the first plurality of nodes, the edges, and the latency responsive to the updated information. In some aspects displaying the first plurality of nodes further comprises panning to a first node in the first plurality of nodes and zooming to show at least one second node in the first plurality of nodes.

In some aspects, the network comprises a second plurality of nodes and the first plurality of nodes includes the second plurality of nodes. In some aspects, the first plurality of nodes and the edges comprise a plurality of hops and the method displays the plurality of hops. In some aspects, the network comprises gradations of packet loss and the method displays the gradations. In some aspects, the network comprises a third plurality of nodes and the method: accepts data regarding the third plurality of nodes; identifies at least one node in the third plurality that does not have address or performance metrics recorded in the data; identifies at least one edge terminating at the at least one node in the third plurality; and displays the at least one node in the third plurality and the at least one edge.

In some aspects, the network comprises a fourth plurality of nodes and the method: accepts data regarding the fourth plurality of nodes; supersets at least one node in the fourth plurality that is not included in the data; and displays the at least one node in the fourth plurality. In some aspects, displaying the first plurality of nodes in the network, displaying the edges associated with the first plurality of nodes, and displaying the latency includes generating respective pluralities of the displays for the first plurality of nodes, the edges, and the latencies over a duration of time and displaying an animation of the respective pluralities of the displays for the first plurality of nodes, the edges, and the latencies. In some aspects, the method generates a composite topology of the displays for the first plurality of nodes, the edges, and the latencies over the duration of time.

The invention also broadly comprises a computer-based apparatus for presenting information regarding network performance and topology.

It is a general object of the present invention to provide a computer-based method and apparatus to display graphically, Internet topology and performance data.

These and other objects and advantages of the present invention will be readily appreciable from the following description of preferred embodiments of the invention and from the accompanying drawings and claims.

DETAILED DESCRIPTION OF THE PREFERRED EMBODIMENT

Figure 1:
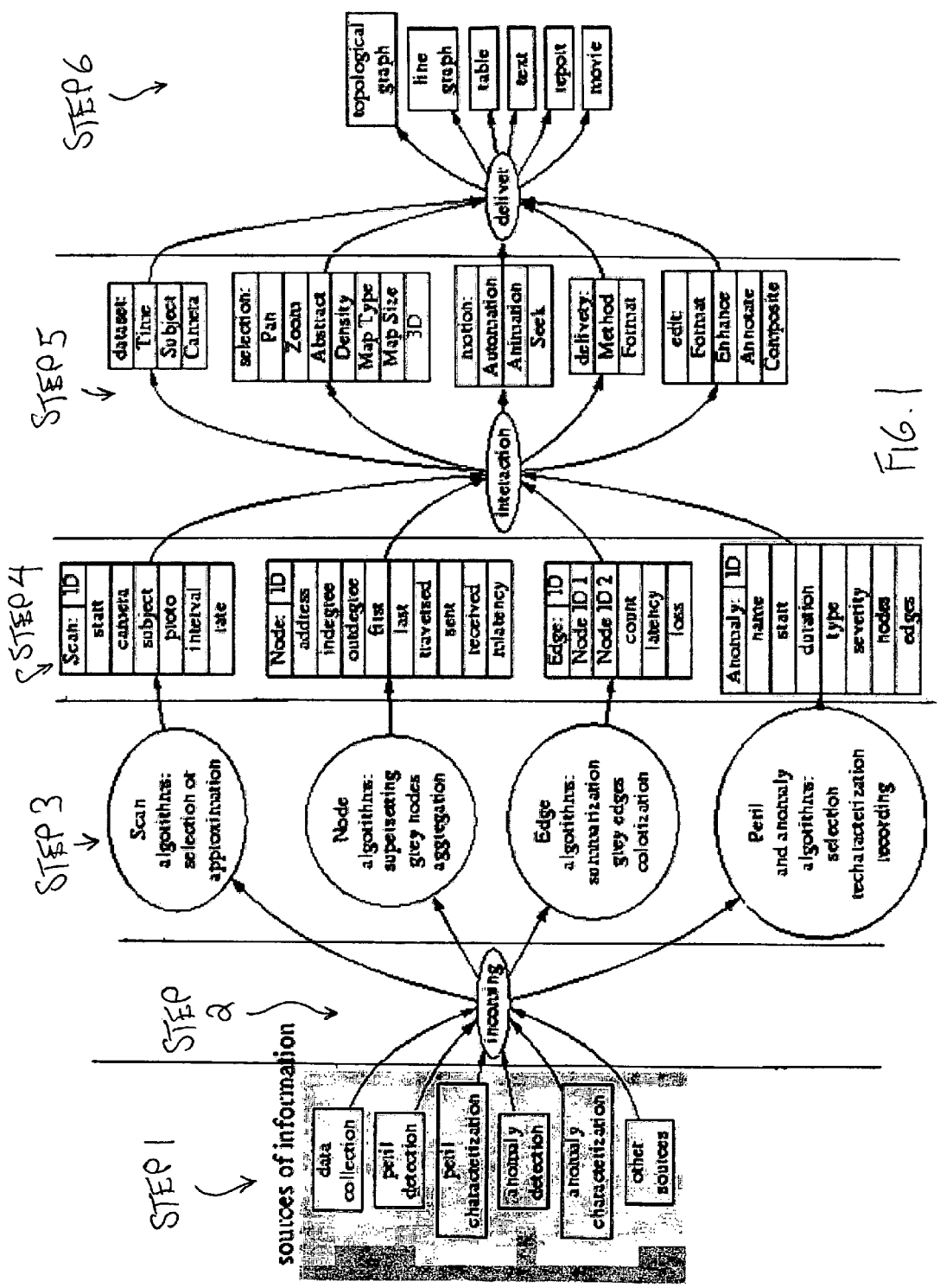
FIG. 1 is a flow chart of a present invention method.

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In the descriptions and examples that follow, specific colors, shapes, and configurations are used. However, it should be understood that other colors, shapes, and configurations can be used and such colors, shapes, and configurations are within the spirit and scope of the invention as claimed.

The following is an overview of the present invention method. The invention uses information about the Internet that is collected and processed by other means to detect and categorize certain features. The invention can also be applied to similar information about other networks. In some aspects, the types of information described below are used in the present invention. However, it should be understood that other types of network information can be used with the invention and that the use of such information is included in the spirit and scope of the invention as claimed.

Data Collection: Appropriate data collection must gather Internet performance data using techniques that simultaneously record topology (including routes, paths, and changes over time) and performance (including loss and latency). The techniques used must be able to measure a significant proportion of the critical infrastructure of the entire Internet.

Peril Detection: Appropriate peril detection must be able to detect perils that are significant both across large parts of the Internet and in smaller parts, whether geography, topology, or by industry.

Peril Characterization: Appropriate peril characterization should assign characteristics such as type, severity, duration, and effects to each detected peril. Types of perils may include nonredundant links or nodes, or congestion, or chronic congestion.

Anomaly Detection: Appropriate anomaly detection must be able to detect anomalies that are significant both across large parts of the Internet and in smaller parts specific to a particular domain, such as geography, topology, or by industry.

Anomaly Characterization: Appropriate anomaly characterization should assign characteristics such as type, severity, duration, and effects to each detected anomaly. Types of anomaly may include denial of service (DoS) attacks, worms, congestion, routing flaps, and other degradation, denial, or disconnection of Internet connectivity.

The invention can produce topological graphs and time-series line graphs and provides both interactive and automated methods for selecting graphs. A topological graph produced by the invention shows nodes and edges near a selected focus node. Nodes and edges of different types may be distinguished by different colors, shapes, and styles. All this information may be rendered using one or more different underlying graph drawing mechanisms that are not part of the invention. The invention may provide to a given user any of a number of interactive features for panning to a focus node, zooming to show nodes and edges within a certain number of edges from the focus node, choosing a set of destinations and a set of cameras, moving in time, automation, and animation, among others.

For topological graphs, nodes and edges are shown in different color spaces, typically nodes in blues and cyans, with edges in traffic light colors: red, yellow, and green. There may be specific color space exceptions for certain types of nodes, such as the selected node and destinations.

Each node displayed is shown as a box or other shape with an address or name written on it. Different types of nodes are distinguished visually. The selected focus node is shown in pink with multiple peripheries. Destinations used in collecting the data are shown as green ellipses if reached, or as red octagons if not reached. Most other nodes are shown in colors representing operational groupings of nodes, such as netblocks, Autonomous Systems, or ISPs. These colors are selected from a color space with hues from green through cyan to blue.

Grey data nodes are data nodes that do not have addresses or performance metrics recorded in the data. The invention depicts unrecorded data nodes as grey display nodes with distinctive graphical features, such as having a grey background color. In some cases the invention may condense a consecutive series of unrecorded data nodes into single grey display node. Such condensed grey nodes are typically shown as black outlines. Hubs are distinguished by size: the more edges connected to a node, the bigger it is.

Edges between nodes are shown in colors to indicate latency. For example: red for slow, green for fast, several hues of chartreuse, yellow, and orange in between, plus blue for negative latency, and grey for edges for which there is no data.

Graphs may be determined by use of parameters including, but not limited to, the following:

Zoom—sets a limit on which nodes will be displayed, according to distance in number of edges from the selected focus node.

Pan—selects the focus node, either through text entry, pull-down menu, or clicking on a node displayed on the graph.

Abstract—displays only nodes that have certain characteristics such as a minimum number of edges connected to them.

Time—determines the data collection time or times to display

Subject—determines a set of destinations in order limit the paths (sequences of nodes and hops) displayed.

Camera—determines the combination of data sources to use.

Density—determines which of one or more Zoom algorithms to use.

Map Type—determines which topological graph, table, time-series graph, or other display format to use.

Map Size—determines the display dimensions to use for the graph.

3D—determines which of several dimensions to depict as the third dimension in a three dimensional display.

Automation—steps through a series of one or more of the above interactive capabilities.

Animation—produces an external animated representation of one or more of the above interactive capabilities. Animation over time involves first compiling a composite topology of all the nodes and edges for all the scans during the time interval, and then making nodes and edges corresponding to each scan visible frame by frame.

Seek—may produce a new graph for the next anomaly or peril in sequence.

Delivery—determines which delivery mechanism and format to use.

Reports—may include time-series graphs, tables, or text. The invention may annotate the graph or interactively display related data such as address, name, or performance statistics.

Enhance—may annotate nodes or edges with name or other information.

Annotate—may add arbitrary graphical or textual annotations to the graph.

FIG. 1 is a flow chart of a present invention method. In Step 1, data collection, and peril and anomaly detection and characterization, as well as collection of information from other sources such as carriers or news media, are performed by various external means and used by the invention as incoming information. In Step 2, the invention fuses the data from Step 1. In Step 3, the invention applies algorithms to decide which scans, nodes, edges, perils, anomalies, and other information to record, and with what detail. In Step 4, the invention records scans, nodes, edges, perils, and anomalies, and other information. In Step 5, the user may interactively choose dataset, selection, motion, delivery, or editing parameters. However, such interaction is not required. In Step 6, the invention takes into account the parameters to deliver output. The output may include topological graphs, line graphs, tables, or text, and may be delivered as reports or movies, or as a navigable three dimensional space. The parameters can be manually selected by a user, can result from queries generated by the invention, or can be a combination of the two.

Figure 2:
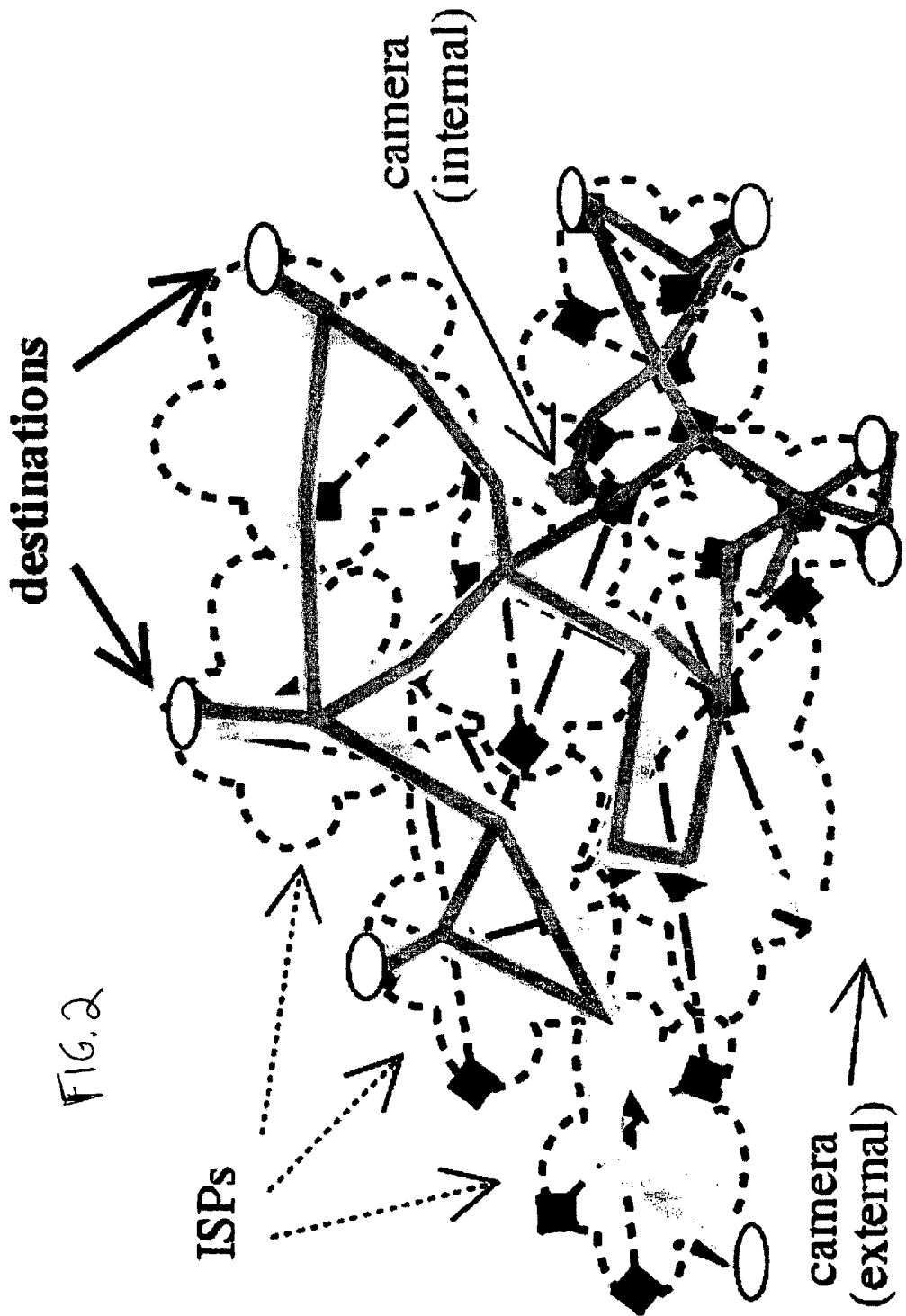
FIG. 2 depicts a network and a type of data collection that may be used to measure the network.

FIG. 2 depicts a network and a type of data collection that may be used to measure the network. The network to be estimated is depicted as several ISPs, depicted as clouds. Each ISP includes several routers, depicted as black boxes, with links between them, depicted as lines with alternating dashes and dots (dash-dotted). ISPs may have peering points between them, depicted as black boxes that have edges connecting to more than one ISP. ISPs may have servers, depicted as black boxes at their borders that do not have edges connecting to another ISP.

Data collection may be determined partly by destinations, which are indicated on the figure by ellipses. Data collection may record paths to destinations, including some routers and links on those paths, recorded as nodes and edges; paths are depicted on the figure as grey lines. Data collection may be accomplished by cameras that send probes to destinations; two cameras are depicted as grey circles. Data collection from different cameras may overlap, depicted as edges with more than one grey line. Each camera may collect some data not seen by other cameras, depicted as edges with only one grey line. Some parts of the network may be unseen by any camera, depicted as dash-dotted lines with no corresponding grey lines.

Figure 3:
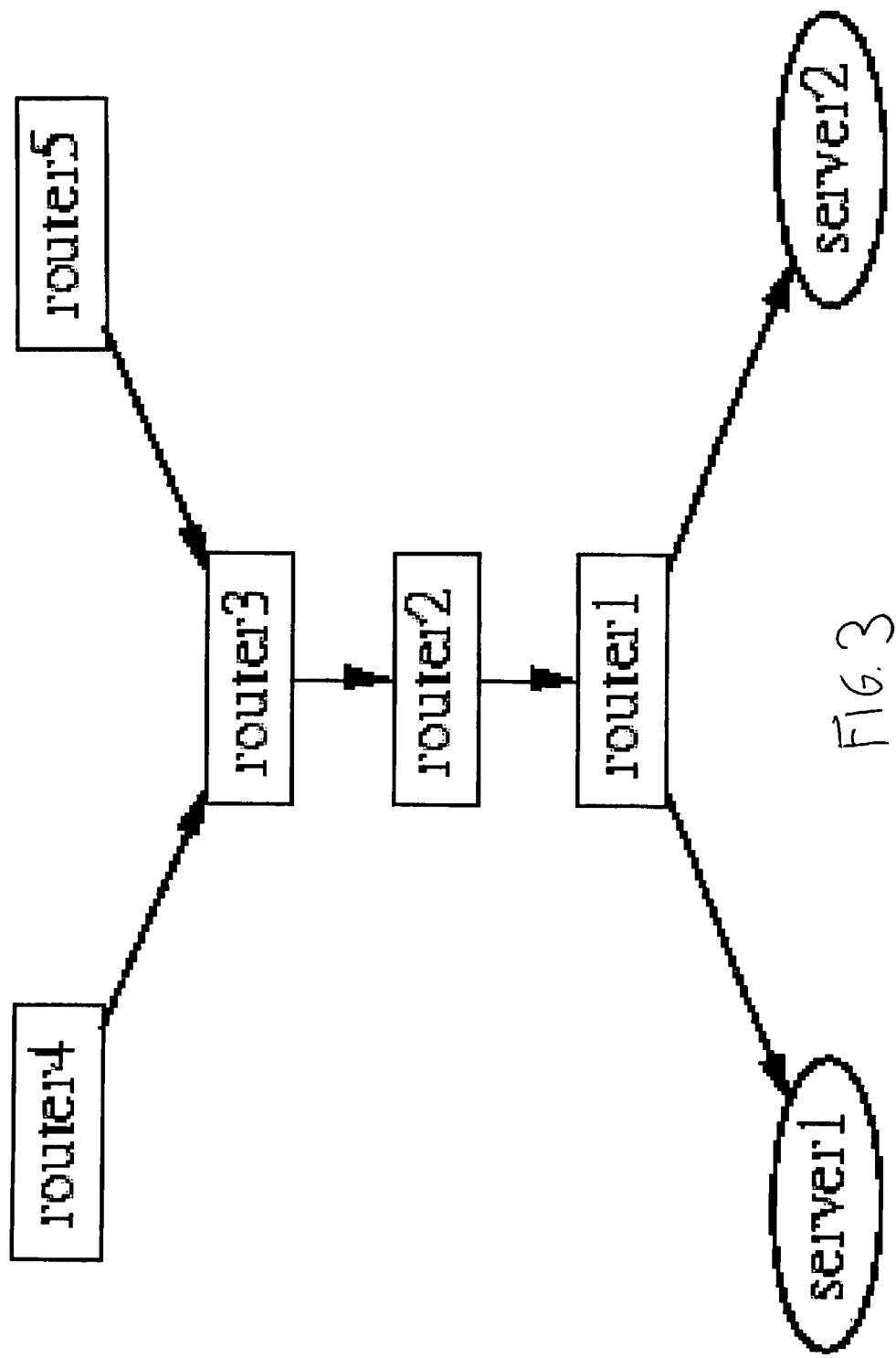
FIG. 3 illustrates an example peril, a nonredundant route.

FIG. 3 illustrates an example peril, a nonredundant route.

The following is a more detailed discussion of the present invention method. The invention uses data from ongoing comprehensive measurement of Internet or other network topology for nonredundancy or overload (perils), as well as of actual variations in accessibility or performance (anomalies). The invention then aggregates, condenses, and supersets that data, along with information from other sources, and displays it in graphical and other forms.

For incoming topology data the invention records certain information per scan, node, edge, and anomaly. The invention may also record other information relevant to the particular type of incoming data, or to the particular type of display requested.

Regarding data fusion, in some aspects, the invention obtains destinations as either domain names or IP addresses. For a destination as a domain name, a DNS server is used. For an address, a DNS server is used to look up the name. In some aspects, for intermediate hops leading to destinations, data collection provides IP addresses for the nodes that respond. A DNS is used to look up domain names for those addresses. When a geographical location of a node is of interest, a domain name registry is used to look up physical locations used in domain registrations, and information encoded in domain names of nodes, especially in intermediate nodes, is used. For example, many ISPs use three letter airport codes to encode location, e.g., sjc usually indicates San Jose, Calif. In some aspects, ISP maps published by the ISPs themselves are consulted. However, such map information is used carefully, since these maps may be out of date, may not show the entire ISP, and do not show much beyond a single ISP. In some aspects, the invention also uses maps of physical infrastructure such as undersea cables.

In some aspects, the invention uses latency, especially latency along multiple hops to a node, as a distance indicator. The lower the latency, the closer the two nodes on each side of a hop are presumed to be. In some aspects, the invention aggregates latency over many probes per hop. In some aspects, the invention calibrates latency over time by comparing among multiple frequent regular scans. In some aspects, especially related to anomalies, the invention uses other external information such as reports in news media and communications from professionals in the field. The invention enables the selection of data to display, the selection of focus nodes, the determination of how closely to zoom on focus nodes, the choice of various formats to display the results, and additional data collection.

The incoming data is assumed to be collected at least once and preferably periodically. For each scan in the incoming data the invention records information including but not limited to the following:
    scan ID: a unique identifier
    starttime: the time data collection started for this scan
    camera: identifier of the computer that collected the data
    subject: a set of destinations the camera probed
    protocol: data collection protocol
    interval: interval between scans
    rate: data collection rate (probes/sec)
For each node in the incoming data the invention records information including but not limited to the following:
    scan ID
    node ID: a unique identifier
    node address: for the Internet, the IP address
    indegree: number of incoming edges
    outdegree: number of outgoing edges
    firstinpath: how many times the node was first in a data collection path
    lastinpath: how many times the node was last in a data collection path
    traversed: how many times the node was traversed by the data collection
    probessent: how many probes were sent to this node
    probesreceived: how many probe responses were received from this node
    mlatency: median latency over all probe responses from this node. In the case of the Internet, latency is round trip time from when a probe was sent to when its response was received, typically measured in milliseconds. For other networks, latency may be some other similar metric. In particular, the present invention advantageously correlates indegree, outdegree, firstinpath, lastinpath, and traversed with other topological data recording format.

For each edge in the incoming data the invention records information including but not limited to the following:
    scan ID
    edge ID: a unique identifier
    first node ID
    second node ID
    count: times this edge was seen in the data
    latency: median latency
    loss: percentage of responses not seen per probes sent
Edges are ordered; the same two nodes in opposite order define a different pair. Latency for an edge is the difference in latency to the second node minus latency to the first node.

Perils and Anomalies are both recorded in the same format, with information including but not limited to the following: Anomaly ID, name, start, duration, type, severity, nodes affected, and edges affected.

The invention may choose to select some incoming perils or anomalies to record and to ignore others. The invention may recharacterize a peril or anomaly, including deciding that an incoming peril is actually an anomaly or an incoming anomaly is actually a peril. The invention may also itself detect or characterize and record perils or anomalies that were not already detected or characterized in the incoming sources of information.

The invention may store other information in formats and with detail appropriate to calibrating, selecting, annotating, enhancing, or otherwise modifying its output. The invention uses the values of a number of parameters to determine which graph to display and how to display it. The dataset parameters determine what part of the incoming data to use:
    Time—determines the data collection time or times to display. The invention finds the scan nearest the requested time.

Subject—determines a set of destinations in order to limit the paths (sequences of nodes and hops) displayed. The number of destinations in the set can range from one to as many or more than the number of destinations recorded by the cameras in the scan.

Camera—determines the combination of one or more data sources to use. The invention uses these parameters to select a scan, which it refers to by its scan ID.

The selection parameters determine what portion of a dataset to display, and in what form:

Pan—selects the focus node, by name or address. In addition to a specific focus node, Pan can be set to a special name, "mostedges," which causes the invention to select from the dataset the node that has the most edges.

Zoom—sets a limit on which nodes will be displayed, according to distance in number of edges from the selected focus node.

Abstract—displays only nodes that have certain characteristics such as a minimum number of edges connected to them. Abstract typically shows a subset of the nodes that would be shown by zoom, and some abstracted edges between abstract nodes.

Density—determines which of one or more Zoom algorithms to use. For example, density zero means look outward Zoom edges from the focus node, while density one means also look backwards from each node as the algorithm looks outward, thus producing a denser graph.

Map Type—determines which topological graph, table, time-series graph, or other display format to use.

Map Size—determines the display dimensions use for the graph.

3D—determines which of several dimensions to depict as the third graphical dimension in a three dimensional display.

In addition to static displays, the invention supports iterating through multiple graphs in several different ways, according to the motion parameters, which may include but are not limited to the following:

Automation—steps through a series of one or more of the above interactive capabilities.

Animation—produces an animated representation of one or more of the above interactive capabilities. Animation over time involves first compiling a composite topology of all the nodes and edges for all the scans during the time interval, and then making nodes and edges corresponding to each scan visible frame by frame.

Seek—may produce a new graph for the next anomaly or peril in sequence.

In addition to the motion parameters listed, there are others to select start times, time intervals, direction, what to do at end of interval, etc.

The invention supports multiple delivery methods and formats for most output types. Delivery methods may include but are not limited to URL and file. Delivery formats may include but are not limited to HTML, GIF, PNG, PostScript, and PDF. For animations, delivery formats may include animated GIF, Java, Flash, MPEG, or other formats.

The invention supports automatically and interactively packaging, enhancing, and annotating its output to produce reports. Editing functions may include, but are not limited to:

Reports—may include time-series graphs, tables, or text. The invention may annotate the graph or display automatically with related addresses or names.

Enhance—may annotate nodes or edges with name or other information

Annotate—may add arbitrary graphical or textual annotations to the graph.

Supersetting Algorithm: Destinations which are not reached are added to the node and edge tables if they are not present in the incoming data, and are distinguished graphically when displayed, for example as red octagons. Destinations which are reached typically do appear in the data, and are also distinguished graphically, for example as green ellipses. Cameras, which are the computers that send probes, often do not have network addresses recorded in the incoming data. They are each given a name (taken from the incoming data or added by the invention) and that name is used as a node name.

Grey Node Algorithm: The invention can display nodes that have partial or no data in the incoming data. Other nodes which have partial or no data in the incoming data are called unrecorded data nodes. As the incoming data is parsed by the invention, each sequence of consecutive unrecorded data nodes is condensed into a single grey node with a name derived from the name of the last recorded node before the grey sequence (or if there was none, the name of the camera) and a number indicating the number of unrecorded data nodes in the sequence.

Unrecorded data nodes may occur for several reasons:

Nonresponding node: A particular node did not respond at the time it was probed, indicating packet loss. Supersetted destinations are usually nonresponding nodes.

Opaque node: The physical network node never responds to the probe type.

Not probed: No probe was sent to that node.

Not recorded: A probe may have been sent, but the result was not recorded, perhaps due to some technical error. Cameras are often not probed and sometimes opaque.

Aggregation Algorithm: As incoming data is parsed, counts, latencies and other parameters for nodes and edges are compiled across data for all cameras and destinations selected for each scan. For aggregation, supersetted cameras and destinations and grey nodes are treated the same as responding nodes. That is, supersetting and grey node determination is done first, and then the resulting nodes are aggregated across cameras or times.

Performance information for a recorded edge is summarized during aggregation, typically by taking the median of latency values seen for all instances of an edge seen in the data. Packet loss is computed as the percentage of responses received to probes sent. The present invention enables the visualization of gradations of packet loss, rather than being restricted to showing packet loss only if all packets are lost.

Grey Edge Algorithm: A grey edge is an edge terminating in a grey node. Since grey edges indicate edges that do not have corresponding performance information, a grey edge is depicted without the color, width, texture, or textual information that would apply to a non-grey edge. Since a supersetted destination is normally a nonresponding node, it will usually be connected by a grey edge.

Zoom Algorithm: The Zoom algorithm consists of recursive calls on subroutines indicated by the following pseudo-code:

Start with $node set to the selected focus node and $sepdegrees set to the Zoom level.

dosepdegrees(1, −1, $node, $sepdegrees);

+1-512-272-8506-13 of 18-per ils@internetper ils.com

PPA, InternetPer ils, Inc. Displaying Network Topology and Performance Data

Decide whether to record this node, and whether to recurse.

```
sub dosepdegrees {
my ($inout, $direction, $node, $sepd)=@_;
$dosepnodes{$node}++; # remember this node for display
if($direction==-1) {
&itsepdegrees(1, 0, $node, prevhop, $sepd);
&itsepdegrees(1, 1, $node, nexthop, $sepd);
return;
}
--$sepd;
if ($sepd<=0) {return; }
# Go on further in the same direction.
my $h=prevhop; if ($flag) {$h=nexthop; }
my $six=$inout. ":". $node;
my $wassepd=$limitsepdegrees {$six};
if ($wassepd<$sepd) {
$limitsepdegrees{$six}=$sepd;
itsepdegrees($inout, $flag, $node, $h, $sepd);
}
if (!$bothways) {return; } # Low Density.
# High density.
# Go backwards.
if ($flag) {$flag=0; } else {$flag=1; }
if ($inout) {$inout=0; } else {$inout=1; }
# We can go through the same node from different directions
with diff$sepd.
$six=$inout. ":". $node;
$wassepd=$limitsepdegrees{$six};
if ($wassepd<$sepd) {$limitsepdegrees{$six}=$sepd; }
else {return; }
$h=prevhop; if ($flag) {$h=nexthop; }
itsepdegrees($inout, $flag, $node, $h, $sepd);
}
# Edge index.
sub pair2ix {
my $from =shift;
my $to =shift;
return("$from $to");
}
+1-512-272-8506-14 of 18-per ils@internetper ils.com
PPA, InternetPer ils, Inc. Displaying Network Topology and
Performance Data
# Call dosepdegrees for each hop one degree farther in the
same direction.
sub itsepdegrees {
local($inout, $flag, $node, $h, $sepd)=@_;
local($t, $ix, $m, $node, @intags);
@intags=0;
foreach $t (split(/ /, ${$h} {$node})) {
next unless $t;
push(@intags, $t);
if ($flag) {$ix=&pair2ix($tag, $t); }
else {$ix=&pair2ix($t, $tag); }
if (!$pairseen{$ix}++) {# Record edges for display.
$tag2pairseen{++$tag2pairseen}=$ix;
}
}
foreach $node ({fourth root}intags) {
dosepdegrees($inout, $flag, $node, $sepd);
}
}
```

The Abstract algorithm is a modification to the Zoom algorithm that records for display only nodes that have at least as many edges as the Abstract level, and only edges that connect such nodes. For any pair of nodes selected by the Abstract algorithm for display that are not directly connected by a single edge, yet are connected by a path of multiple edges that does not traverse any other such node, the Abstract algorithm records for display a condensed edge representing the longer path.

Composite Animation Algorithm: Individual topological graphs produced interactively may be rendered with nodes and edges in different places on the graphs, even if the graphs use identical parameters except for time. Animation over time requires keeping the locations of nodes fixed from frame to frame so the viewer can see more significant changes between frames. To accomplish this purpose, animation over time involves first compiling a composite topology of all the nodes and edges for all the scans during the time interval. Each frame for a time in the animation period is produced by making the nodes and edges corresponding to the scan for that time visible, and making the display attributes of the nodes (color, size, shape, style, label, etc.) and edges (color, style, label, etc.) correspond to the attributes for the scan.

Figure 4:
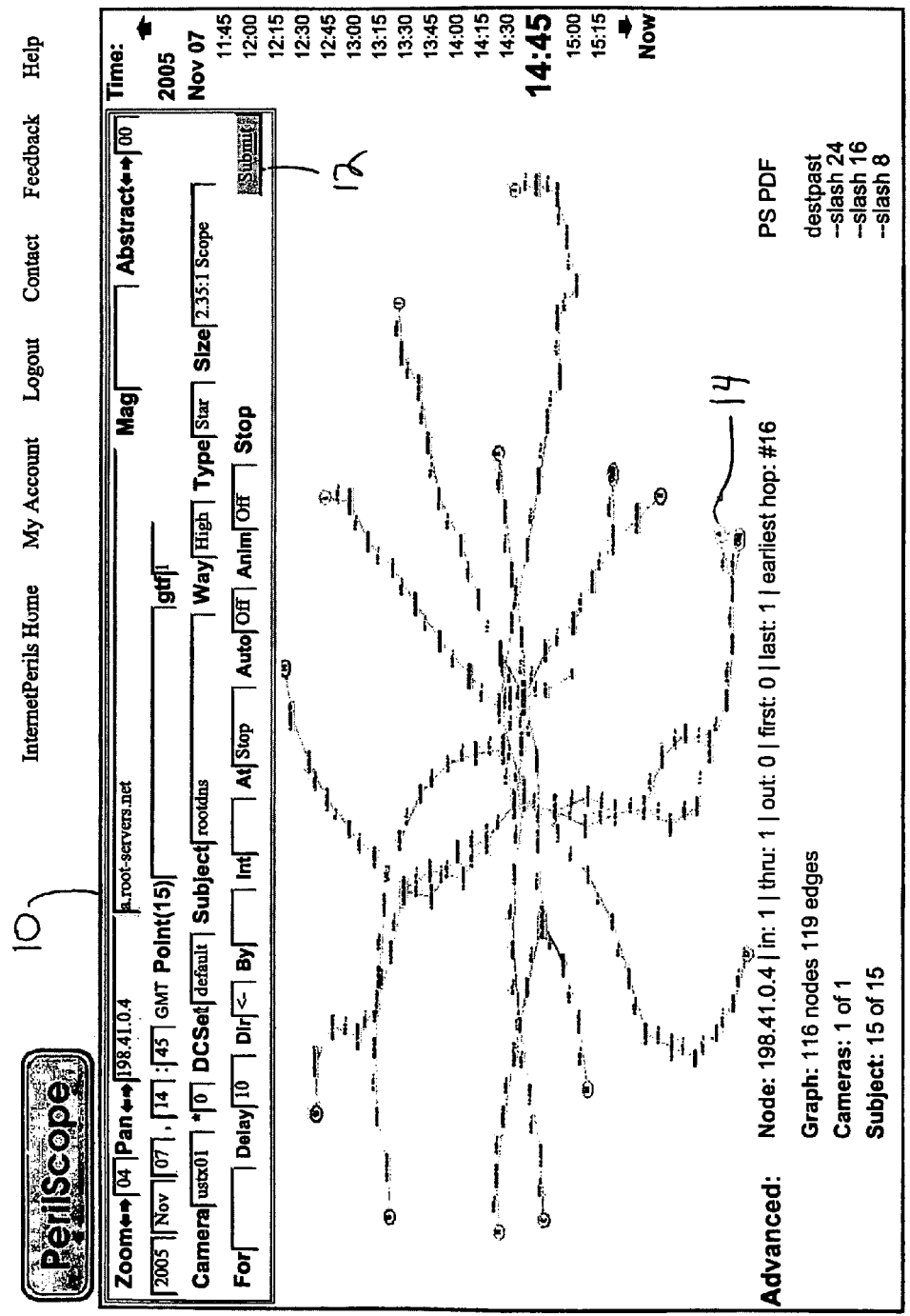
FIGS. 4 through 14 are screen captures showing features of a present invention method and device.
Figure 5:
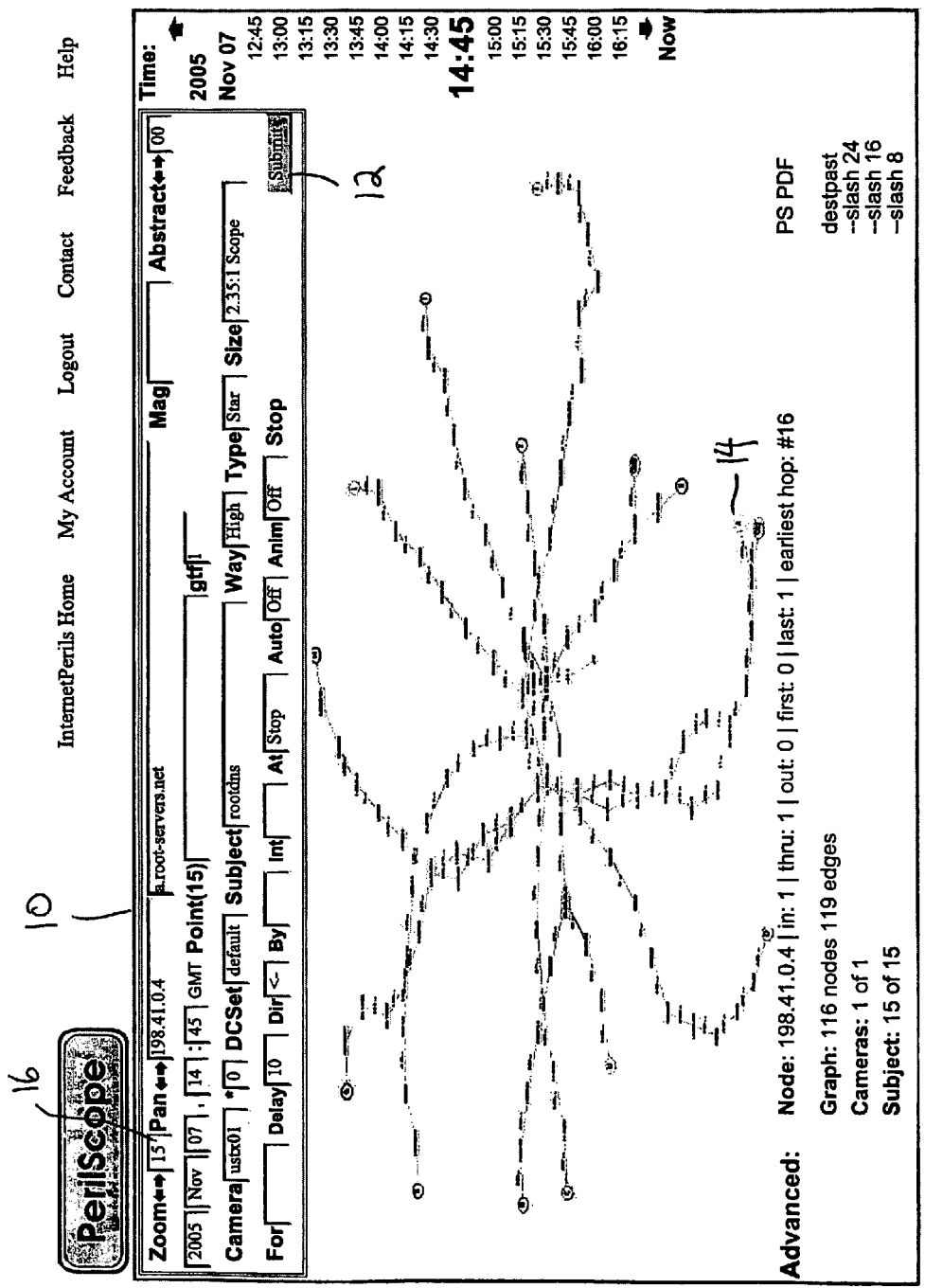
Figure 6:
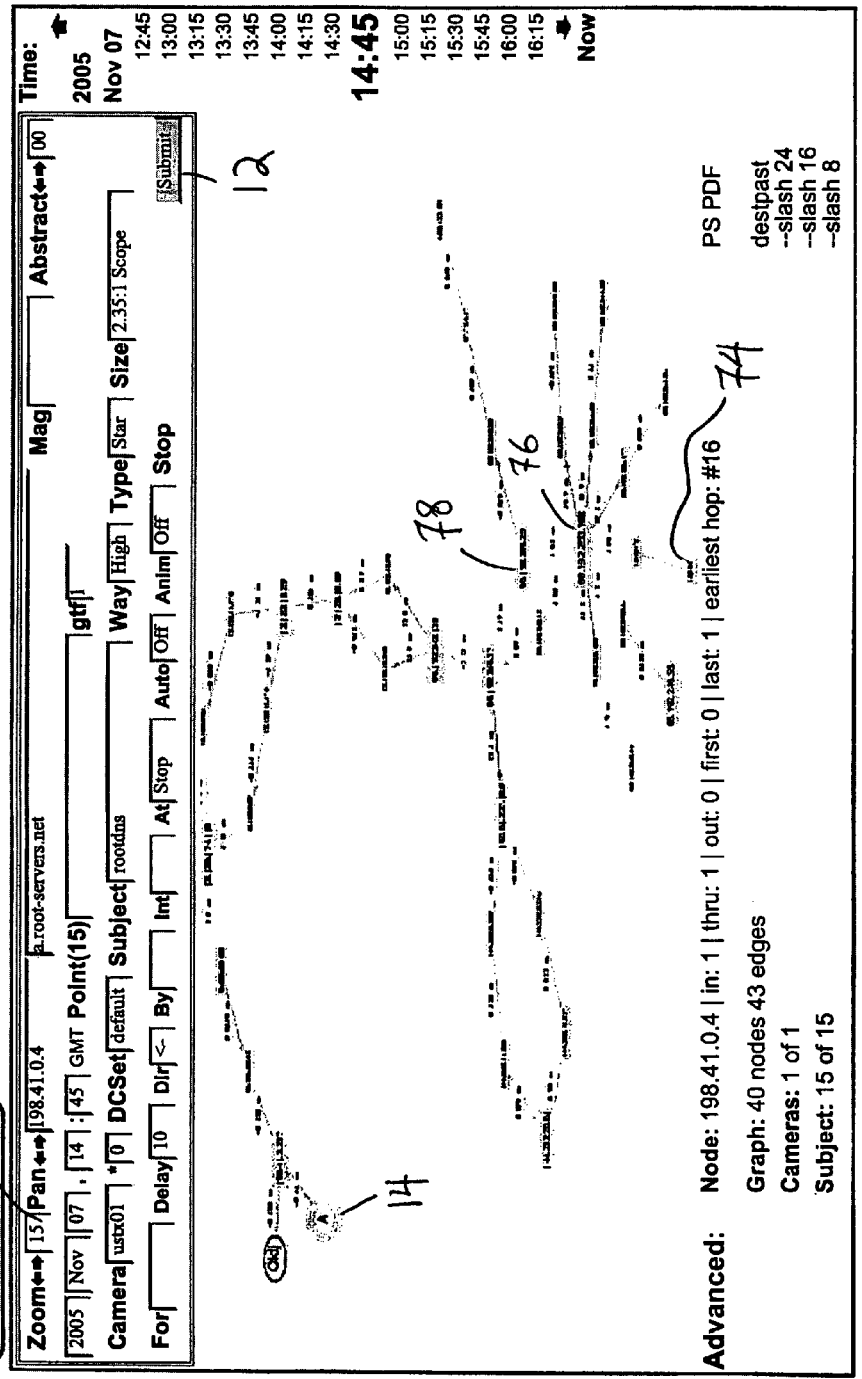
Figure 7:
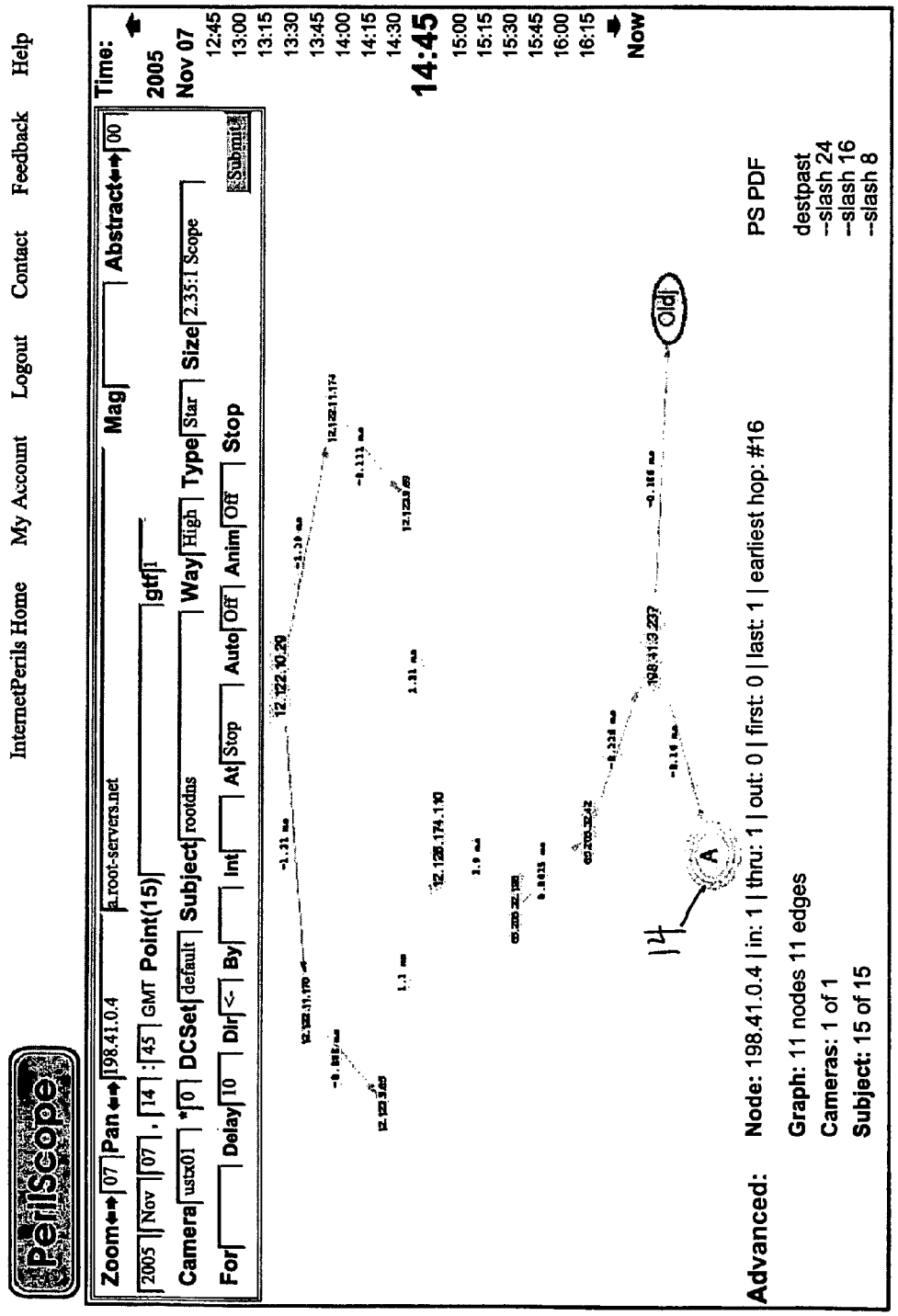

FIGS. 4 through 14 are screen captures showing features of a present invention device. FIG. 4 shows large view of the root DNS servers, showing the most recent scan. In some aspects, this is the usual starting point for the device. To pan, the user can pull down the Point menu 10, select a destination, and press Submit 12 or the user can mouse over a node on the graph and click on it. The user has selected A root 14 to pan in FIG. 4. In FIG. 5 the screen has panned to A root 14. As a result, the color of the A root changes to pink. To zoom, the user pulls down zoom menu 16 and presses submit 12. In FIG. 5, the user has selected zoom level '15,' which will show the large area network neighborhood for the A root. FIG. 6 shows the large area network neighborhood. In FIG. 6, the user has selected zoom level '7' and pressed submit 12 to generate the next screen. FIG. 7 shows a closer network neighborhood for the A root.

Figure 8:
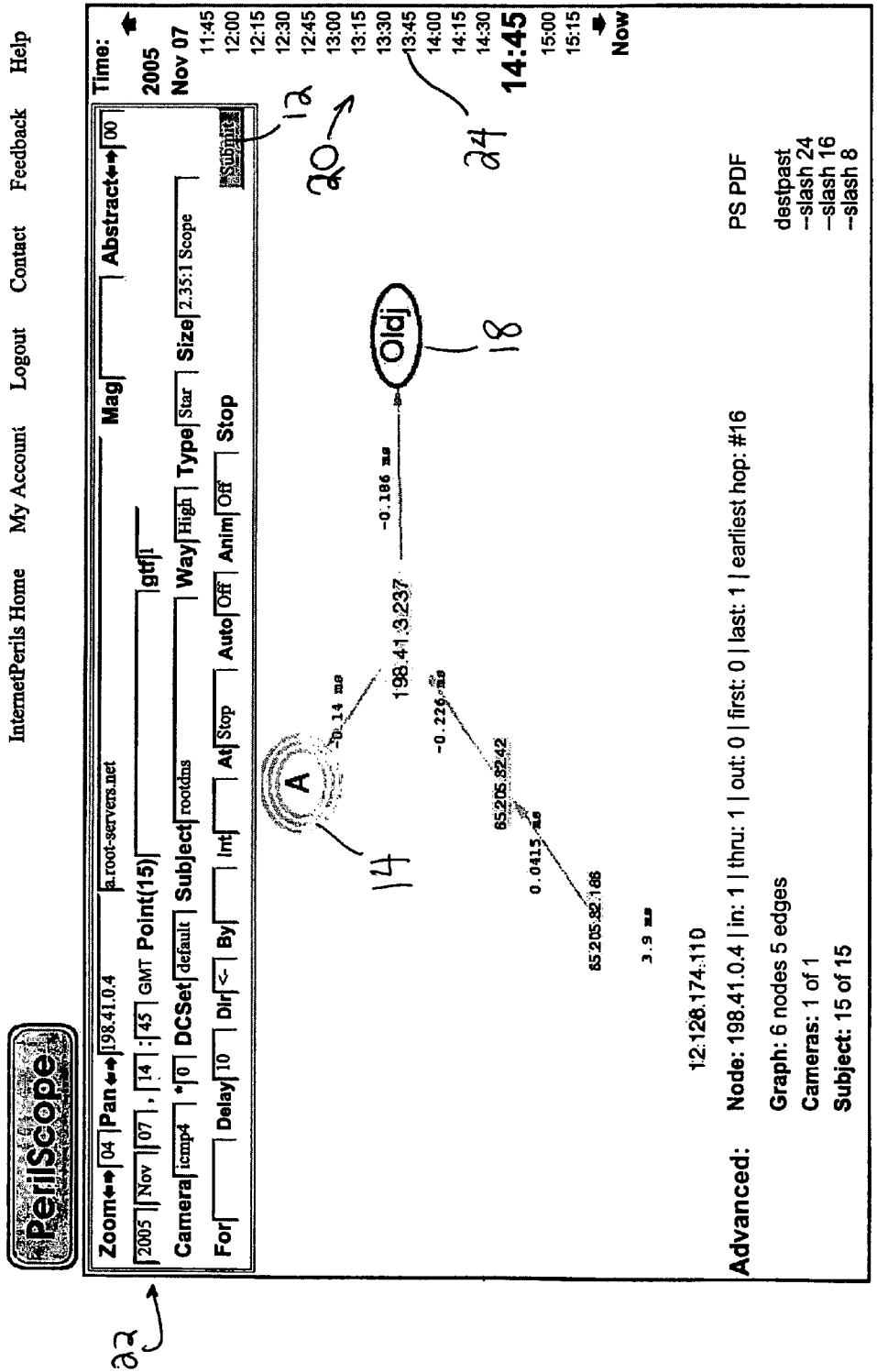
Figure 9:
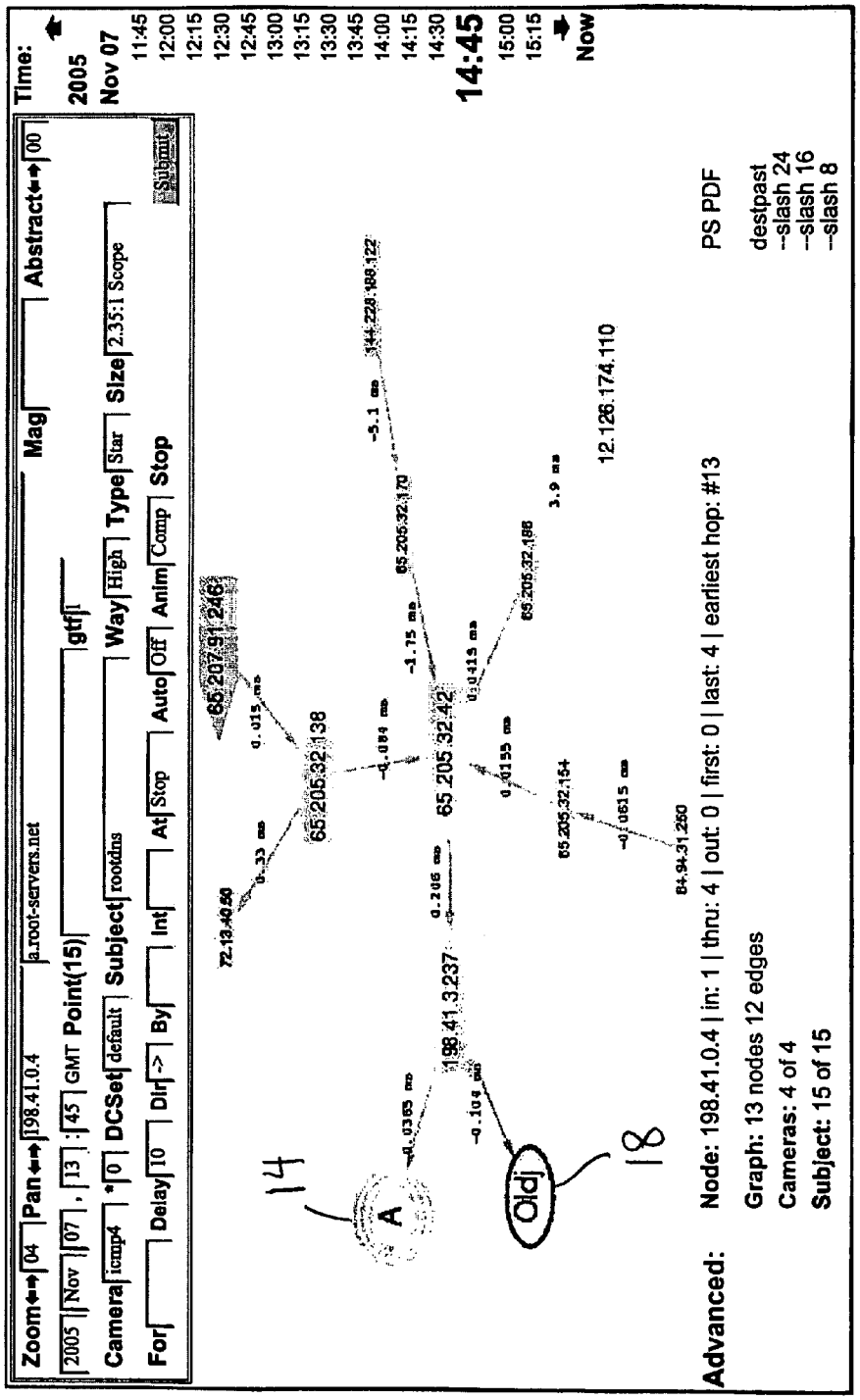
Figure 10:
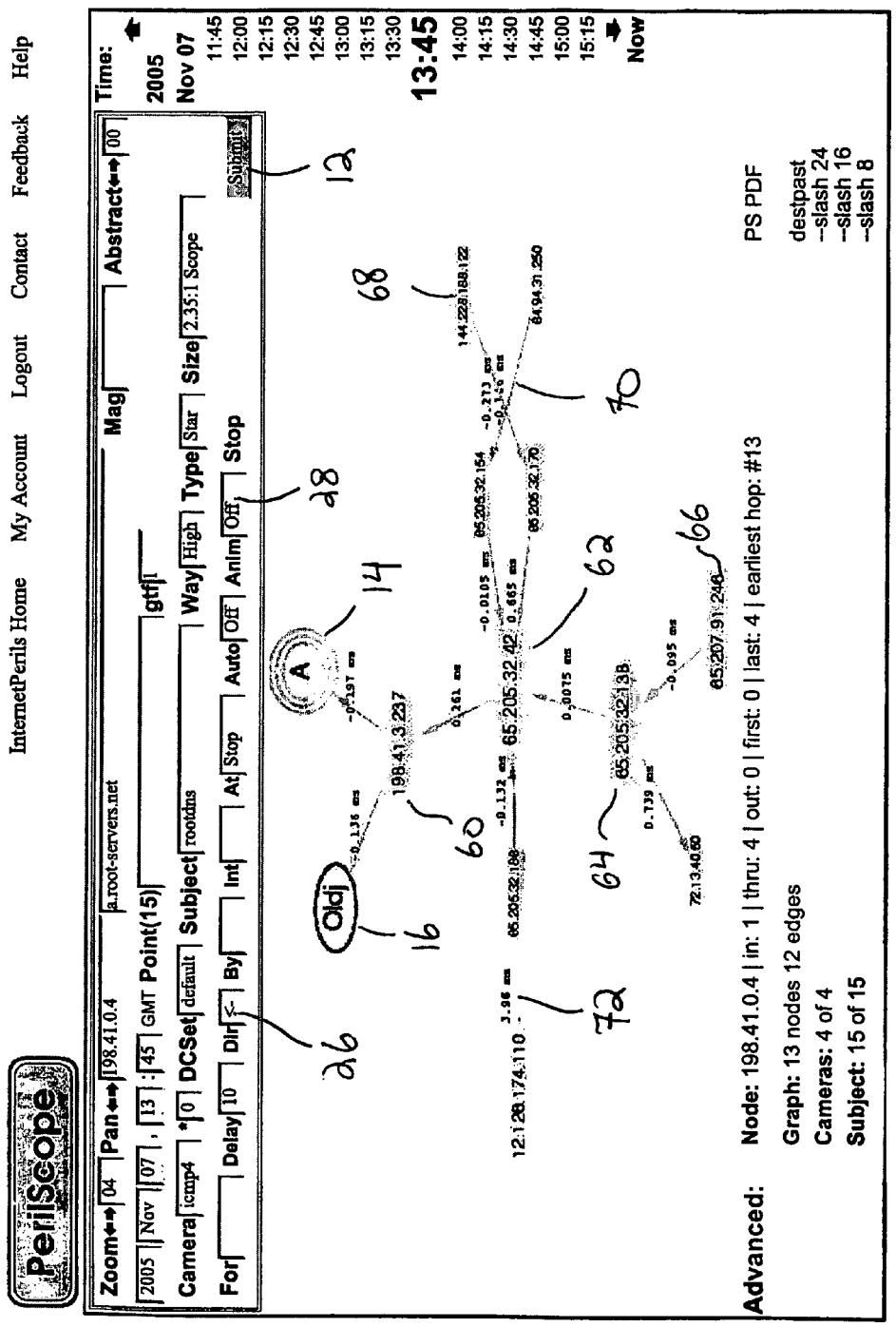

To generate the next screen, in FIG. 7, the user has selected zoom level '4' and pressed submit 12. In FIG. 8 the old J root 18 is visible nearby. Roots 2 and 18 are connected via a nonredundant path. This nonredundancy, clearly shown in FIG. 8, is likely responsible for the relocation of J root 16. To generate the next figure, the user selected Camera 19, selected 'icmp4' instead of 'ustx01,' and pressed select 12. FIG. 9 shows A root 14 from multiple cameras to show multiple paths. The user can pan in time also. Returning to FIG. 8, the user can click on a time 20 among those displayed to the right or can pull down and select from one or more of the year, month, day, hour, or minute menus 22, and then press submit 12. In FIG. 8, the user has selected "13:45" 24 to generate FIG. 10, which is the screen of FIG. 8 shown one hour earlier.

Figure 11:
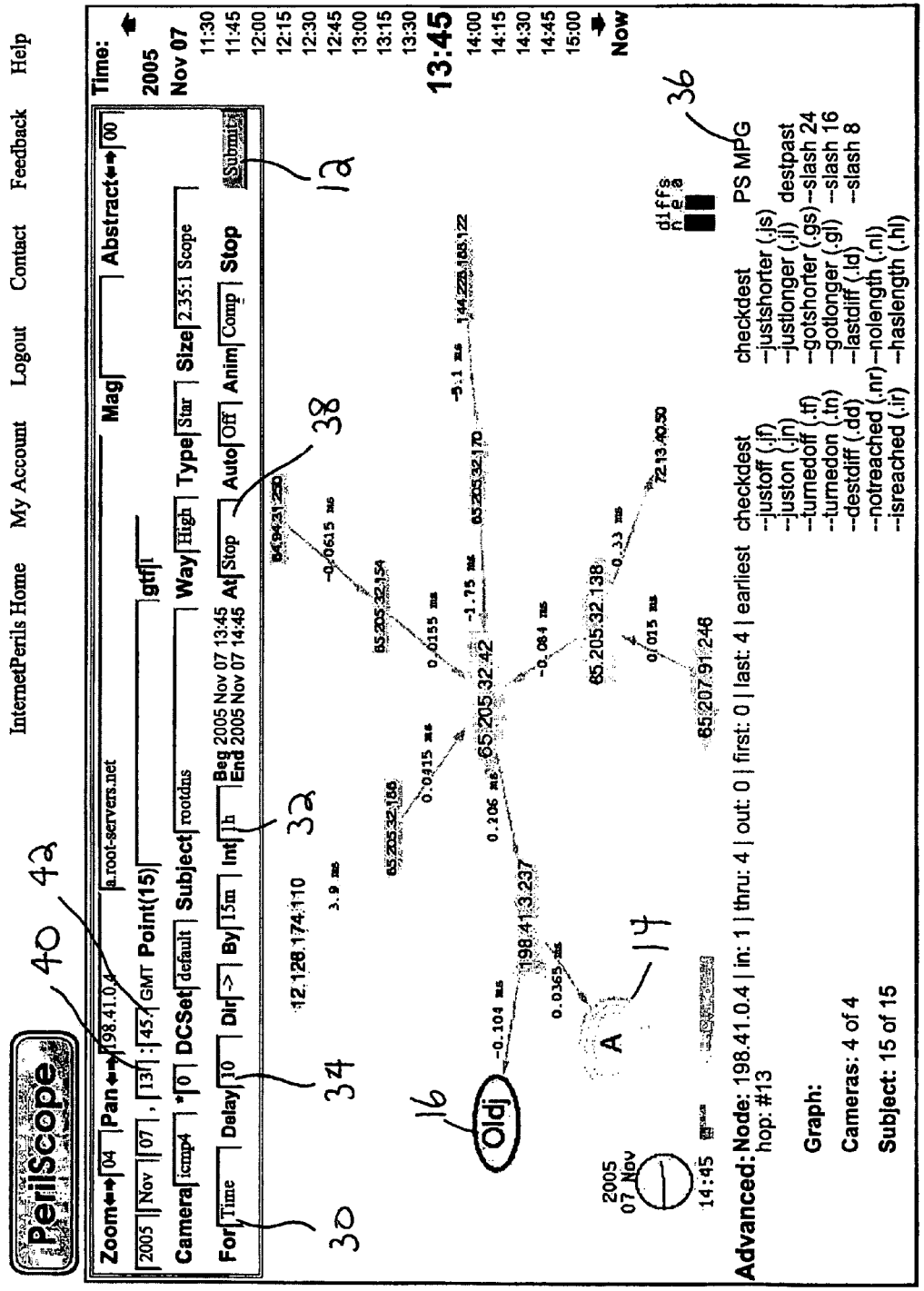
Figure 12:
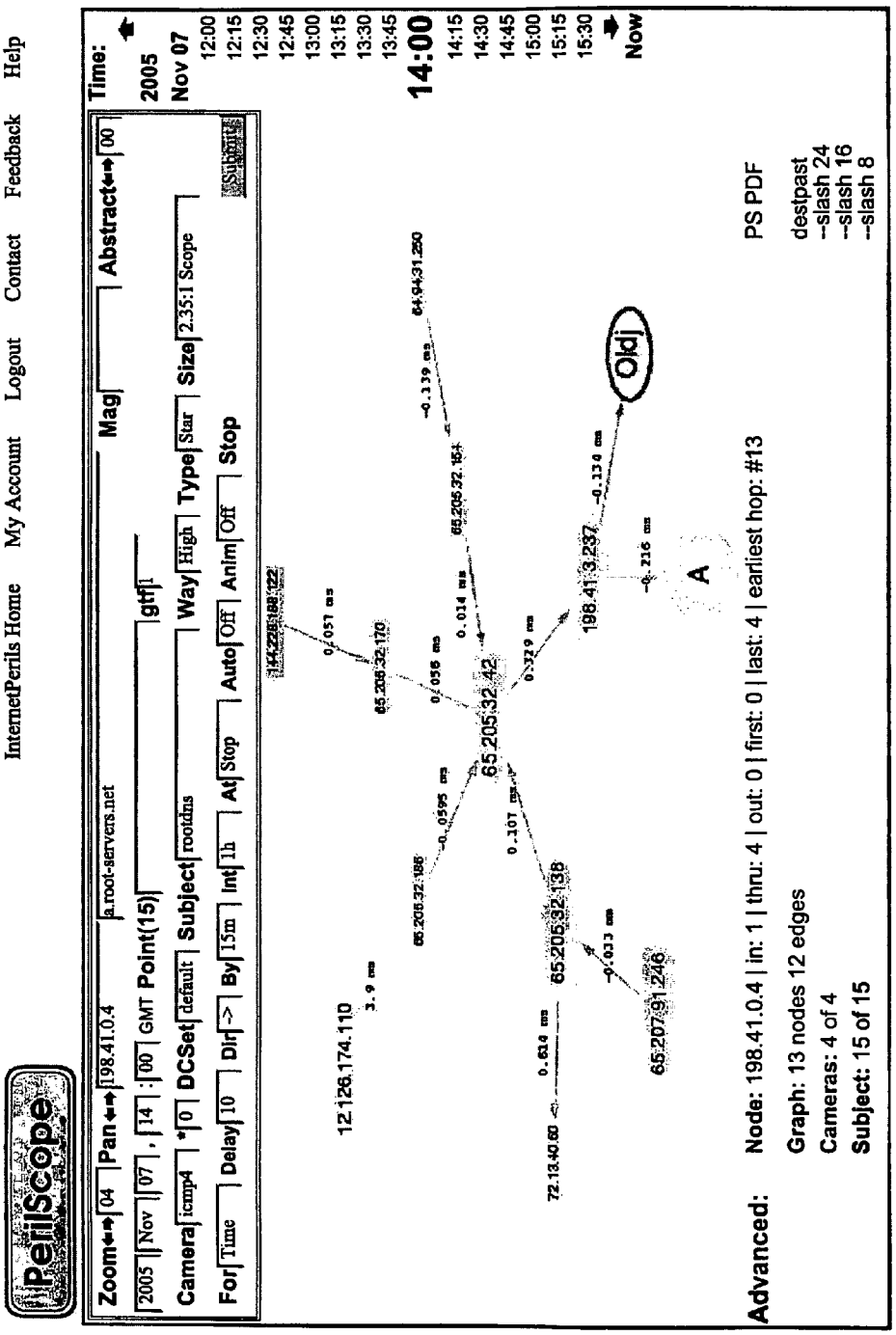

FIG. 11 is a time-series animation over one hour, from 13:45 to 14:45 GMT 7 Nov. 2005. To generate FIG. 11 from FIG. 10, the user pulled down Dir 26 and selects "–>," pulled down Anim 28 and selects "Comp," and then pressed Submit 12. The device will default For 30 to "Time" and Int 32 to "1 h." Any of these parameters can be set manually or by a program. To change the speed of animation, set Delay 34. The animation is by default an animated GIF. To get an MPEG instead, click on MPG 36, or a program can change this setting. FIG. 12 displays information from the second time used in the animation. To generate this figure, in FIG. 11, the user clicked Stop 38, pulled down Hour 40 and selected '14' pulled down Minute 42 and select '0,' and pressed Submit 12.

Figure 13:
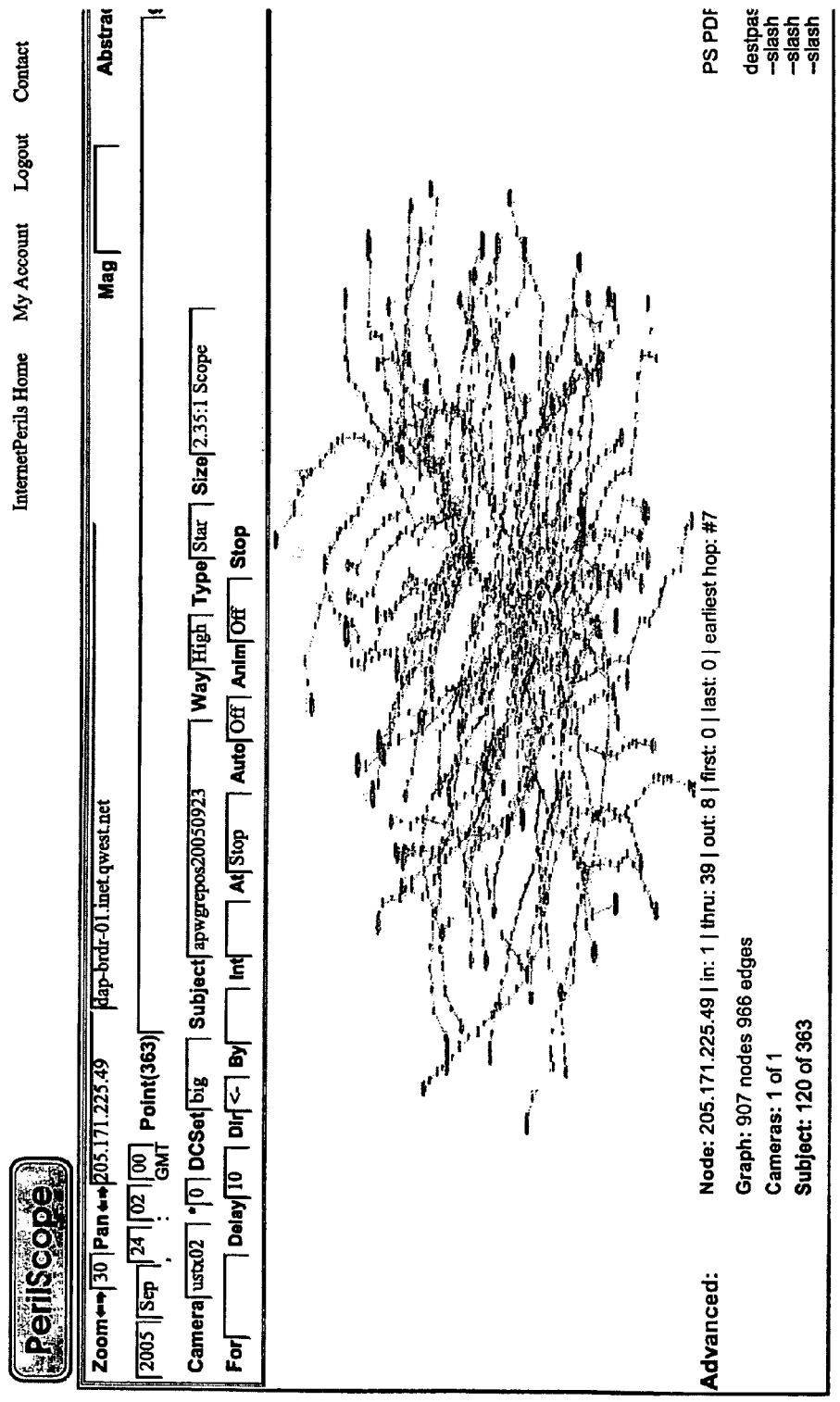
Figure 14:
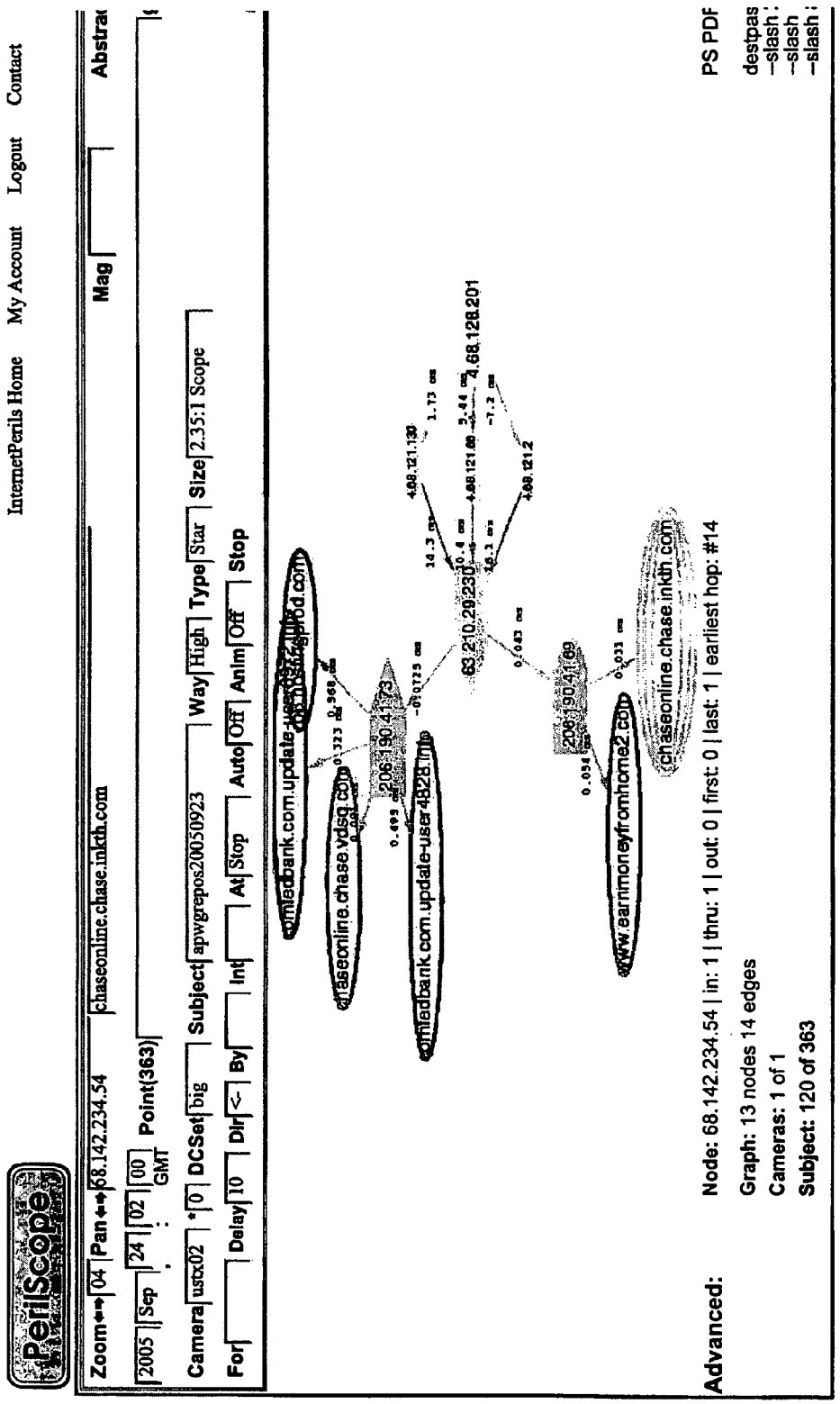

The present invention can be used to monitor a variety of activities on the Internet. For example, FIG. 13 is a display of nodes that were used in phishing messages. FIG. 14 shows seven of the nodes from FIG. 13 that are connected through the same ISP. This type of information is very useful for addressing problems associated with phishing.

FIGS. 15 through 49 are screen captures showing a present invention representation of the status of the Internet connection to the Cayman Islands during hurricane Ivan in 2004. These screen captures can be generated by the same device generating FIG. 4-14. That is, the same toolbars, menus, and operational options shown for FIGS. 4-14 are applicable to FIGS. 15-49. The present invention can provide valuable information regarding the status and performance of the Internet. In particular, the present invention can provide information regarding the status and performance of the Internet in response to stresses, such a weather phenomena. This information can be used to analyze how such stresses impact all or portions of the Internet, to identify the nuances and particulars of the impacts, and to device means to better protect or modify vulnerable portions of the Internet. FIGS. 15 through 50 are based on scans taken every 15 minutes during the period of interest. That is, every 15 minutes, the information and screens associated with this particular application of the present invention were updated. In the interest of brevity, only selected updates are shown. However, it should be understood that the present invention is not limited to any particular time intervals as discussed infra. Also, it should be understood that the data can be updated at a particular scan rate without updating visualization screens.

Figure 15:
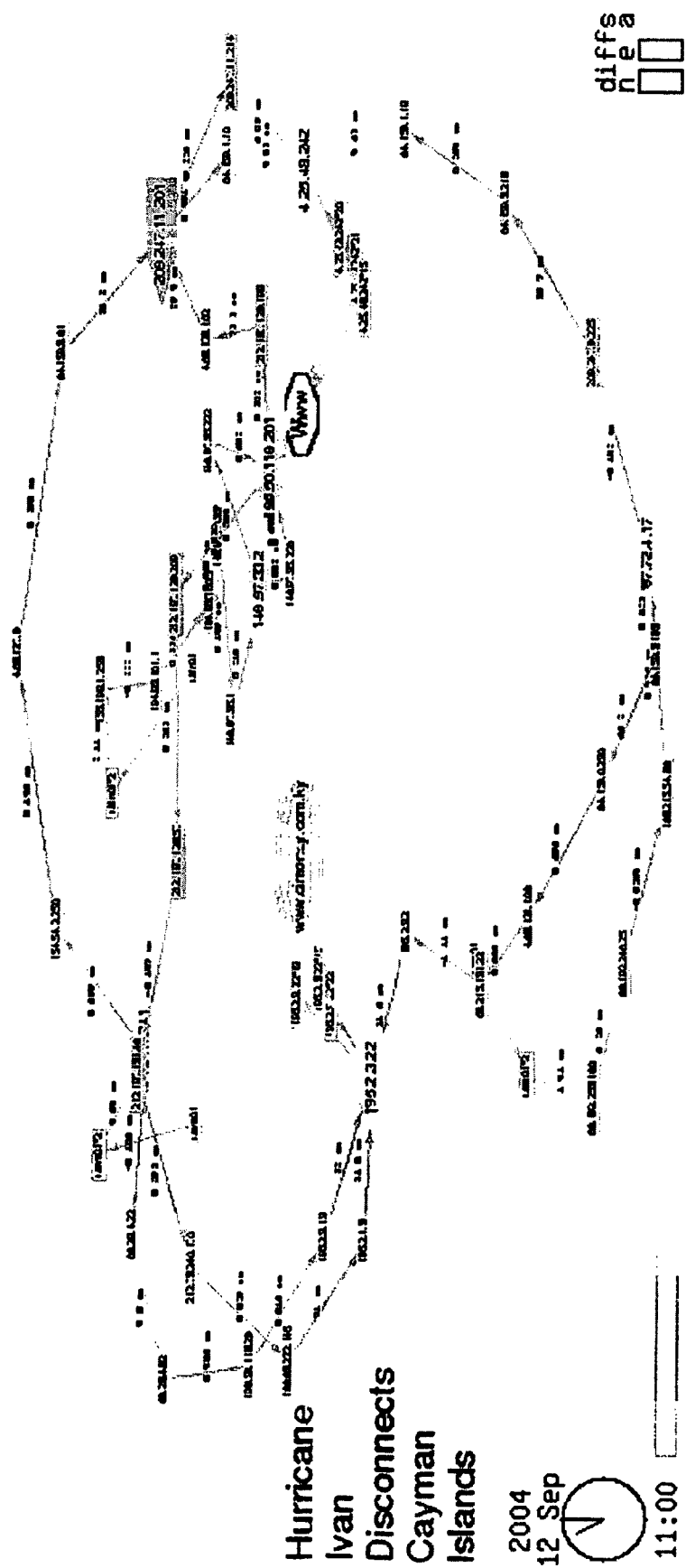
FIGS. 15 through 48 are screen captures showing a present invention representation of the status of the Internet connection to the Cayman Islands during hurricane Ivan in 2004.
Figure 16:
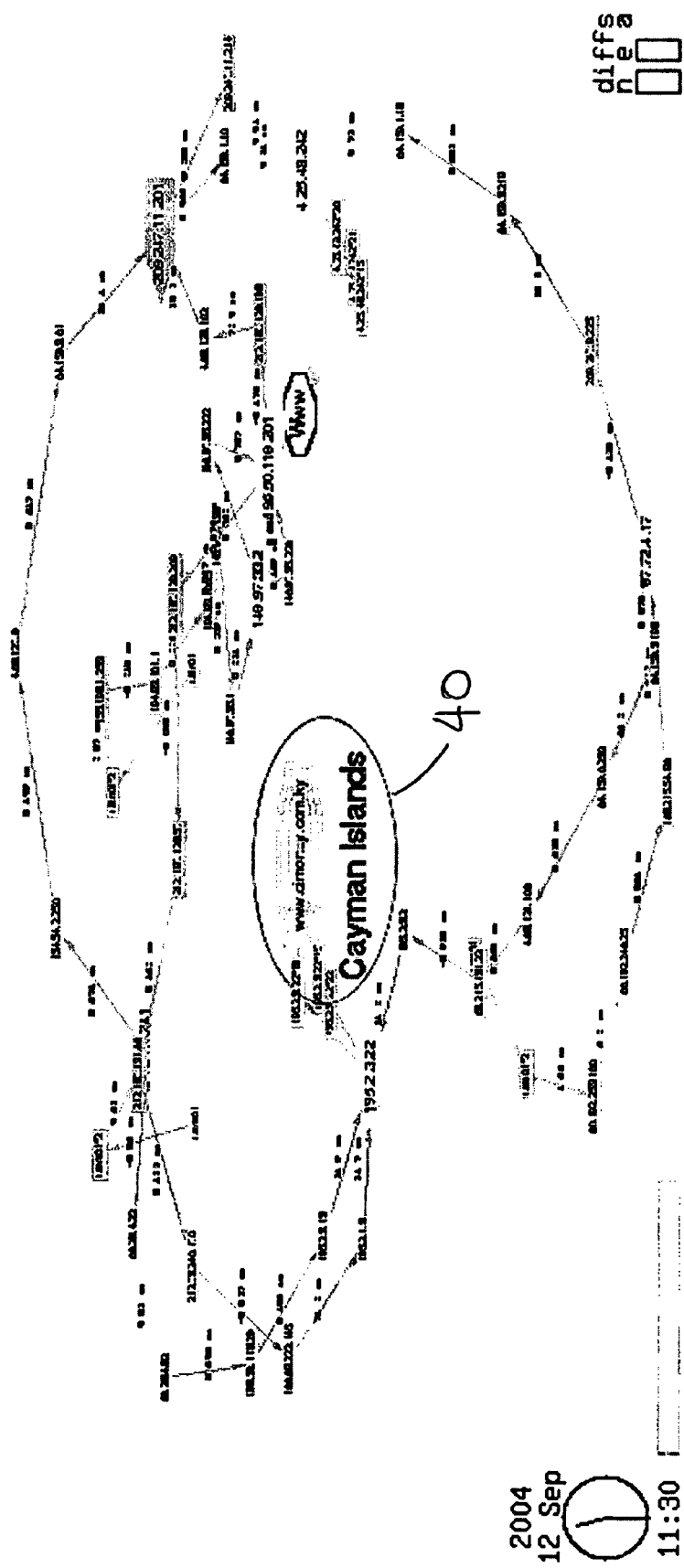
Figure 17:
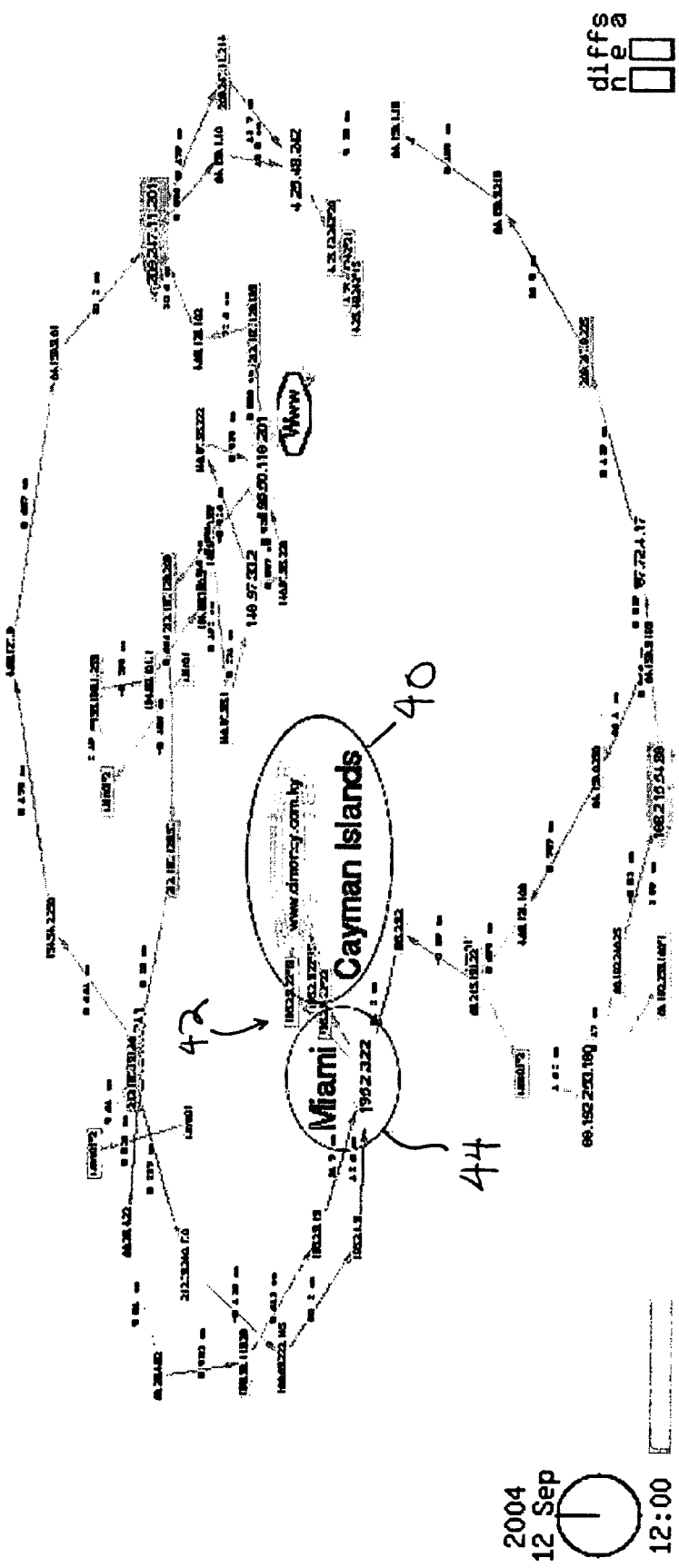
Figure 18:
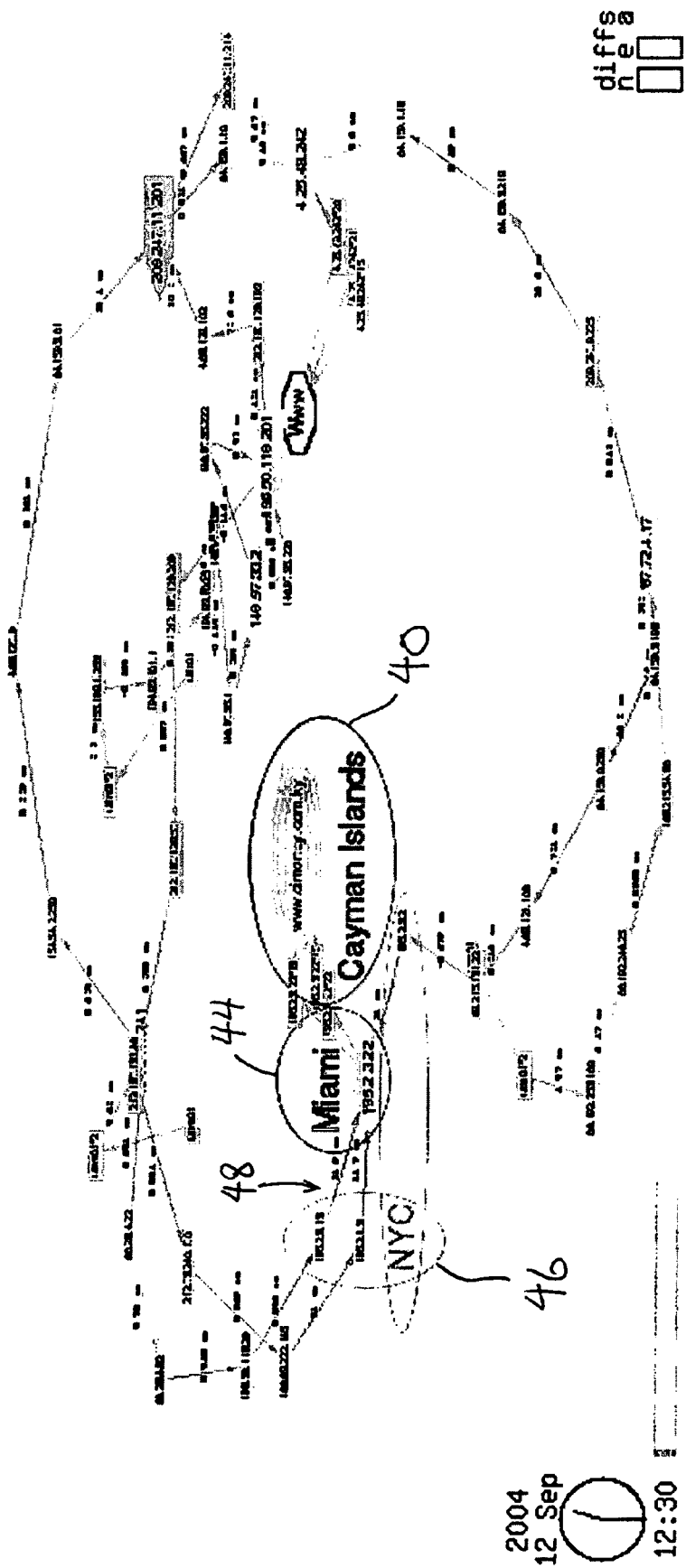
Figure 19:
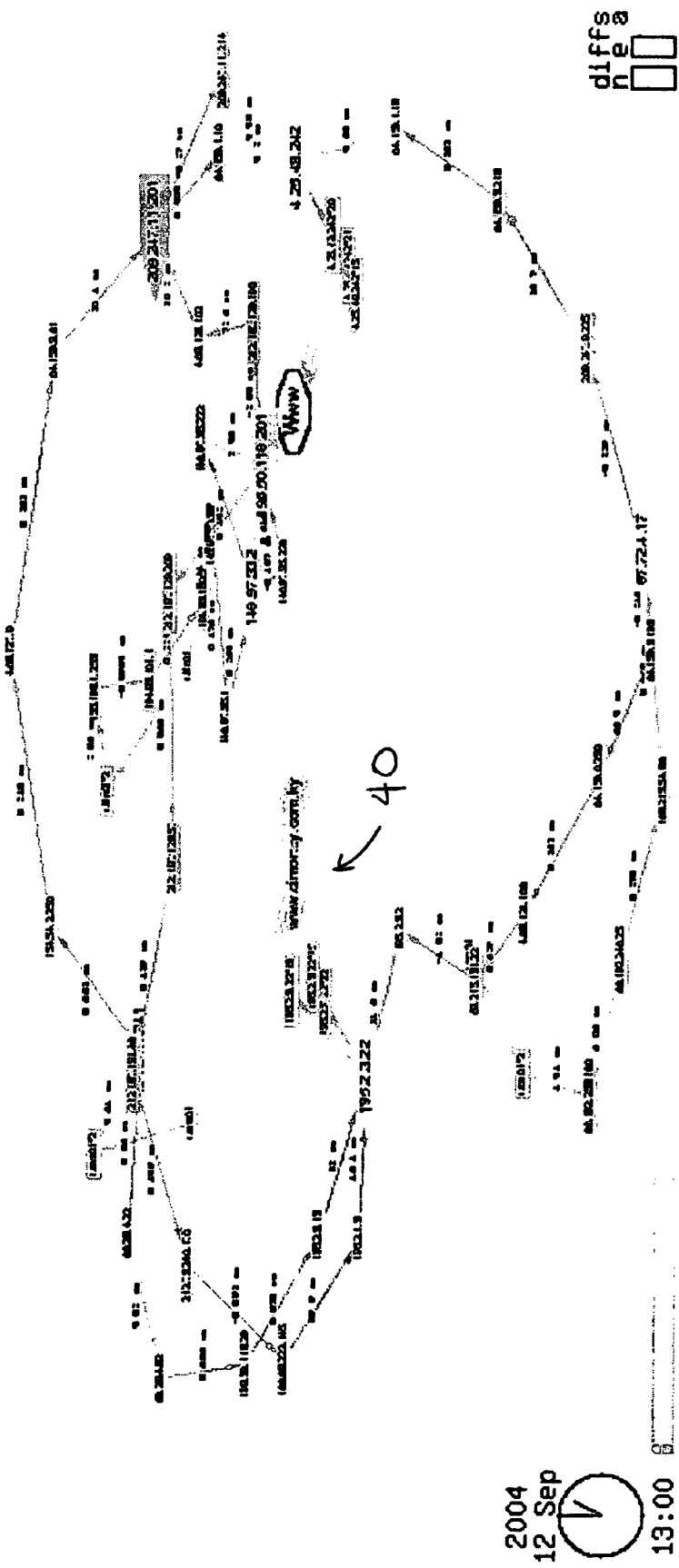
Figure 20:
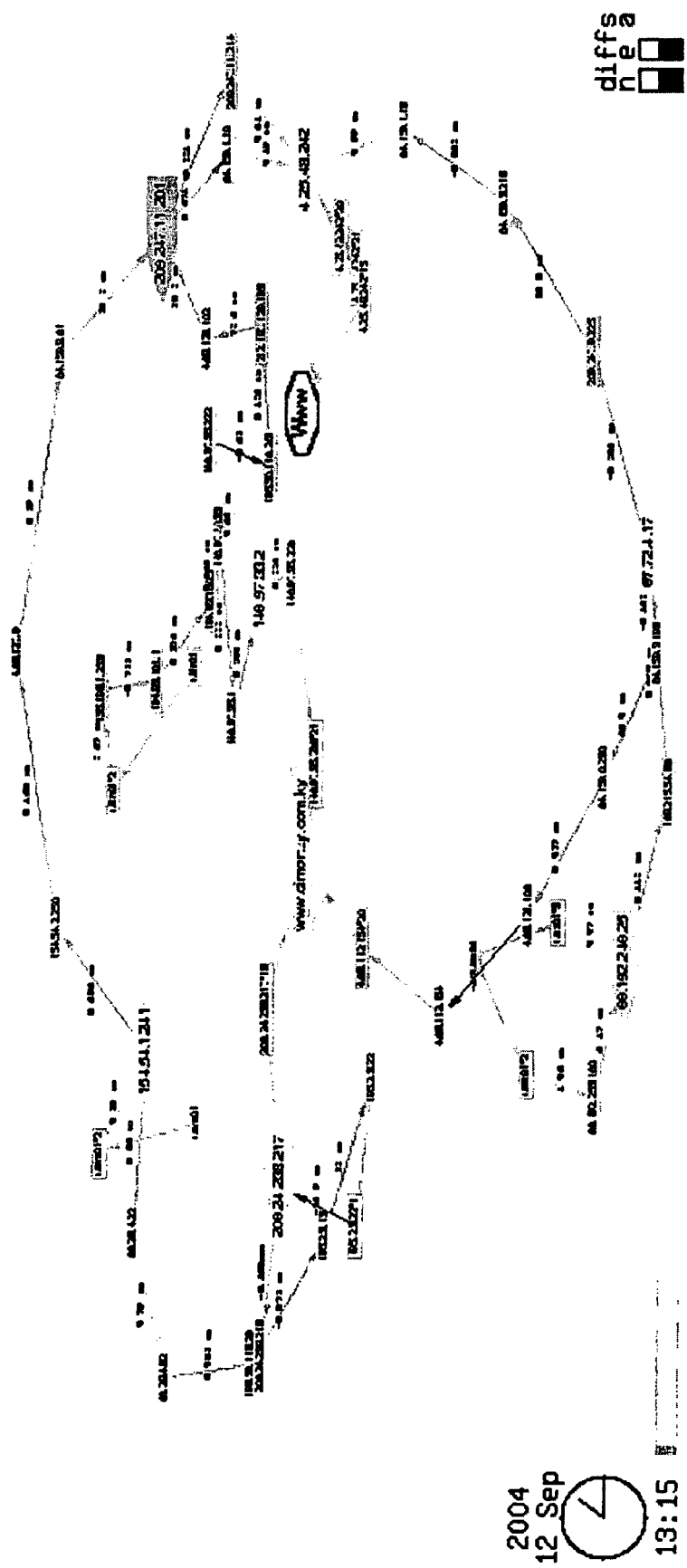
Figure 21:
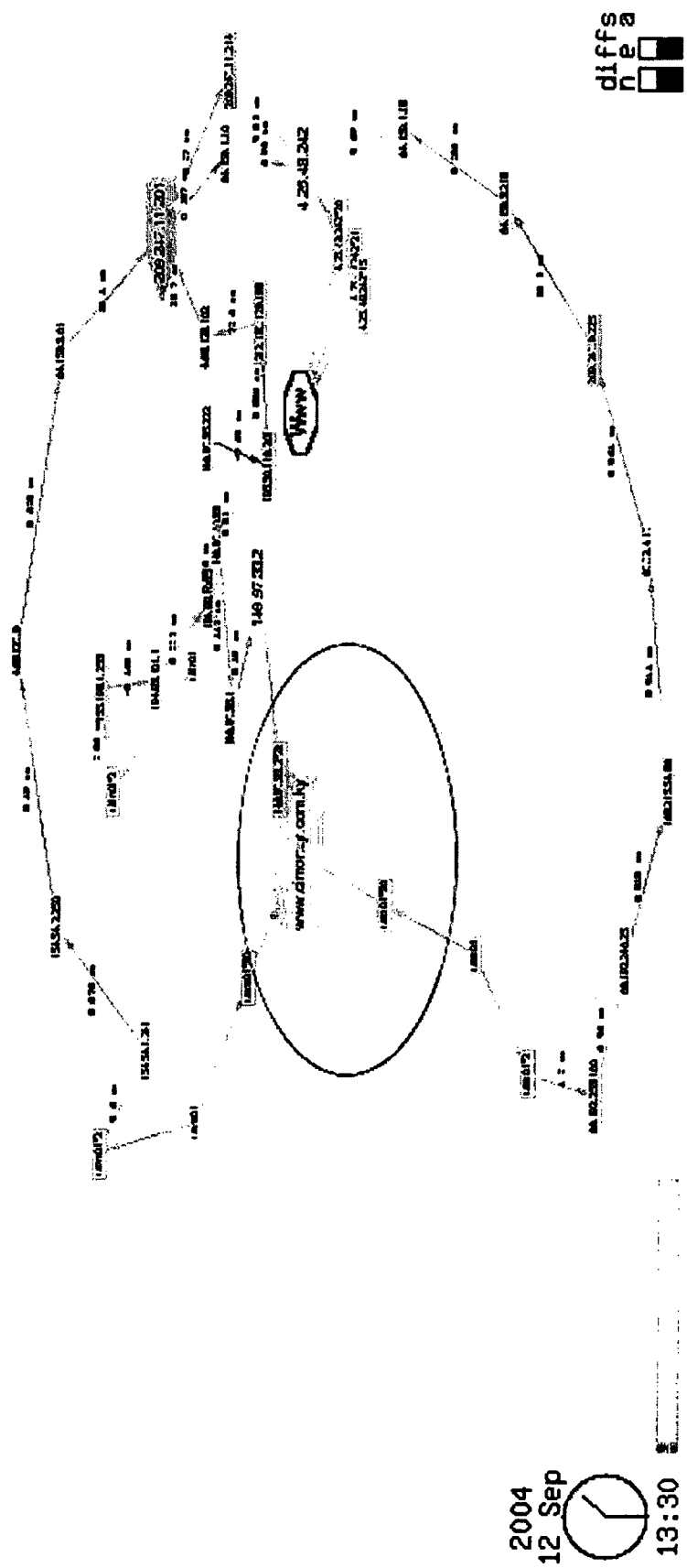
Figure 22:
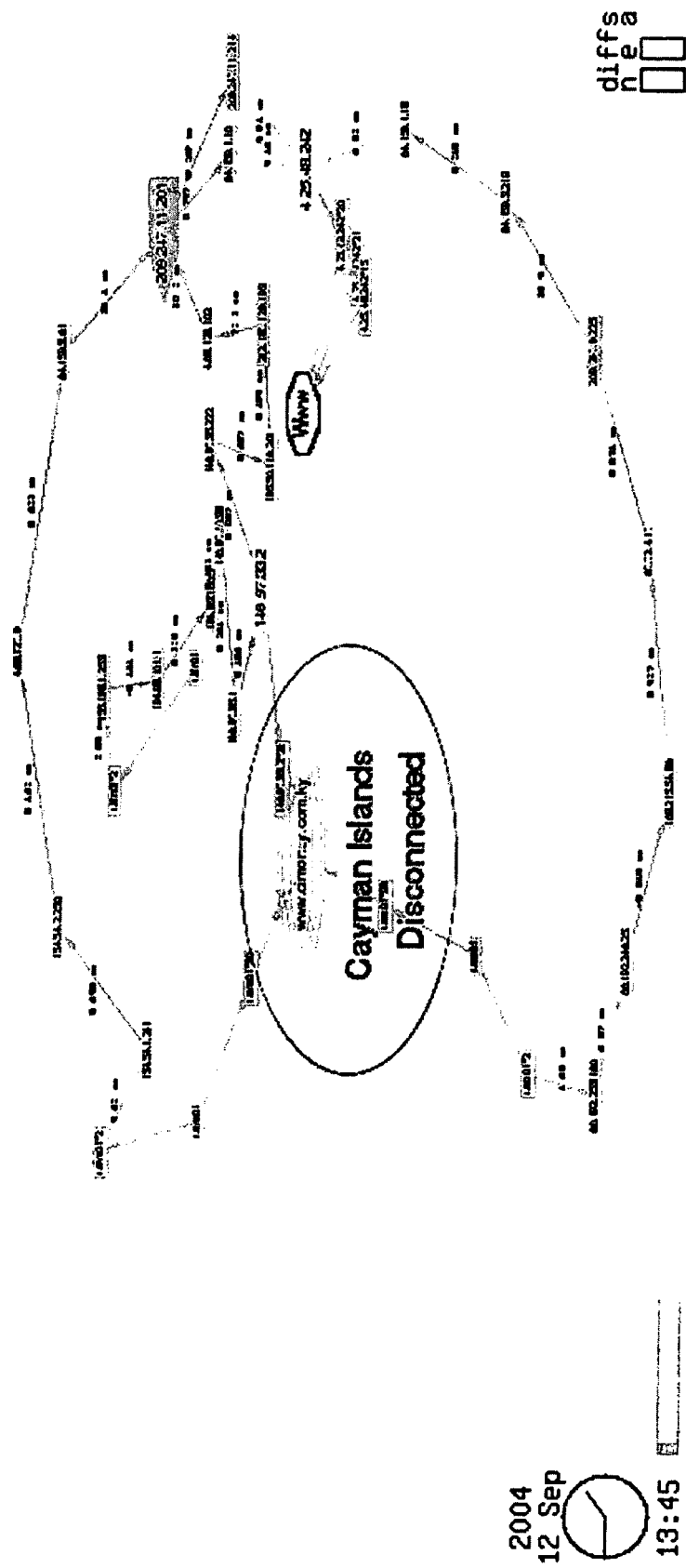
Figure 23:
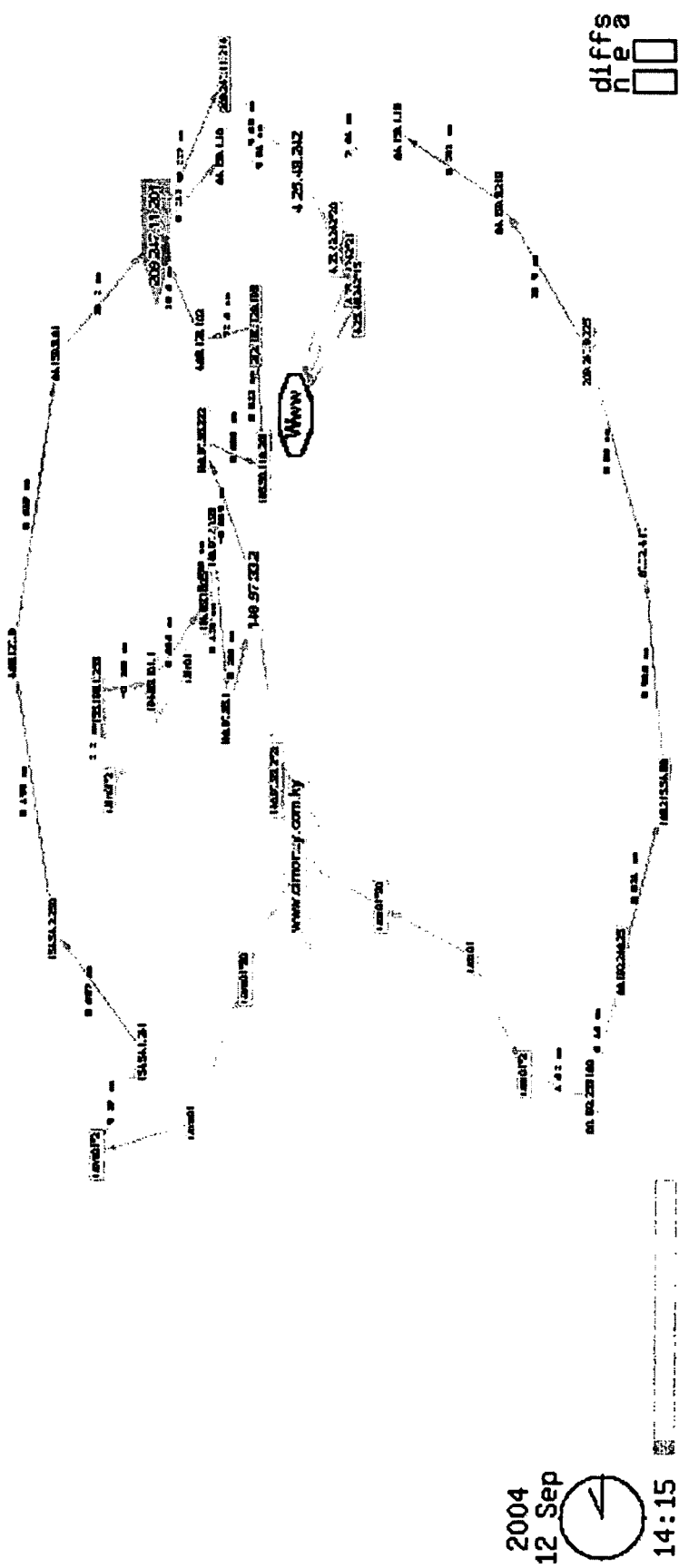
Figure 24:
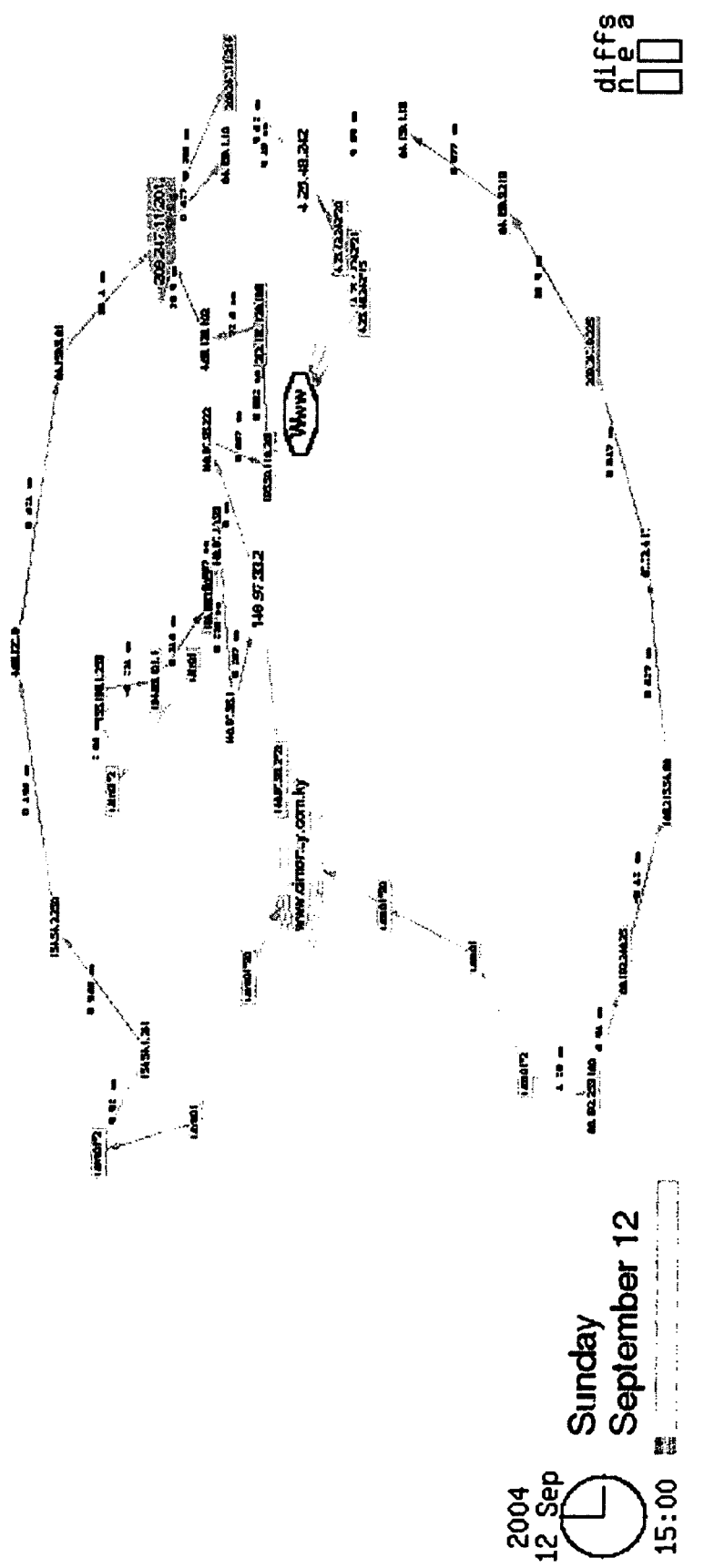
Figure 25:
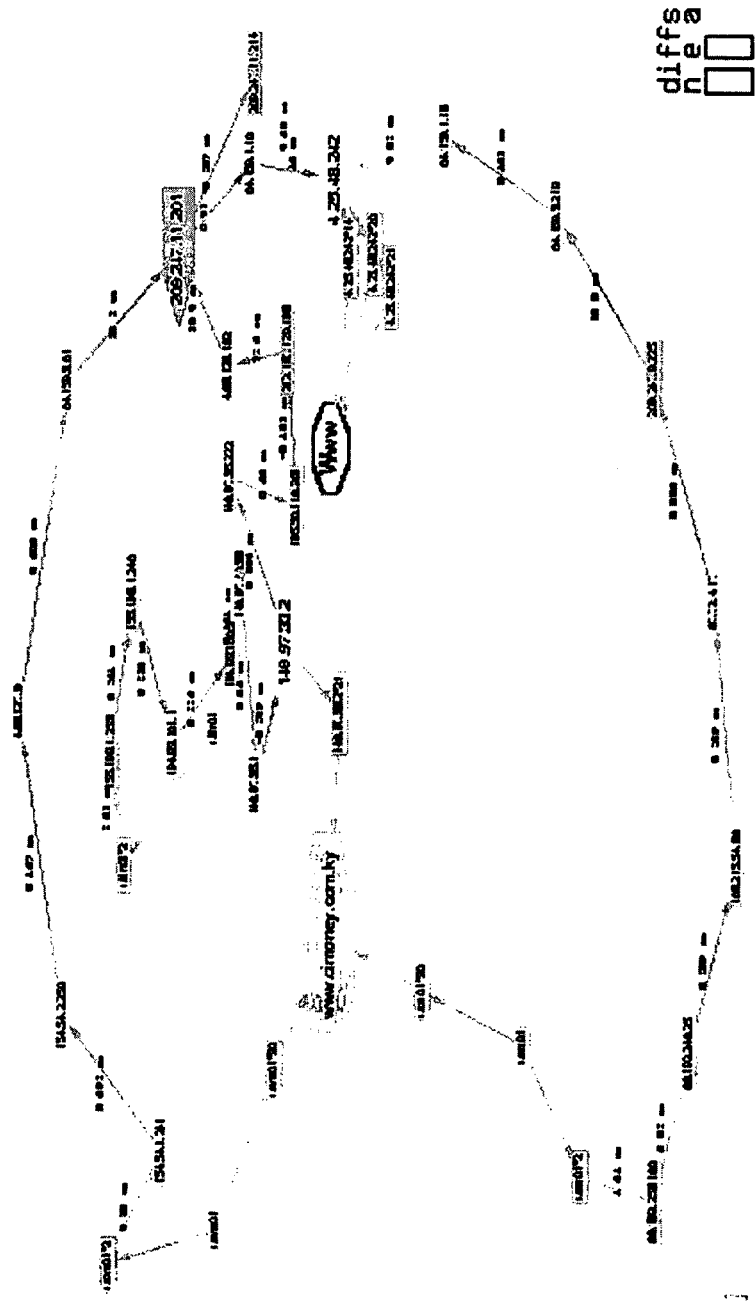
Figure 26:
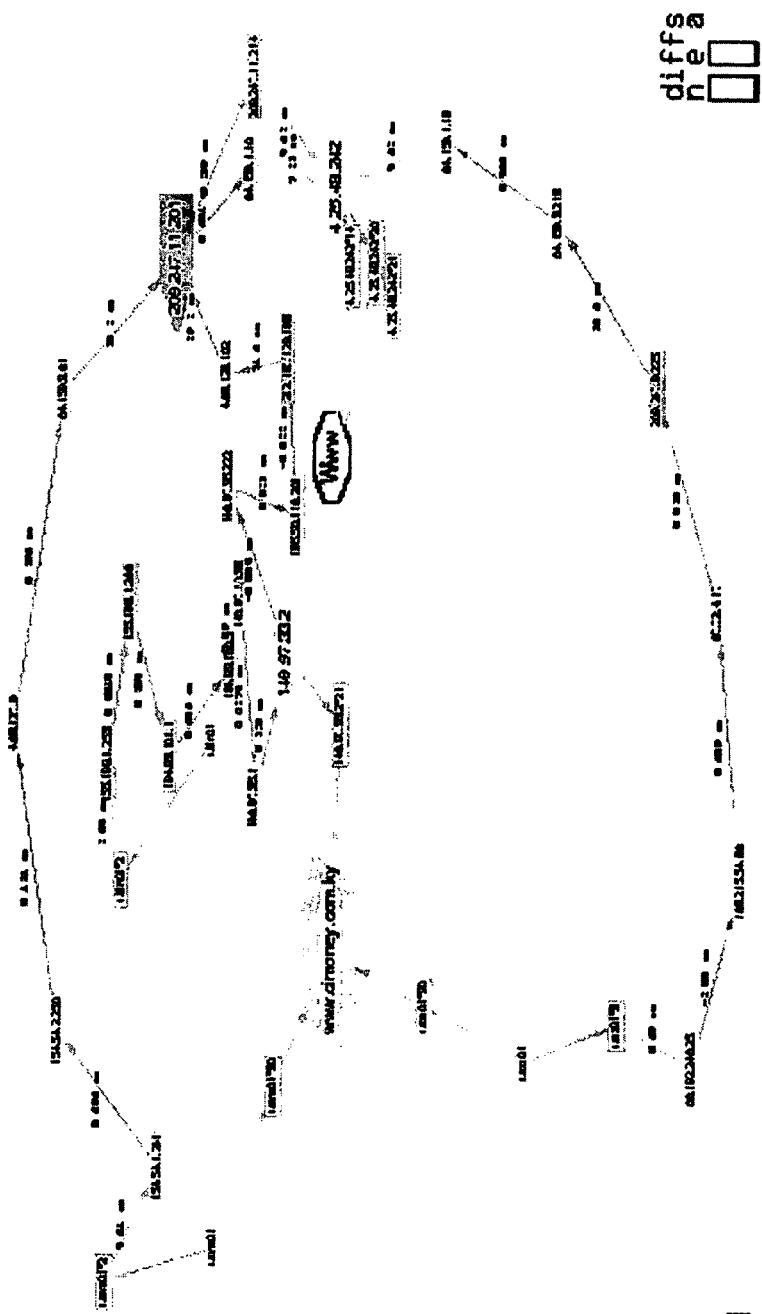
Figure 27:
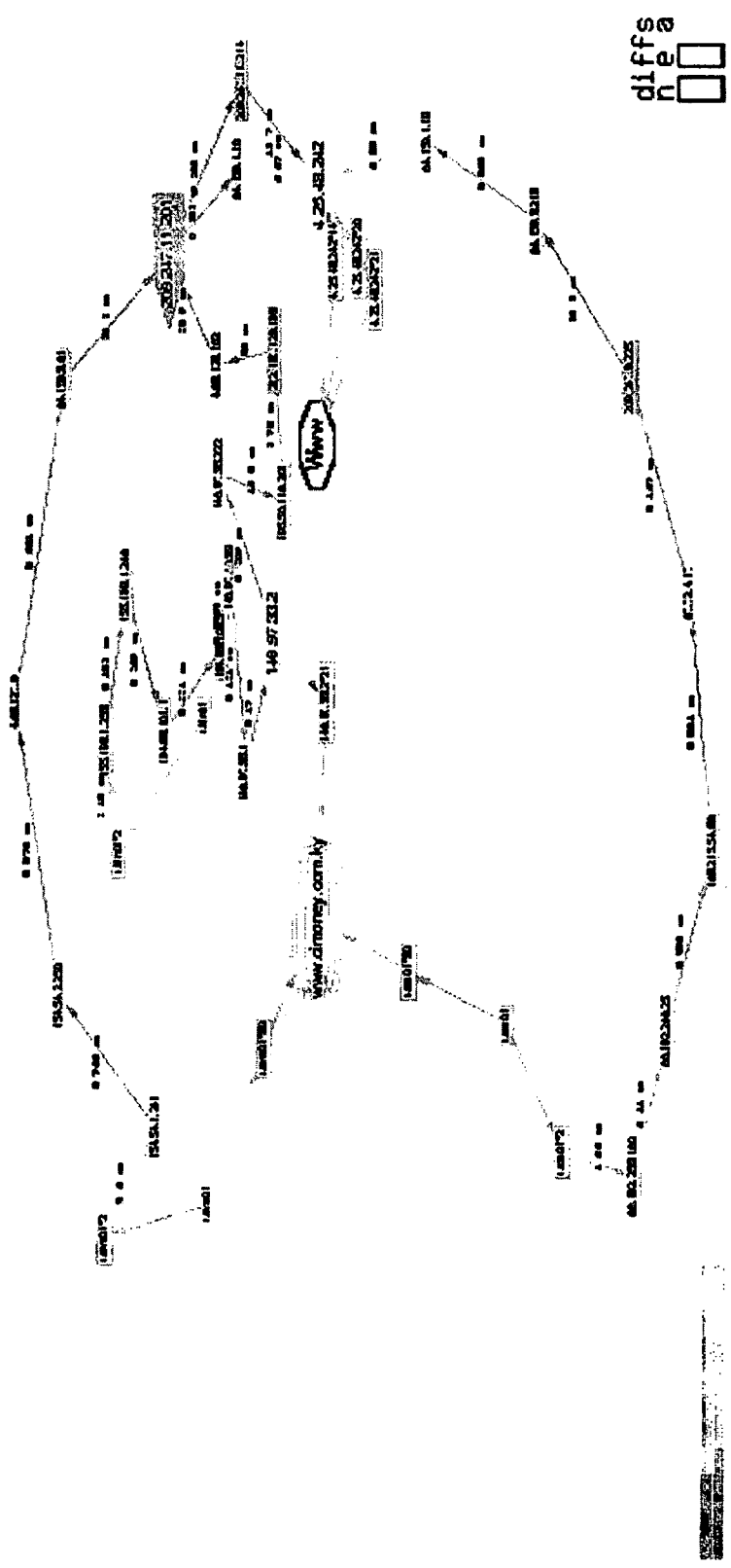
Figure 28:
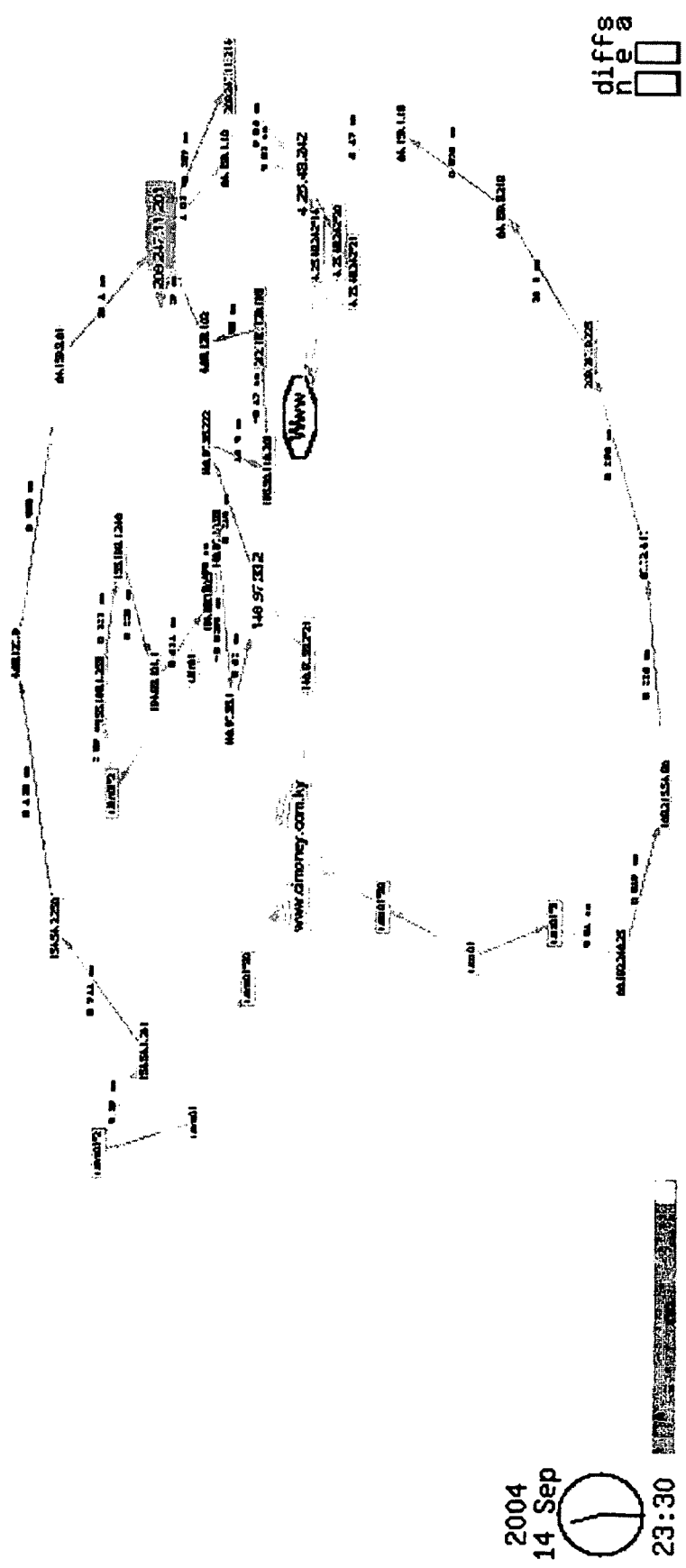
Figure 29:
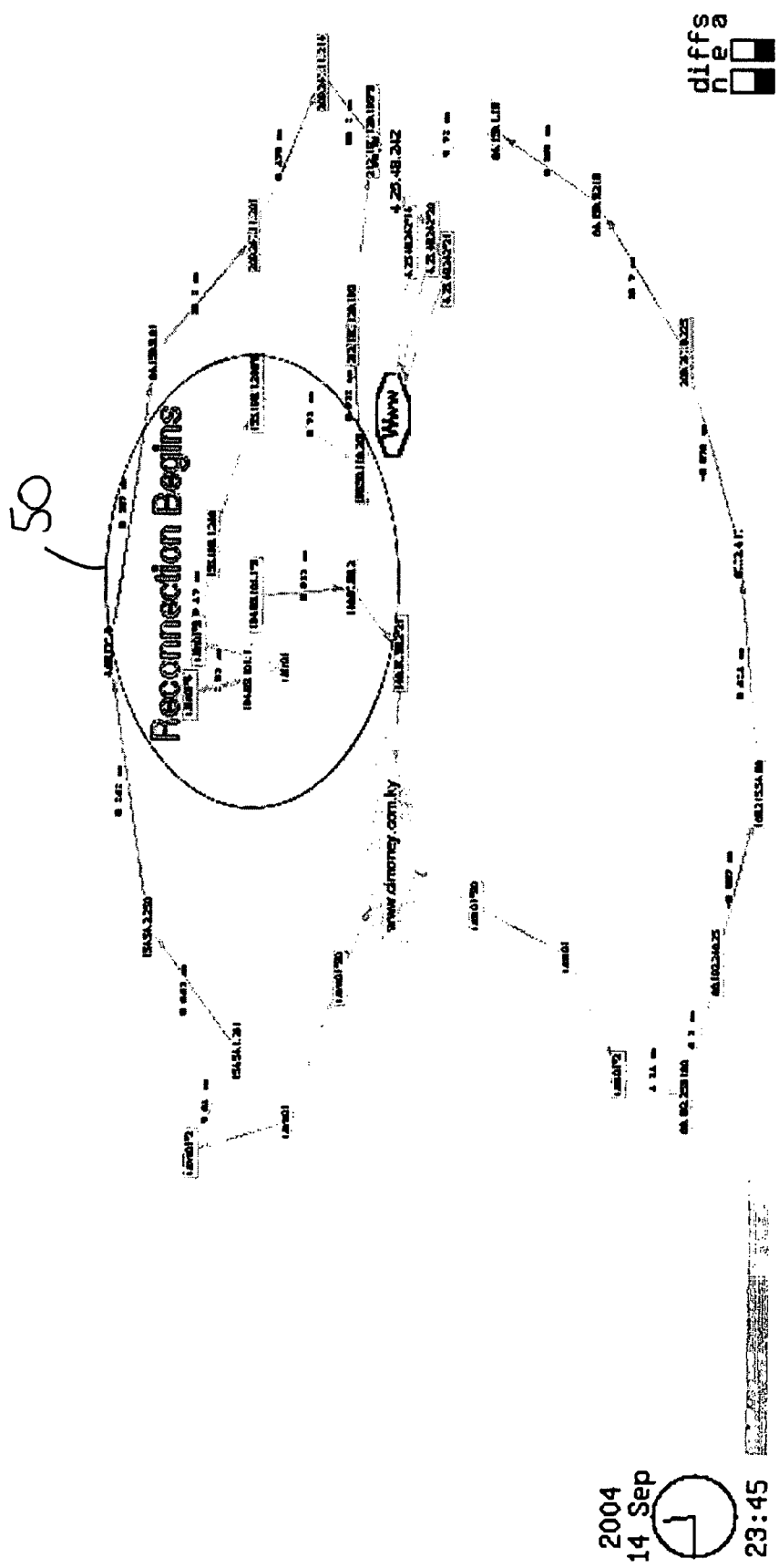
Figure 30:
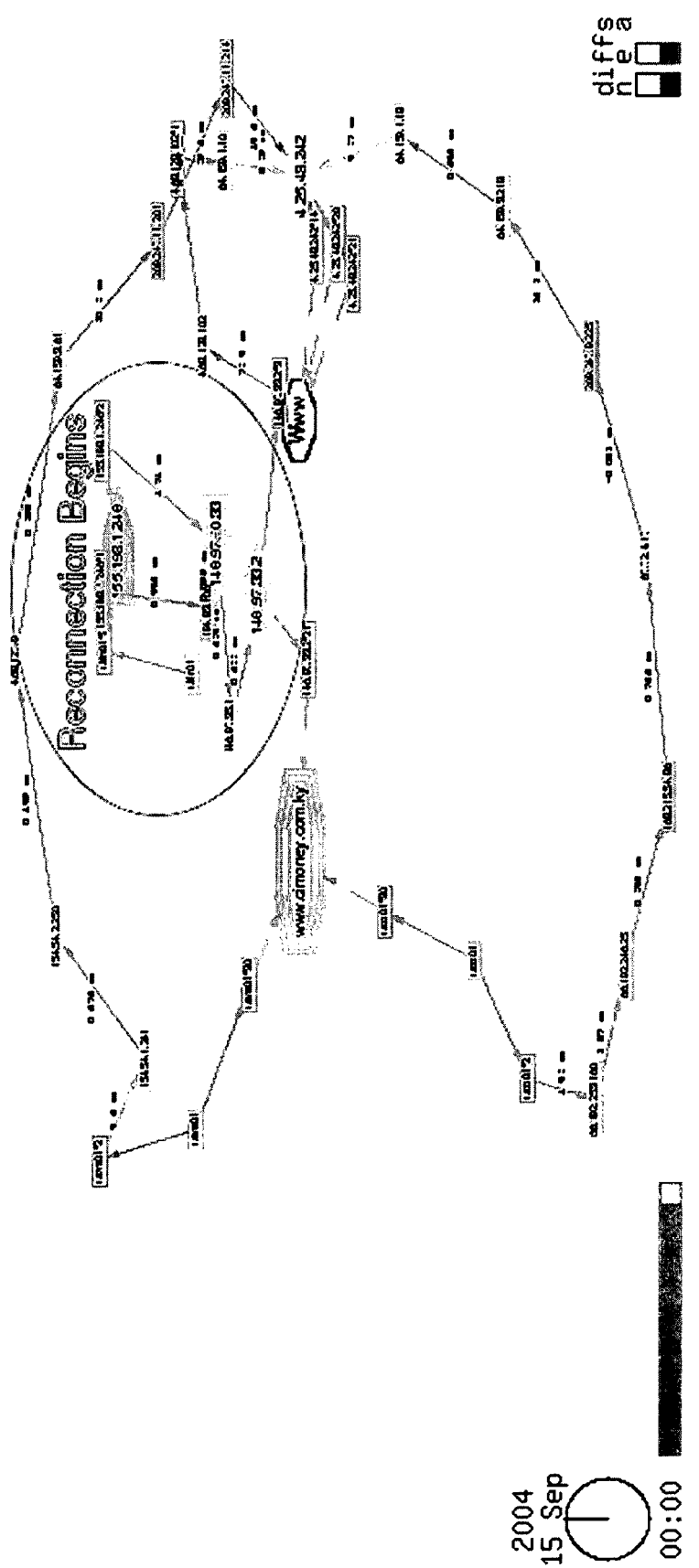
Figure 31:
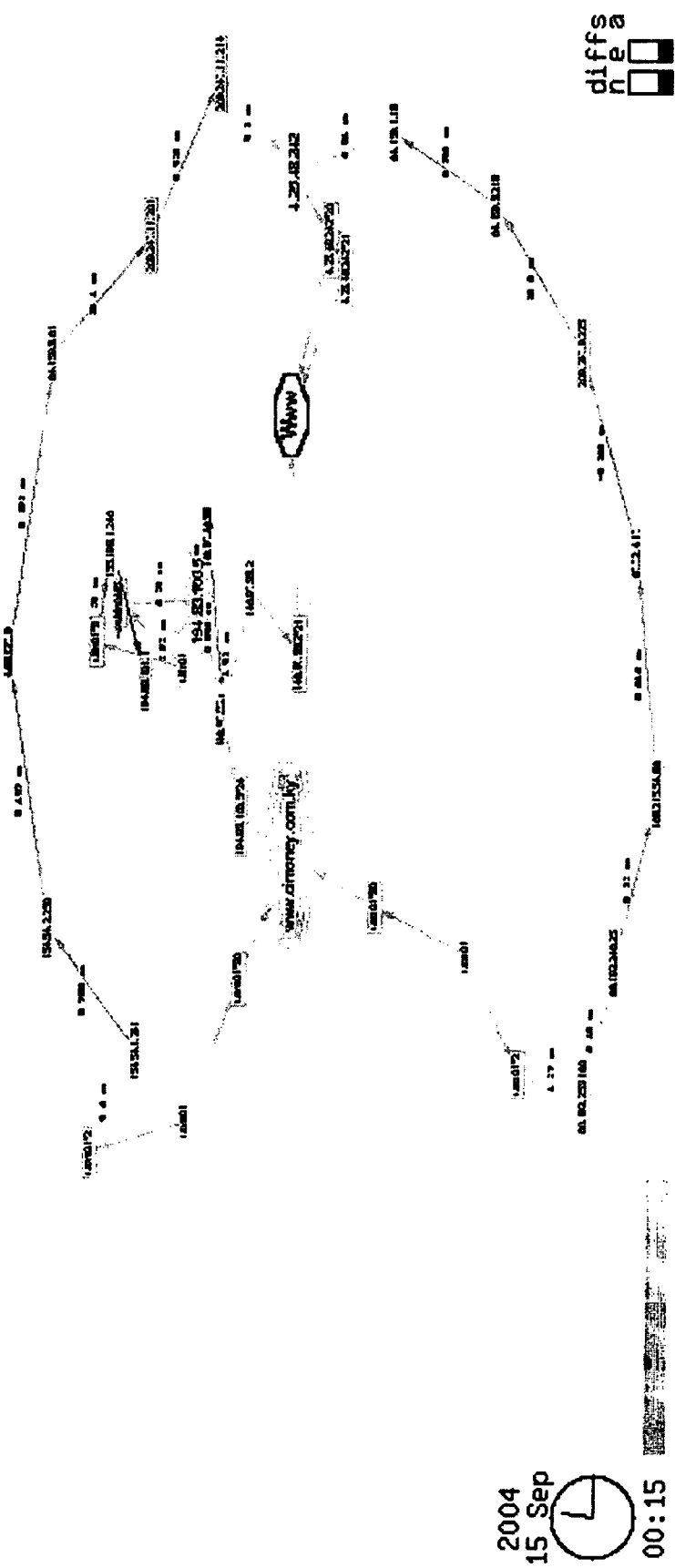
Figure 32:
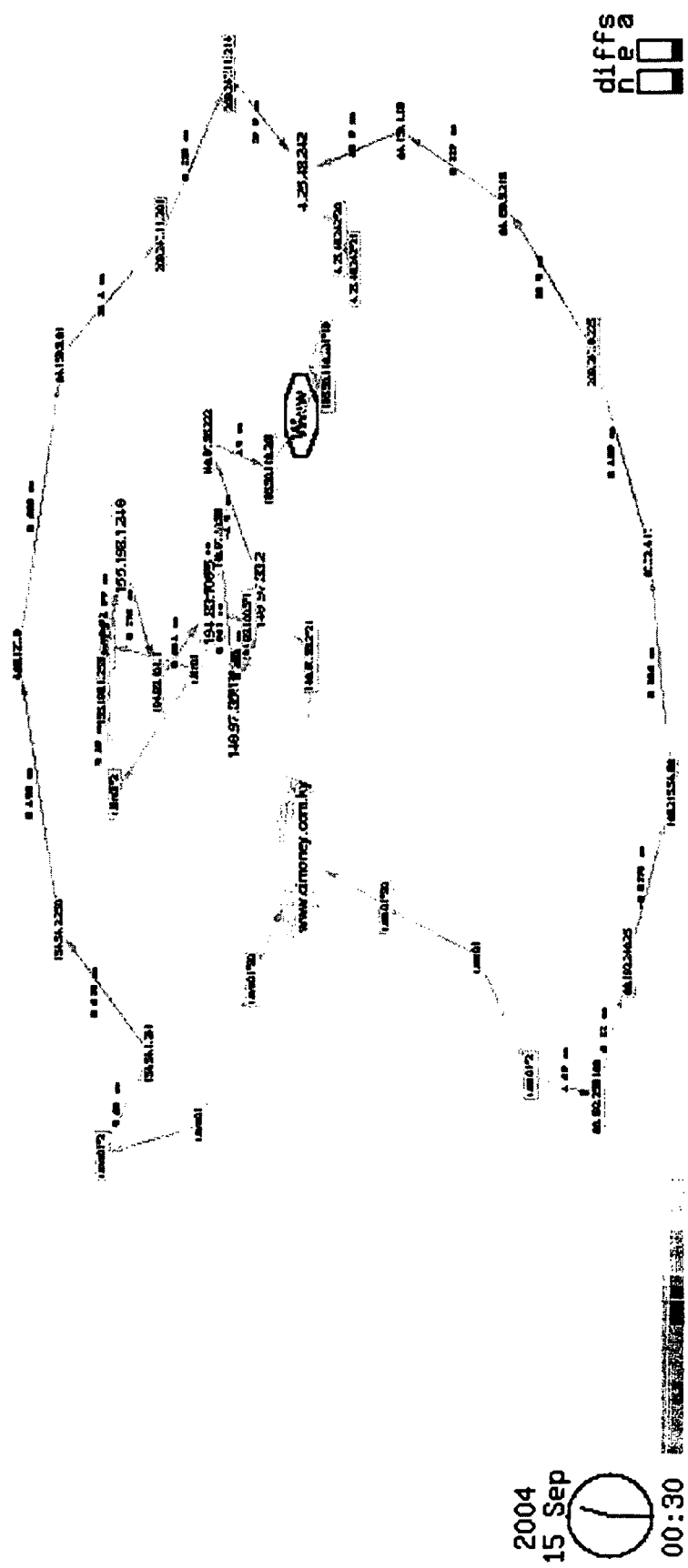
Figure 33:
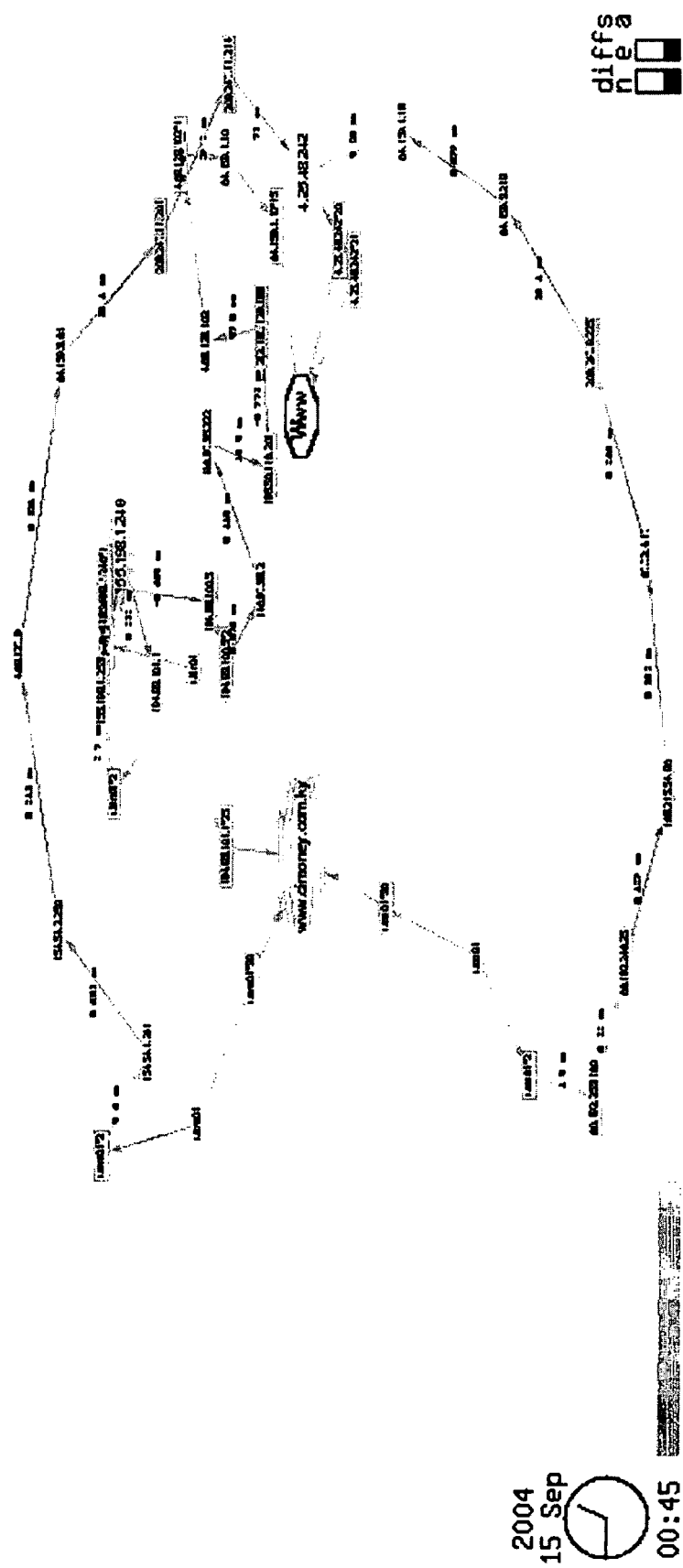
Figure 34:
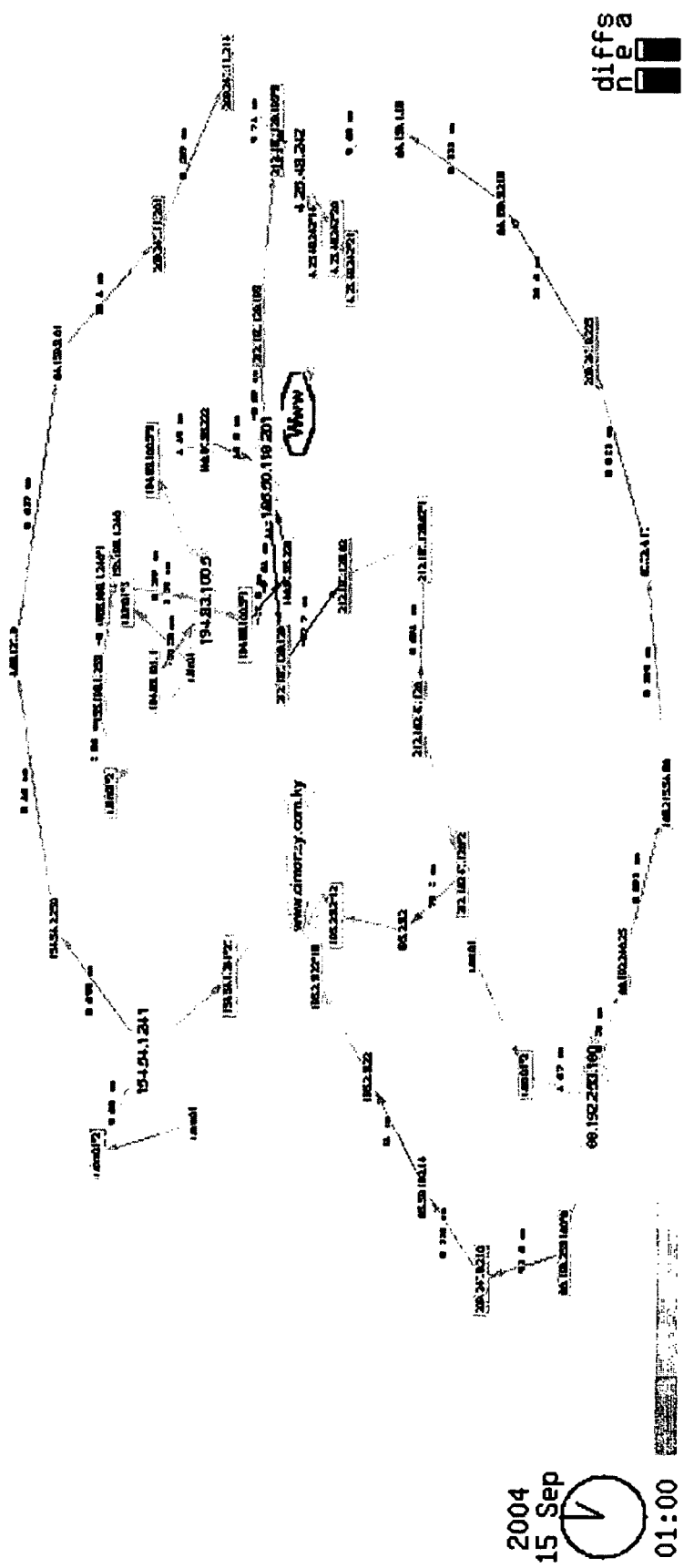
Figure 35:
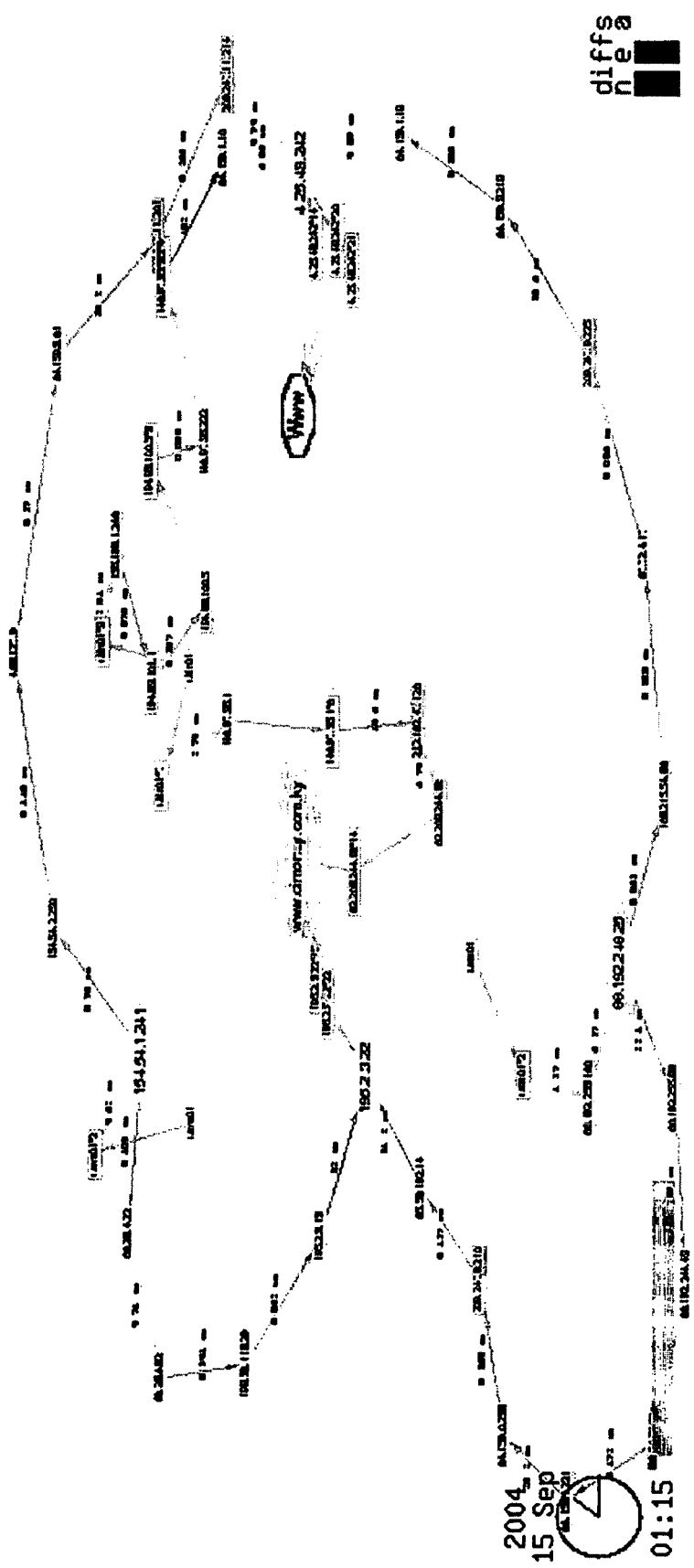
Figure 36:
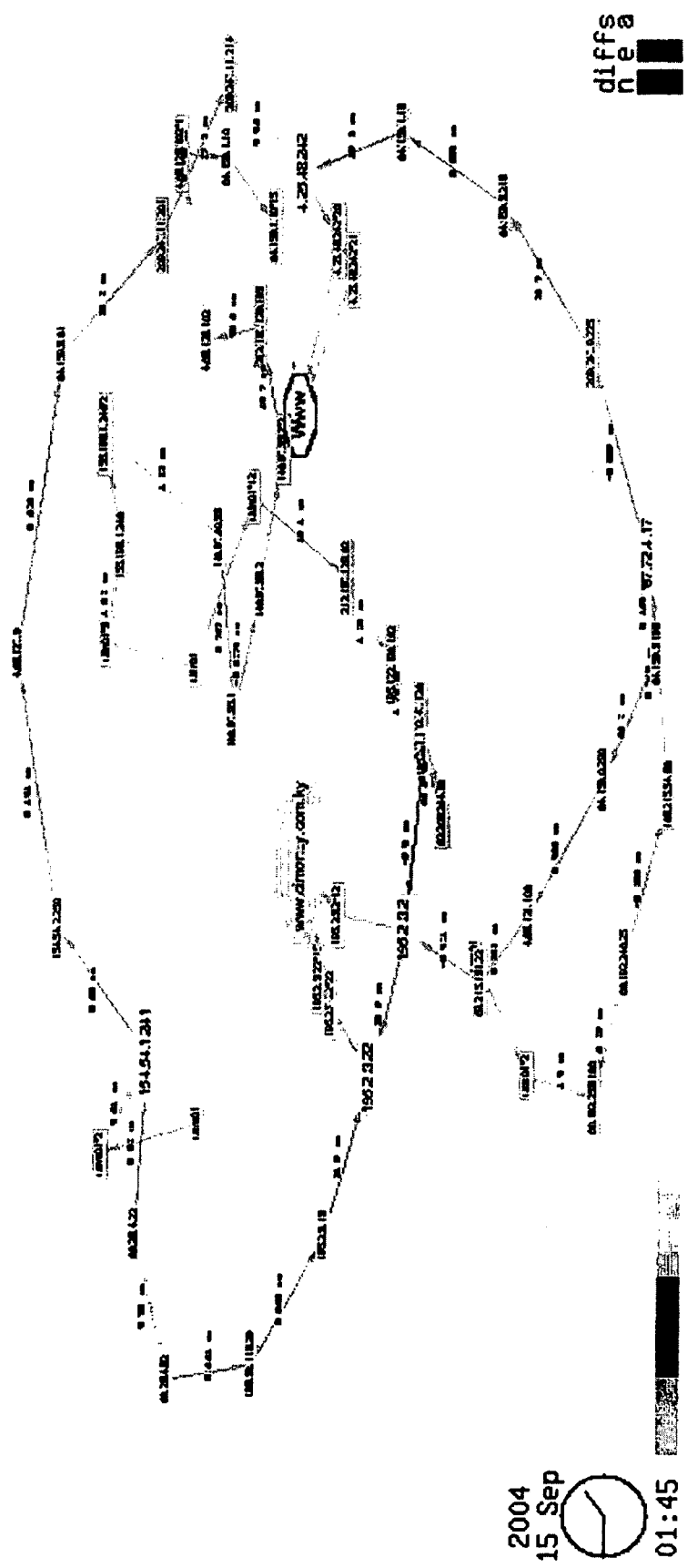
Figure 37:
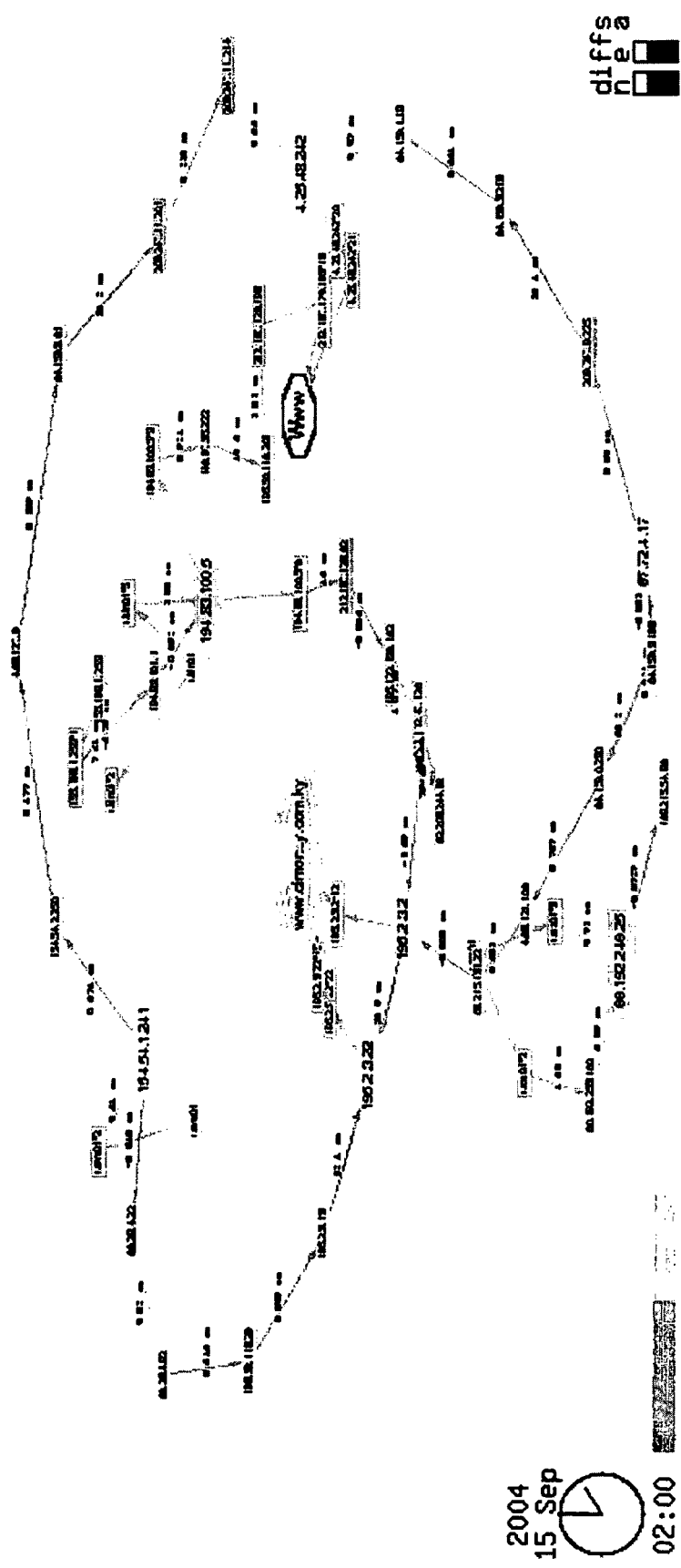
Figure 38:
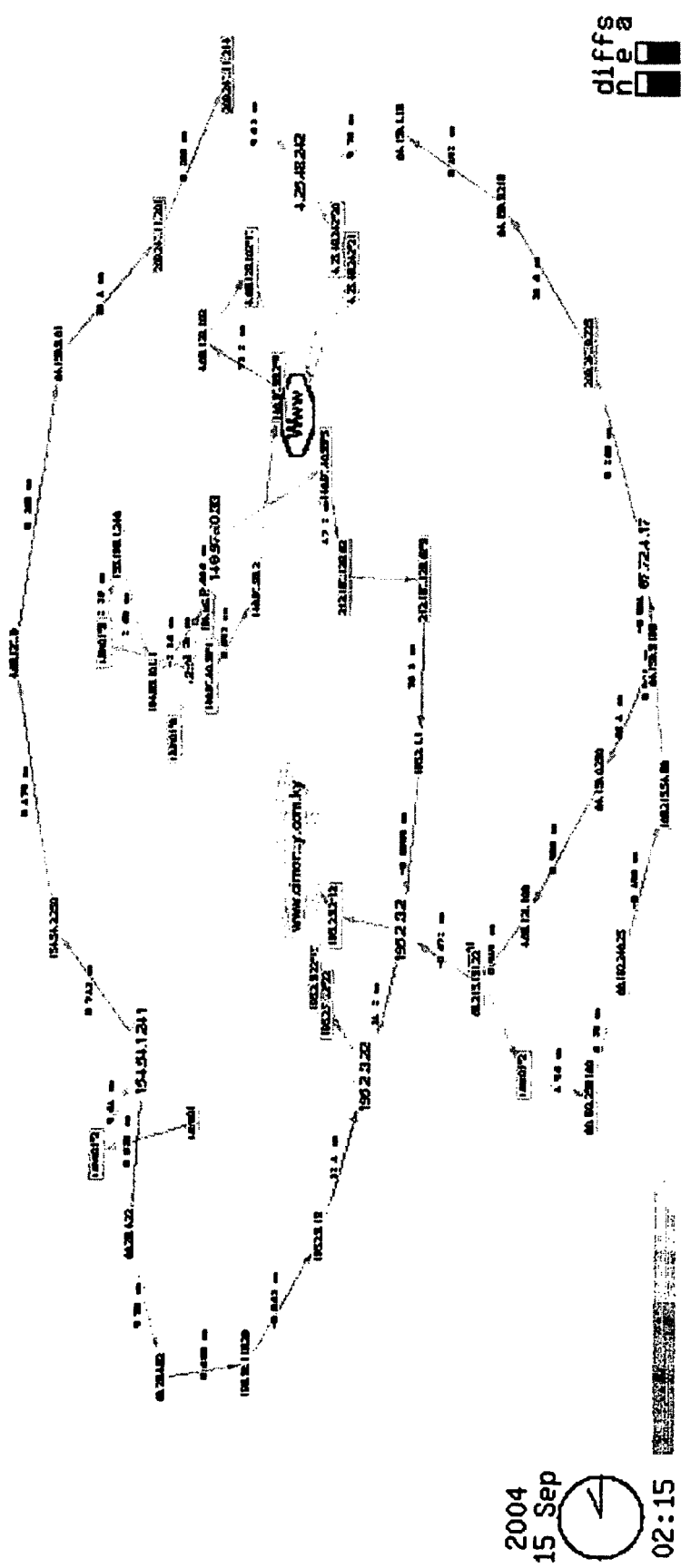
Figure 39:
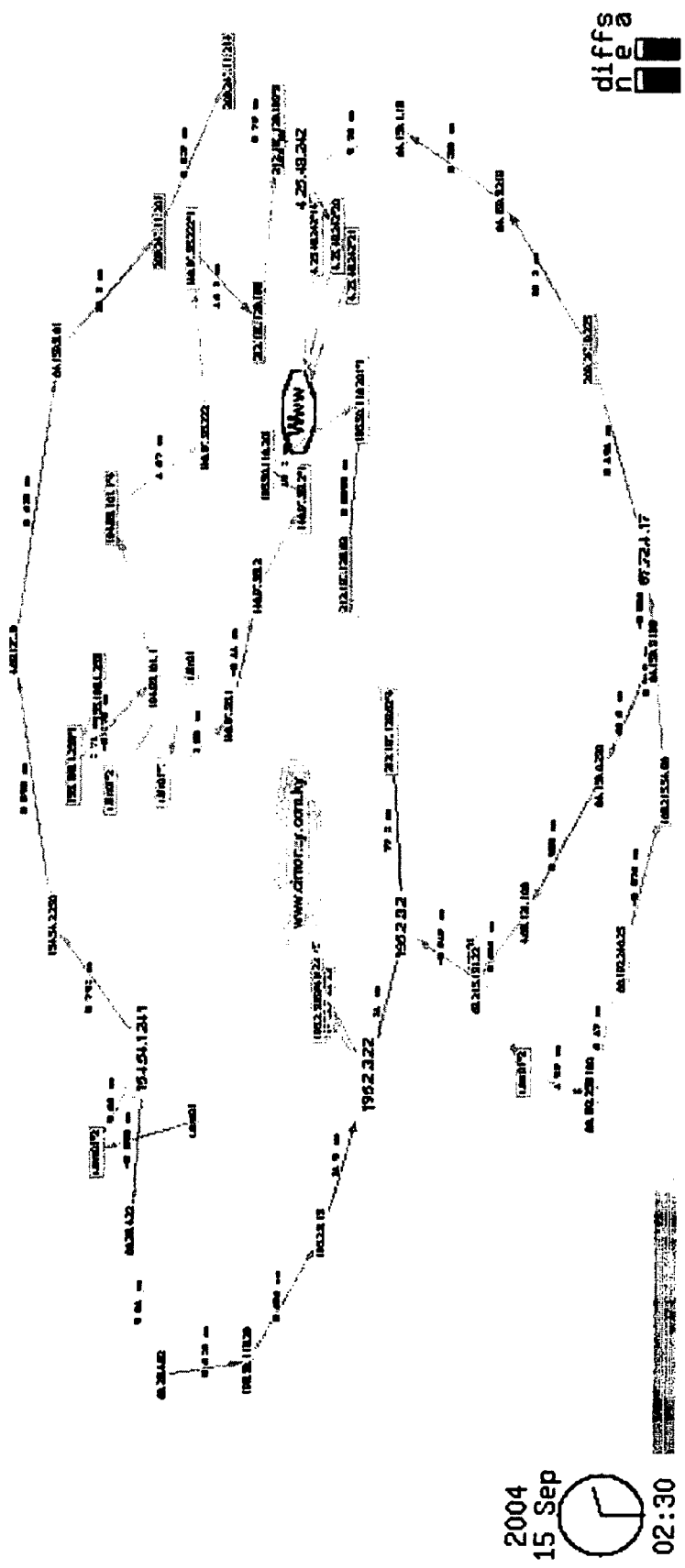
Figure 40:
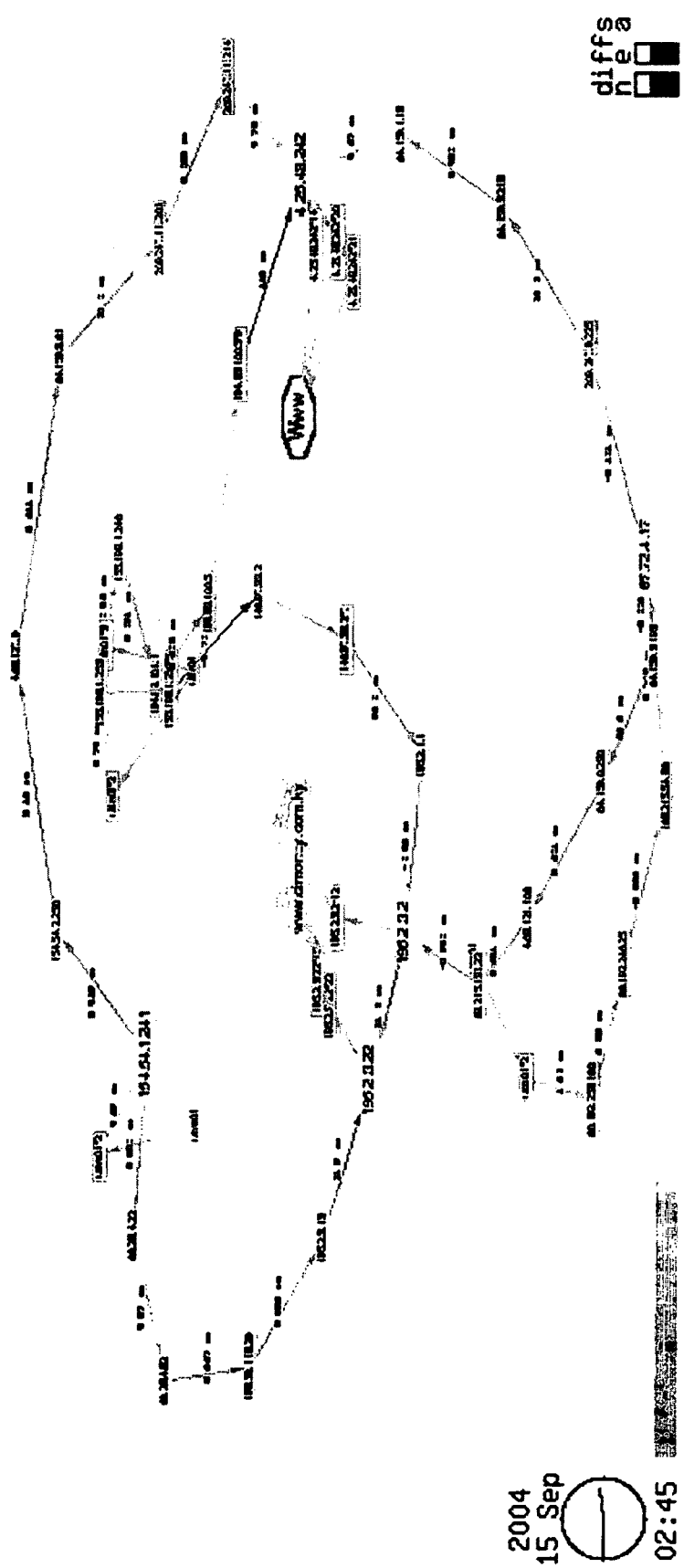
Figure 41:
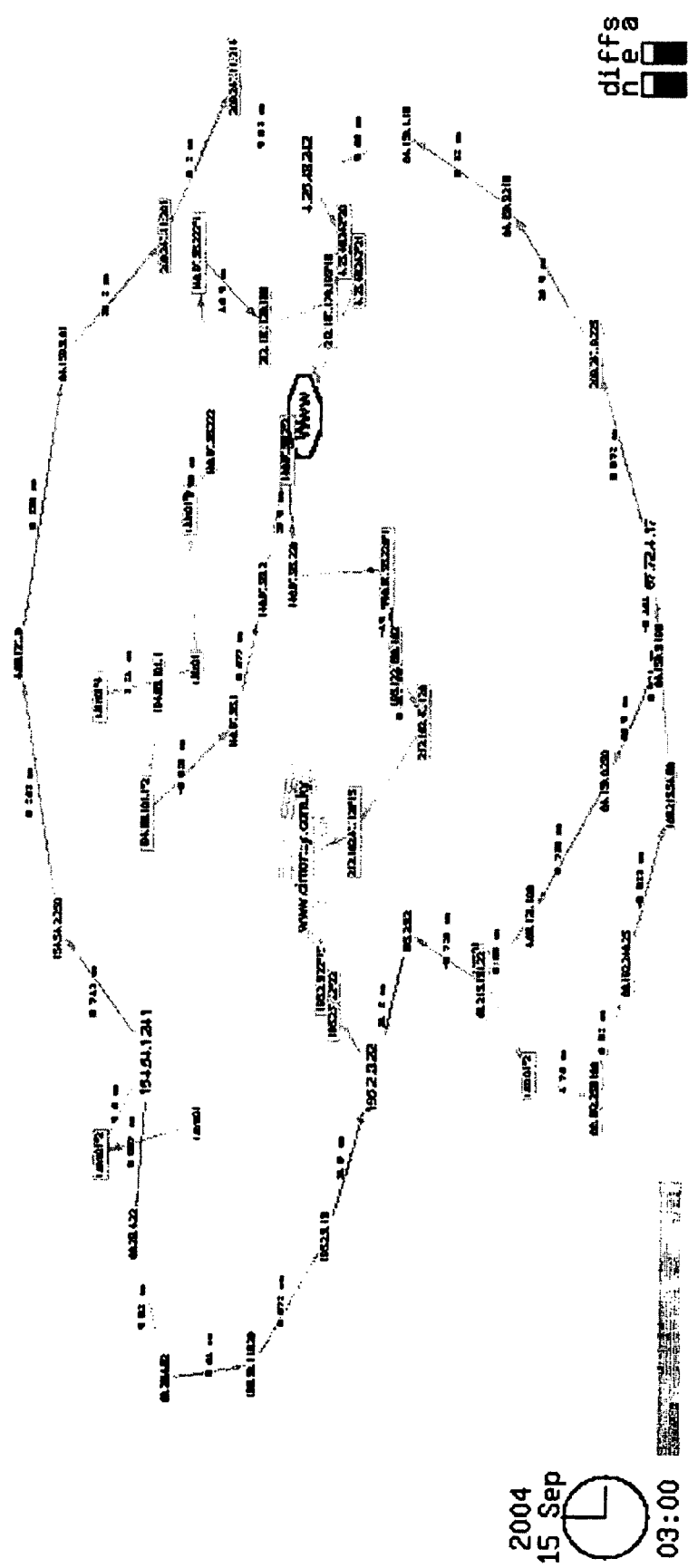
Figure 42:
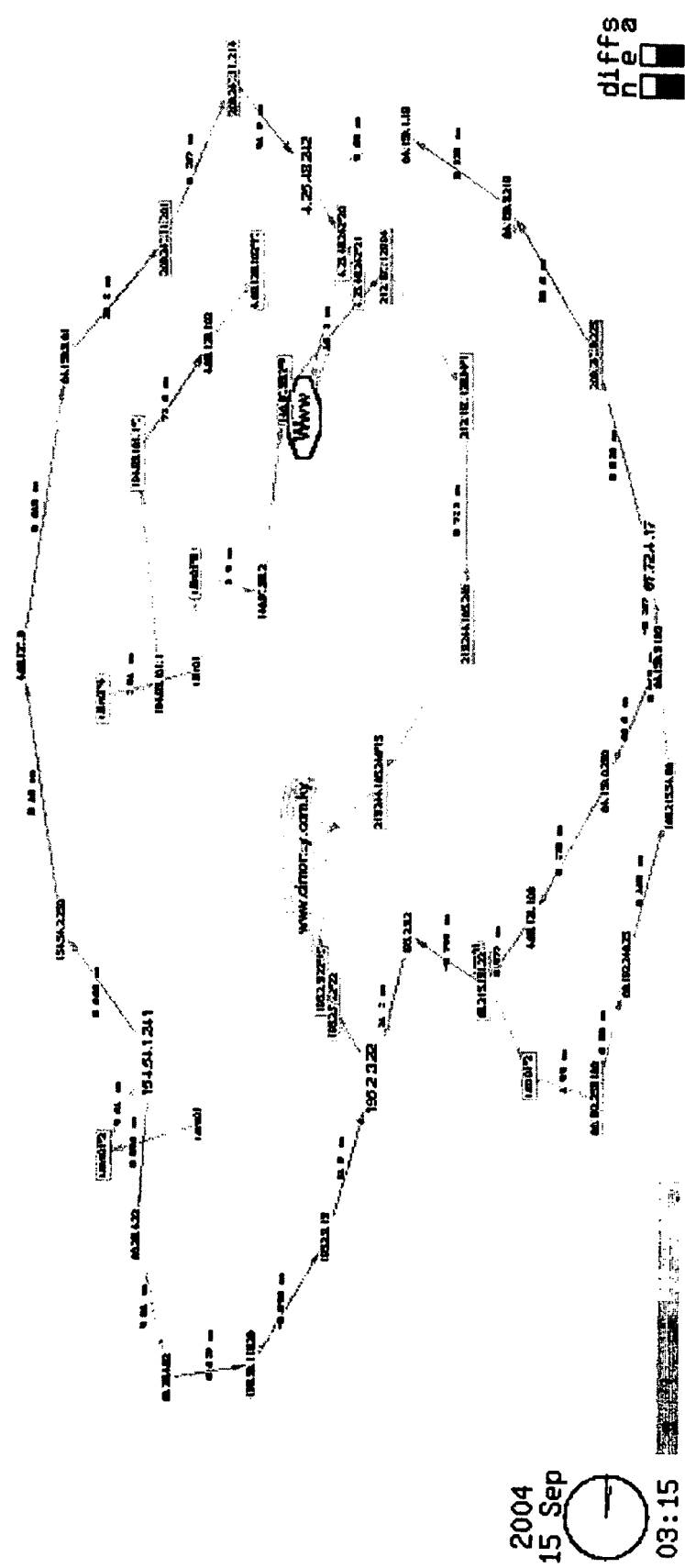
Figure 43:
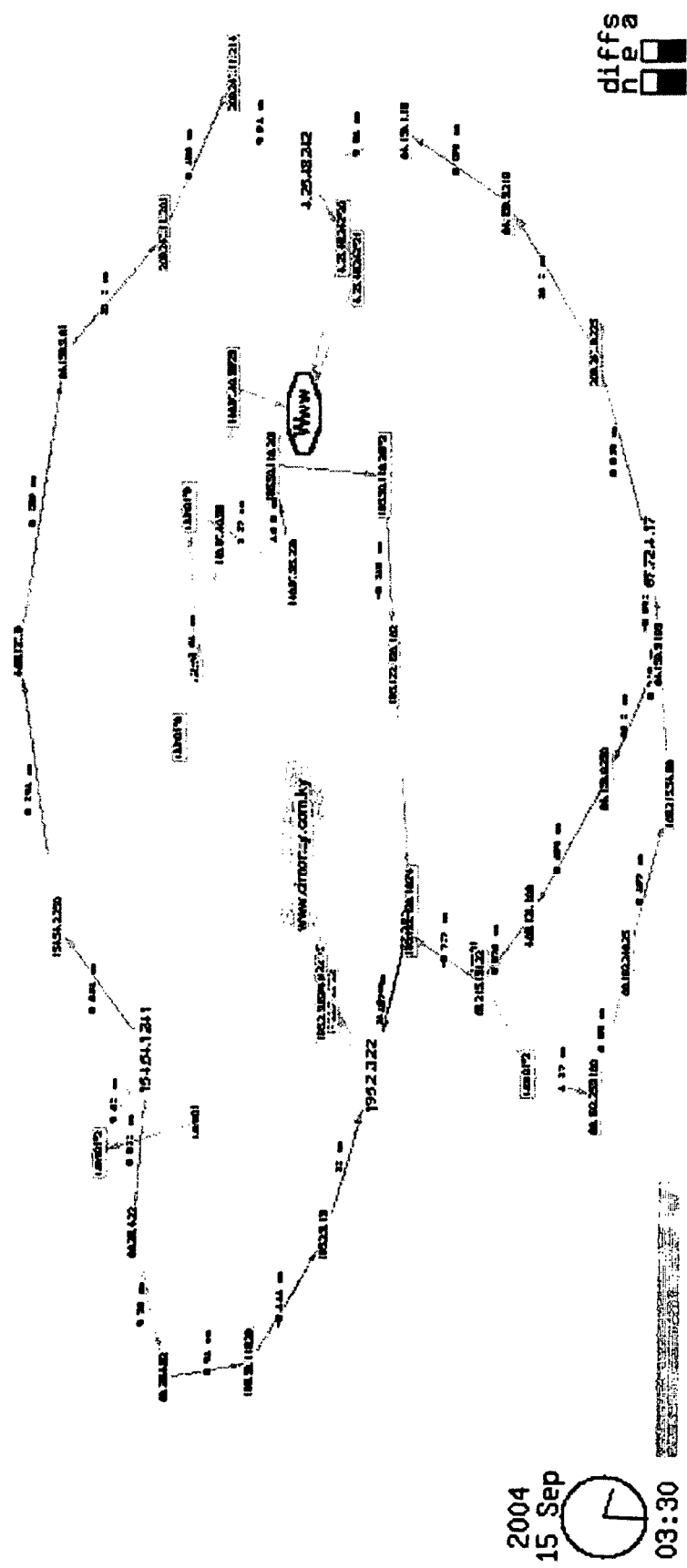
Figure 44:
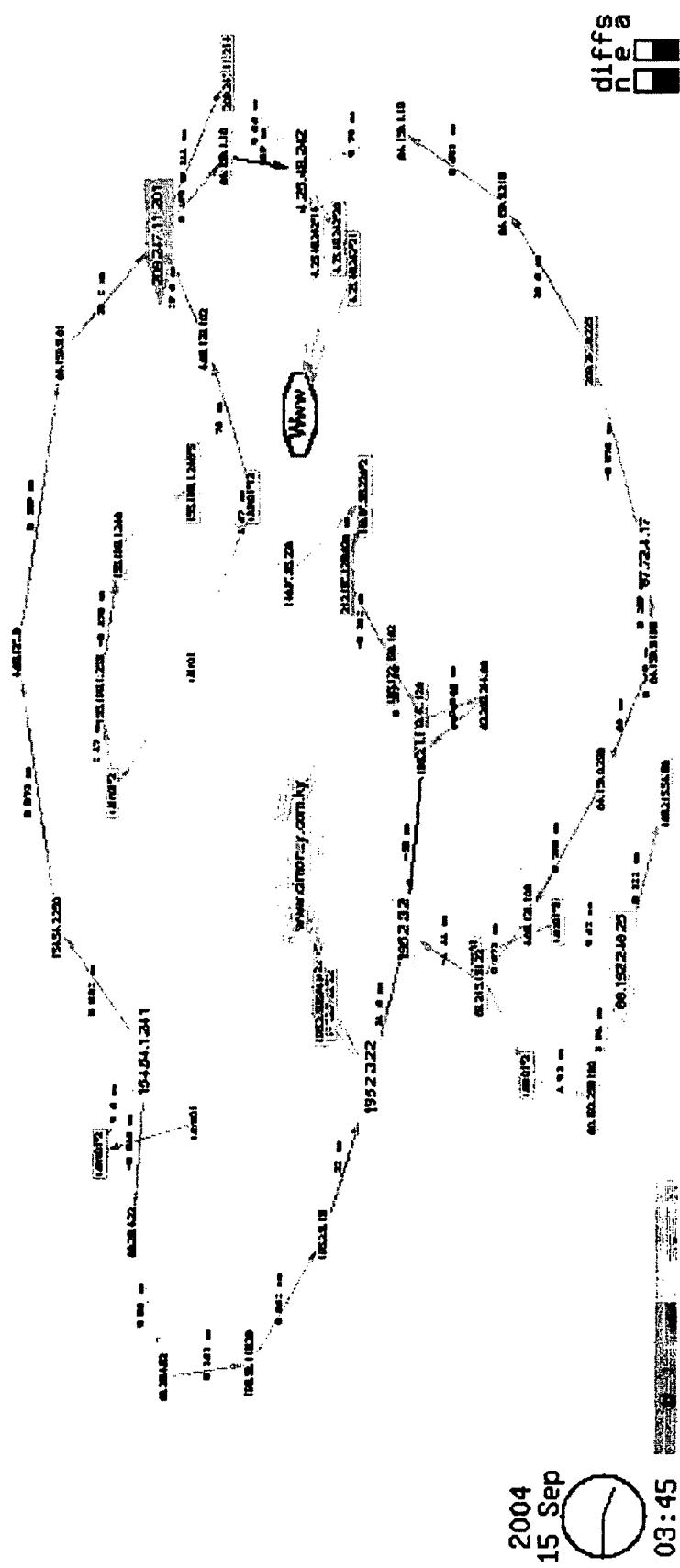
Figure 45:
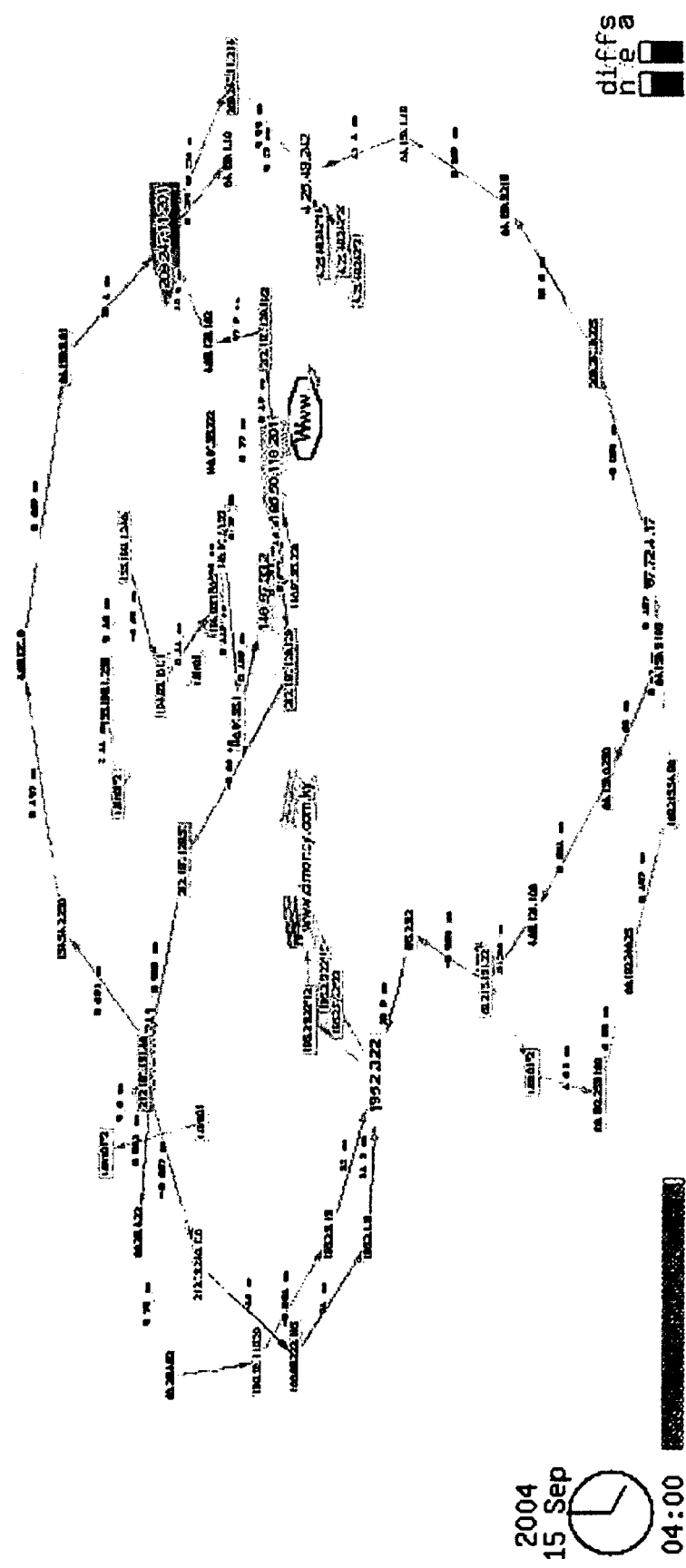
Figure 46:
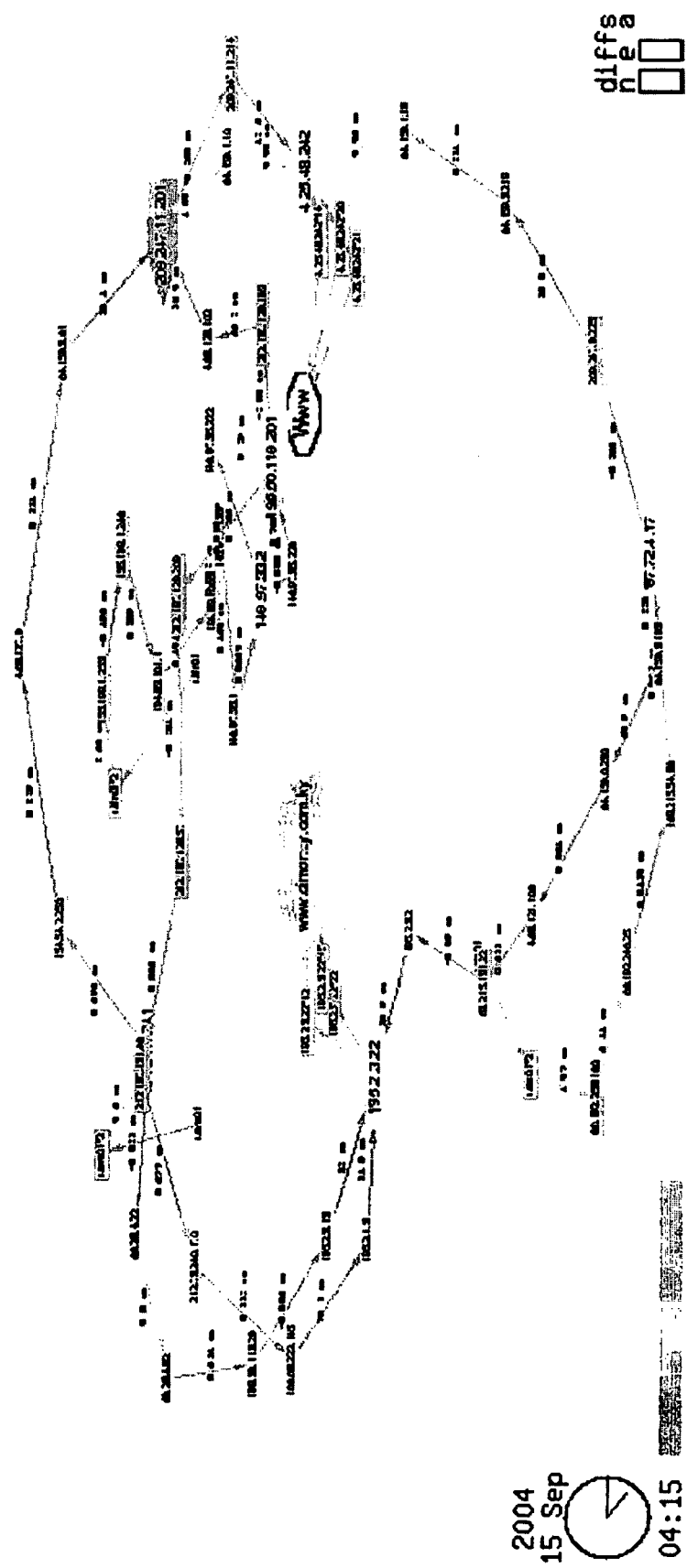
Figure 47:
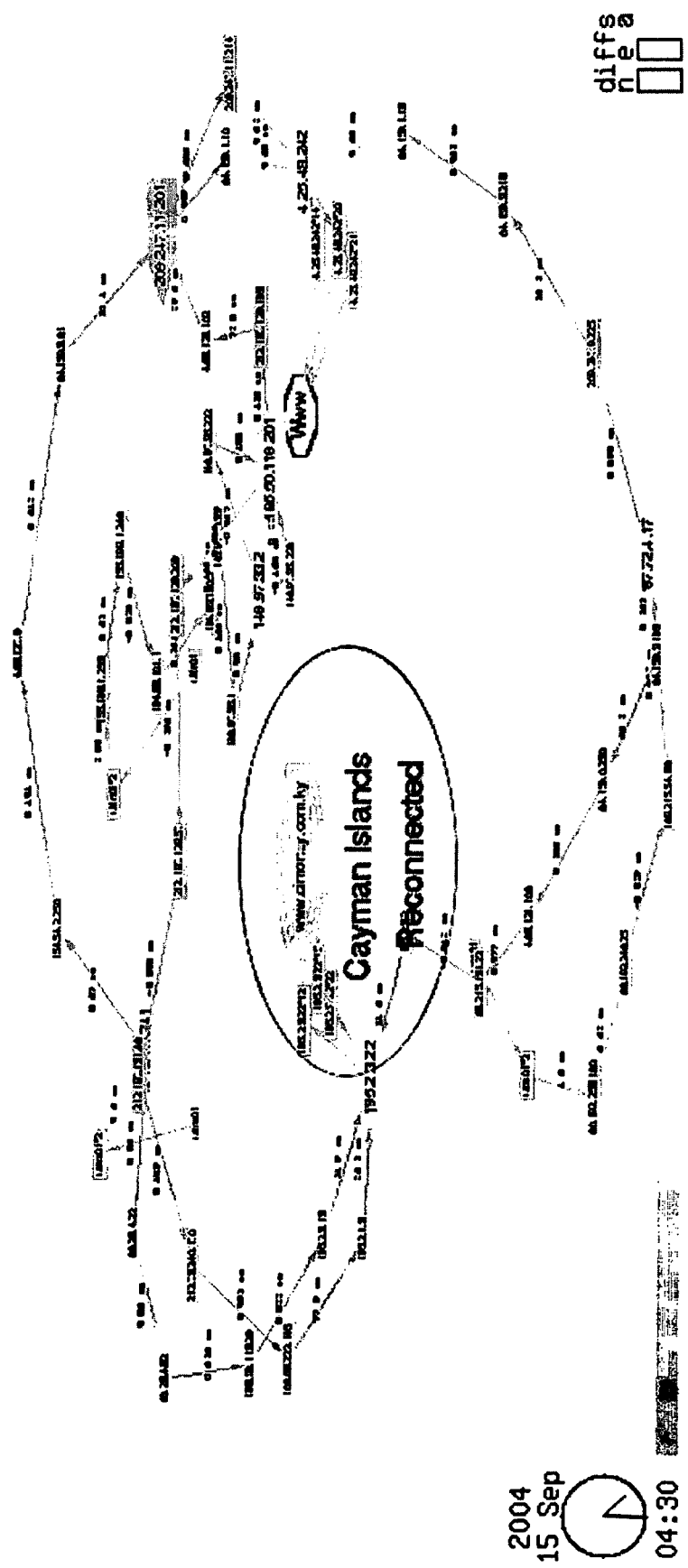
Figure 48:
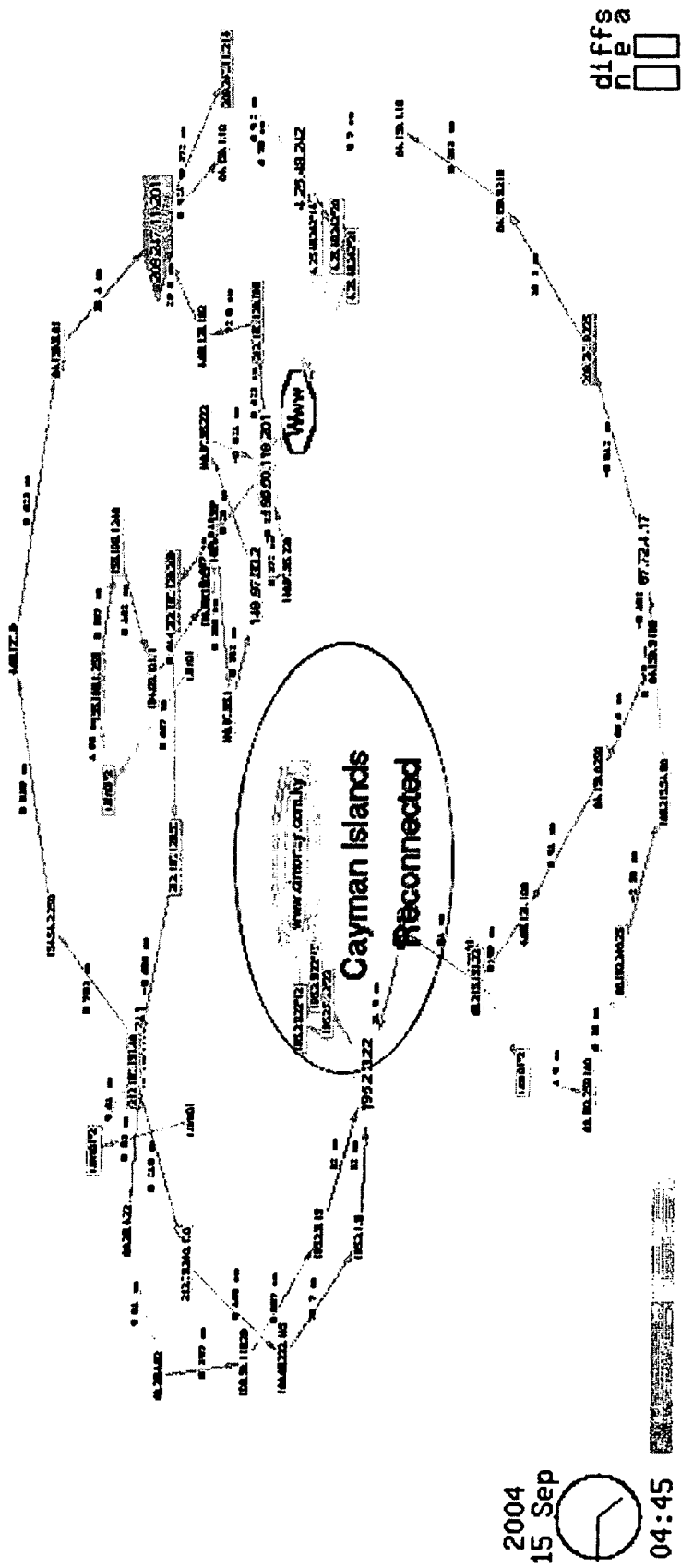

FIG. 15 shows normal connectivity. FIG. 16 shows the Cayman Islands 40 labeled. FIG. 17 shows that there is only one path 42 to the Cayman Islands through Miami 44. In FIG. 18, NYC 46 is labeled. Several paths 48 via NYC to Miami are shown. FIG. 19 shows the network to the Cayman Islands just prior to impacts from Ivan. In FIG. 20, disconnection starts. The disconnection continues in FIGS. 21-23. FIG. 24 is the last frame shown for Sunday 12 Sep. 2004. FIG. 25 is the first screen shown for Tuesday 14 Sep. 2004. Two days have elapsed and the Cayman Islands remain disconnected. FIG. 26 shows the disconnection continued. FIG. 27 shows a slight routing change. In FIG. 28, another slight routing change. In FIG. 29, Reconnection Begins in portion 50. FIGS. 30 through 47 show the on-going reconnection. In FIG. 48, the reconnection is completed.

FIGS. 15 through 48 enabled the user to see the nonredundant path through Miami to get to the Cayman Islands, exactly when that path failed, when the disconnect occurred, when the reconnect started, how long the reconnect took, and the fact that Jamaica wasn't disconnected. The regular frequent data collection of the appropriate kinds provide the present invention the data necessary to present such information. The display algorithms described supra enable graphs to show all the items noted above, such as: panning to destinations and paths that show the relevant content; zooming to a level to show appropriate detail; selecting sufficient cameras to show branching paths; visibly presenting latency as color of lines and as numeric labels; and color coding nodes by netblock and labeling nodes with addresses (and with domain names visible via mouse over in the device). Topology is directly visible as nodes and edges (boxes and lines), geography is deducible from latency plus netblock, domain name, and other displayed information, appropriate time intervals are selectable, animation is possible over the intervals. Thus the present invention tells a story with pictures.

In FIGS. 15 through 48, the time interval between new screen displays was 15 minutes. However, it should be understood that this interval can be varied. In general, the time interval between screen updates is related to the time interval between data scans producing the information used to update the screens. That is, the screens cannot be updated until the information used to generate the screens is updated. The minimal time between data scans is related to network parameters such as time out response, the number of nodes involved, and round trip delays. The actual speed of the displays per se is primarily a function of available processing power.

Returning to FIG. 10, graphical features described supra can be shown. Node 60 is purple, nodes 62, 64, and 66 are green, and node 68 is blue. All the edges, for example, edge 70, are green, with the exception of edge 72, which is yellow. The nodes are displayed as a box or other shape and shown an address or name. Different types of nodes are distinguished visually. The selected focus node, 14 in this case, is shown in pink with multiple peripheries. Destinations used in collecting the data, such as 16 in this case, are shown as green ellipses if reached. The colors of nodes 60, 62, 64, 66, and 68 representing operational groupings of nodes, such as netblocks, Autonomous Systems, or ISPs. In FIG. 6, node 74 is a grey data node. Hubs are distinguished by size: the more edges connected to a node, the bigger it is. In FIG. 6, hub 76 is larger than hub 78.

Figure 49:
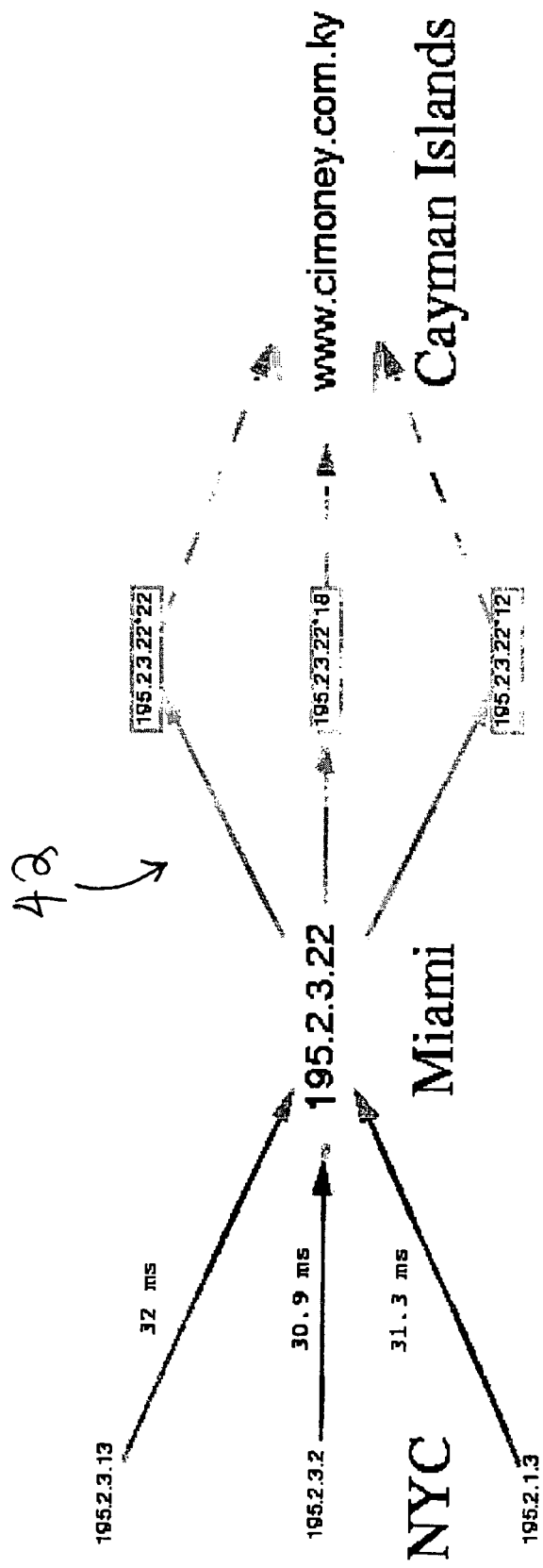
FIGS. 49 and 50 are screen captures showing zoomed images from FIGS. 14 through 48; and,
FIGS. 51 through 54 are screen captures of the "Help" section of a present invention device, illustrating features of the device.
Figure 50:
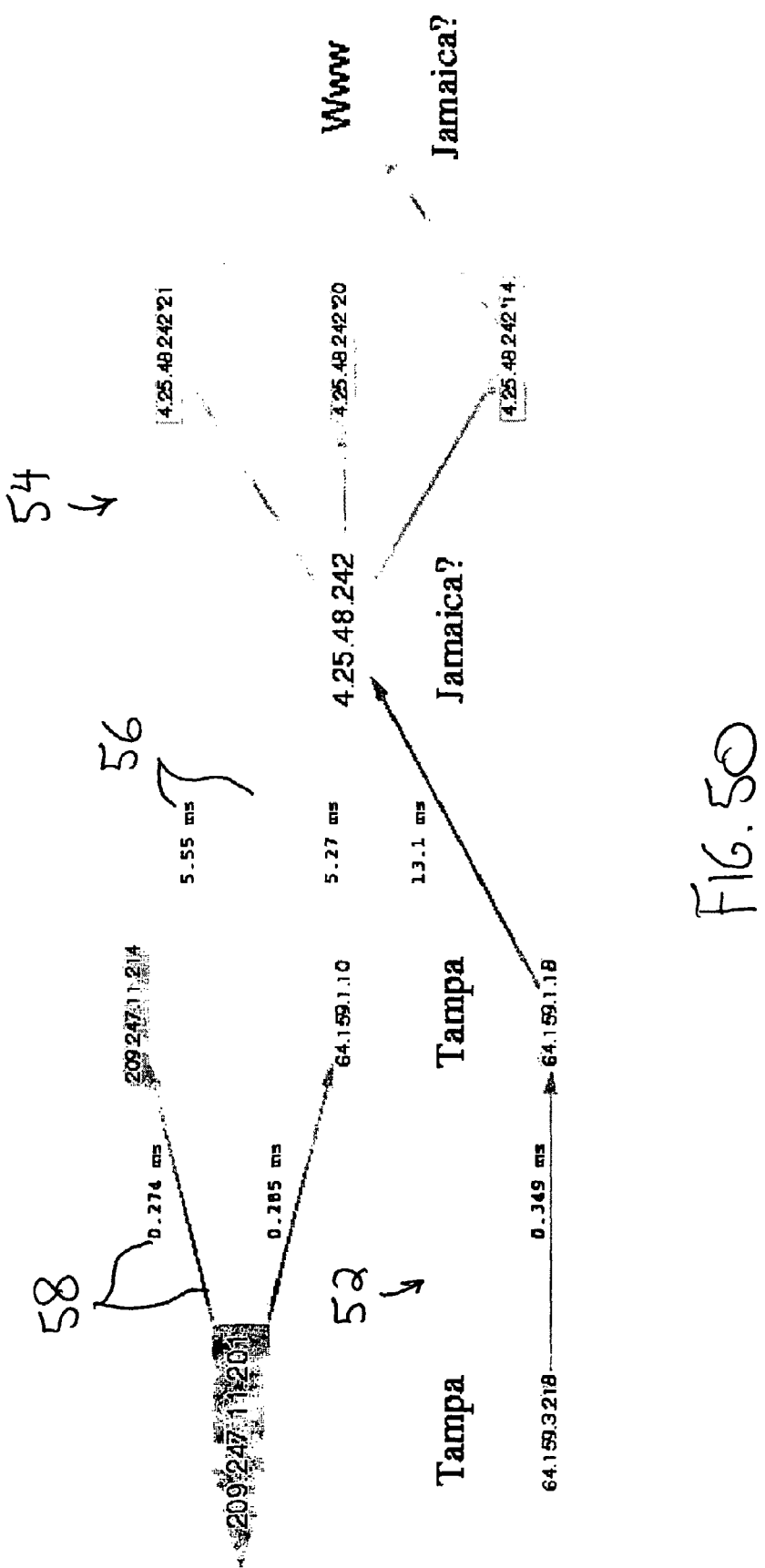

FIGS. 49 and 50 are screen captures showing zoomed images from FIGS. 14 through 48. To generate FIG. 49, the user can zoom in on 40, 42, and 44 in FIG. 17. In FIG. 49, the single, nonredundant path between Miami and the Cayman Islands is clearly seen. FIG. 50 shows multiple paths from Tampa 52 to Jamaica 54. Thus connectivity to Jamaica looks less perilous than to the Cayman Islands, where only one path was found. Such topological features are clearly visible in the screens. The figure also note the significant latencies 56 from Tampa to Jamaica, visible as yellow and orange lines with labels of '5.27 ms' and up. Sustained over time, such latency usually means significant geographical distance, in this case probably of hundreds of miles. Thus, the present invention can be used to gauge geographical relationships. The green lines 58 between the Tampa nodes, on the other hand, have very low latencies consistent with nodes within the same metropolitan area. Note that in the animation, the node labeled www is the same node shown in Tampa.gif, and it never gets disconnected during the period of the animation, even though news reports claimed Jamaica was also disconnected. Thus, the present invention provided more accurate information than was available from traditional, non-aggregated information sources.

FIGS. 51 through 54 are screen captures of the "Help" section of a present invention device, illustrating features of the device.

The present invention is not limited to showing topology or performance for specific ISPs or networks. That is, the present invention can show topology for one or all ISPs in the Internet. Alternately stated, if the Internet consists of a particular number of nodes, the invention can include all of these nodes in the visual presentations generated by the invention. The present invention does not require that hardware recording devices be physically installed at various parts of a network. For example, the invention does not require the installation of hardware at ISP sites. The present invention visualizes hops in a network as well as paths.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What we claim is:

1. A computer-based method for presenting information regarding network performance and topology, comprising:
   displaying a first plurality of nodes in said network;
   displaying at least one first edge associated with said first plurality of nodes, wherein the at least one first edge is associated with first and second nodes from among the first plurality of nodes;
   measuring a first time for a first probe to travel from a camera node to the first node and for the camera to receive a response from the first node;
   measuring a second time for a second probe to travel from the camera node to the second node and for the camera to receive a response from the second node;
   determining the difference between the first and second times; and,
   displaying latency associated with the at least one first edge, the latency substantially equal to the difference, where said steps of displaying nodes, edges, and latency, measuring first and second times, and determining are performed by at least one general-purpose computer specially programmed to perform said steps of steps of displaying nodes, edges, and latency, measuring first and second times, and determining and the method further comprising:
   accepting data regarding a second plurality of nodes, the second plurality of nodes including a first node that has been reached and is included in the data and a second node not included in the data, wherein an attempt has been made to reach the second node and no data was received responsive to the data or wherein no attempt was made to reach the second node;
   generating a composite topology including the first and second pluralities of nodes and the first plurality of edges, wherein generating the composite topology includes selecting and fixing respective two dimensional locations for each node from the first and second plurality of nodes; and,
   displaying an animation of said composite topology, wherein the animation includes a plurality of frames corresponding to respective segments of a duration of time and wherein for at least one frame from the plurality of frames, less than all of respective nodes in the first and second pluralities of nodes are displayed, wherein said displaying, measuring, determining, displaying, accepting, and generating are performed by a specially programmed general-purpose computer.

2. The method of claim 1 further comprising: selecting said first plurality of nodes, where said selecting is performed by said at least one general-purpose computer.

3. The method of claim 2 wherein said network comprises a plurality of ISPs with respective pluralities of nodes and wherein said respective pluralities of nodes comprises said first plurality of nodes.

4. The method of claim 3 wherein displaying a first plurality of nodes, at least one first edge, and latency is independent of cooperation from said plurality of ISPs.

5. The method of claim 1 further comprising:
   gathering information regarding said first plurality of nodes from at least one vantage point outside said first plurality of nodes, where said gathering is performed by said at least one general-purpose computer.

6. The method of claim 5 wherein said gathering further comprises gathering information from only one of said at least one vantage point.

7. The method of claim 5 wherein said first plurality of nodes comprises hardware and wherein said at least one vantage point is separate from said respective hardware.

8. The method of claim 5 further comprising:
   periodically updating said information; and,
   updating said displaying said first plurality of nodes, the at least one first edge, and said latency responsive to said updated information, where said updating said information and said updating said displaying are performed by said at least one general-purpose computer.

9. The method of claim 1 wherein said displaying said animation further comprises:
   panning to a third node in said first plurality of nodes; and,
   zooming to show at least one fourth node in said first plurality of nodes.

10. The method of claim 1 wherein said network comprises a second plurality of nodes and said first plurality of nodes comprises said second plurality of nodes.

11. The method of claim 1 wherein said first plurality of nodes and the at least one first edge comprise a plurality of hops; and,
    said method further comprising:
       displaying said plurality of hops, where said displaying is performed by said general-purpose computer.

12. The method of claim 1 wherein said network comprises gradations of packet loss; and,
    said method further comprising:
       displaying said gradations, where said displaying is performed by said general-purpose computer.

13. The method of claim 1 wherein said network comprises a third plurality of nodes; and,
    said method further comprising:
       accepting data regarding said third plurality of nodes;
       identifying at least one node in said third plurality that does not have address or performance metrics recorded in said data;
       identifying at least one second edge terminating at said at least one node in said third plurality; and,
       displaying said at least one node in said third plurality and said at least one second edge, where said accepting, identifying said at least one node and said at least one second edge, and displaying are performed by said general-purpose computer.

14. A computer-based apparatus for presenting information regarding network performance and topology, comprising:

means for displaying a first plurality of nodes in said network;
displaying at least on first edge associated with said first plurality of nodes, wherein the at least one first edge is associated with first and second nodes from among the first plurality of nodes;
means for measuring a first time for a first probe to travel from a camera node to the first node and for the camera to receive a response from the first node;
means for measuring a second time for a second probe to travel from the camera node to the second node and for the camera to receive a response from the second node;
means for determining the difference between the first and second times; and,
means for displaying latency associated with the at least one first edge, the latency substantially equal to the difference, where said means for displaying nodes, edges, and latency, measuring first and second times, and determining are included in at least one specially programmed general-purpose computer, wherein the network comprises a third plurality of nodes; and the apparatus further comprising:
means for accepting data regarding the third plurality of nodes, the third plurality of nodes including a first node that has been reached and is included in the data and a second node that has not been reached and is not included in the data;
means for generating a composite topology including the first and second pluralities of nodes and the first plurality of edges, wherein the means for generating the composite topology includes means for selecting and fixing respective two dimensional locations for each node from the first and second plurality of nodes; and,
means for displaying an animation of said composite topology, wherein the animation includes a plurality of frames corresponding to respective segments of a duration of time and wherein for at least one frame from the plurality of frames, less than all of respective nodes in the first and second pluralities of nodes are displayed.

15. The apparatus of claim 14 further comprising: means for selecting said first plurality of nodes, where said means for selecting is included in said at least one specially programmed general-purpose computer.

16. The apparatus of claim 15 wherein said network comprises a plurality of ISPs with respective pluralities of nodes and wherein said respective pluralities of nodes comprises said first plurality of nodes.

17. The apparatus of claim 16 wherein said means for displaying an animation is independent of cooperation from said plurality of ISPs.

18. The apparatus of claim 14 further comprising:
means for gathering information regarding said first plurality of nodes from at least one vantage point outside said first plurality of nodes, where said means for gathering is included in said at least one specially programmed general-purpose computer.

19. The apparatus of claim 18 wherein said means for gathering further comprises means for gathering information from only one of said at least one vantage point.

20. The apparatus of claim 18 wherein said first plurality of nodes comprises hardware and wherein said at least one vantage point is separate from said respective hardware.

21. The apparatus of claim 18 further comprising:
means for periodically updating said information; and,
means for updating said means for displaying said first plurality of nodes, the at least one first edge, and said latency responsive to said updated information, where said means for updating said information and said means for updating said means for displaying are included in said at least one specially programmed general-purpose computer.

22. The apparatus of claim 14 wherein said means for displaying an animation further comprises:
means for panning to a third node in said first plurality of nodes; and,
means for zooming to show at least one fourth node in said first plurality of nodes.

23. The apparatus of claim 14 wherein said network comprises a second plurality of nodes and said first plurality of nodes comprises said second plurality of nodes.

24. The apparatus of claim 14 wherein said first plurality of nodes and the at least one first edge comprise a plurality of hops; and,
said apparatus further comprising:
means for displaying said plurality of hops, where said means for displaying is included in said at least one specially programmed general-purpose computer.

25. The apparatus of claim 14 wherein said network comprises a third plurality of nodes; and,
said apparatus further comprising:
means for accepting data regarding said third plurality of nodes;
means for identifying at least one node in said third plurality that does not have address or performance metrics recorded in said data;
means for identifying at least one second edge terminating at said at least one node in said third plurality; and,
means for displaying said at least one node in said third plurality and said at least one second edge, where said means for accepting, identifying said at least one node and said at least one second edge, and displaying are included in said at least one specially programmed general-purpose computer.

26. The apparatus of claim 14 wherein said network comprises a fourth plurality of nodes; and,
said apparatus further comprising:
means for accepting data regarding said fourth plurality of nodes;
means for supersetting at least one node in said fourth plurality that is not included in said data; and,
means for displaying said at least one node in said fourth plurality, where said means for accepting, supersetting, and displaying are included in said at least one specially programmed general-purpose computer.

27. The apparatus of claim 14 wherein said network comprises gradations of packet loss; and,
said apparatus further comprising:
means for displaying said gradations, where said means for displaying is included in said at least one specially programmed general-purpose computer.

28. A computer-based method for presenting information regarding network performance and topology, comprising:
generating, over a duration of time, a first plurality of displays for a first plurality of nodes in said network;
generating, over a duration of time, a second plurality of displays for at least one first edge associated with said first plurality of nodes;
generating, over a duration of time, a third plurality of displays for latency associated with the at least one first edge;
accepting data regarding a second plurality of nodes;
identifying at least one first node in said second plurality of nodes that has address or performance metrics recorded in said data;

identifying at least one second node in said second plurality of nodes that does not have address or performance metrics recorded in said data or for which data was not sought;

identifying at least one second edge terminating at said at least one second node in said second plurality of nodes;

identifying a third plurality of nodes, in said second plurality of nodes, that does not have respective address or performance metrics recorded in said data or for which data was not sought;

generating a graphical representation of the third plurality of nodes which represents the third plurality of nodes as a single node;

supersetting said at least one first and second nodes, wherein supersetting includes generating a graphical representations for the at least one second node that graphically differentiate the at least one second node from the at least one first node;

generating a composite topology including the first and second pluralities of nodes and the first plurality of edges, based on the first, second, and third pluralities of displays over the duration of time, wherein generating the composite topology includes selecting and fixing a respective two dimensional location for each node from the first plurality of displays and selecting and fixing a respective two dimensional location for each node from the third plurality of displays; and, displaying an animation of said composite topology, wherein the animation includes a plurality of frames corresponding to respective segments of the duration of time and wherein for at least one frame from the plurality of frames, less than all of respective nodes in the first and third pluralities of nodes are displayed, where said steps of generating first, second, and third pluralities of displays, accepting data, identifying at least one first node, identifying at least one second node, identifying at least second one edge, identifying a third plurality of nodes, generating a graphical representation, supersetting, and displaying are performed by at least one general-purpose computer specially programmed to perform said steps of generating first, second, and third pluralities of displays, accepting data, identifying at least one first node, identifying at least one second node, identifying at least second one edge, identifying a third plurality of nodes, generating a graphical representation, supersetting, and displaying.

* * * * *